US010509859B2

(12) United States Patent
Xia et al.

(10) Patent No.: US 10,509,859 B2
(45) Date of Patent: Dec. 17, 2019

(54) TOPOLOGICAL DATA ANALYSIS UTILIZING SPREADSHEETS

(71) Applicant: Ayasdi, Inc., Menlo Park, CA (US)

(72) Inventors: Huang Xia, Sunnyvale, CA (US); Sanket Patel, Newark, CA (US)

(73) Assignee: Ayasdi AI LLC, Menlo Park, CA (US)

( * ) Notice: Subject to any disclaimer, the term of this patent is extended or adjusted under 35 U.S.C. 154(b) by 22 days.

(21) Appl. No.: 15/655,823

(22) Filed: Jul. 20, 2017

(65) Prior Publication Data

US 2018/0024981 A1  Jan. 25, 2018

Related U.S. Application Data

(60) Provisional application No. 62/365,355, filed on Jul. 21, 2016.

(51) Int. Cl.
*G06F 17/24* (2006.01)
*G06T 11/20* (2006.01)
*G06F 3/0484* (2013.01)
*G06T 11/00* (2006.01)

(52) U.S. Cl.
CPC .......... *G06F 17/246* (2013.01); *G06T 11/206* (2013.01); *G06F 3/04842* (2013.01); *G06T 11/001* (2013.01)

(58) Field of Classification Search
None
See application file for complete search history.

(56) References Cited

U.S. PATENT DOCUMENTS

| | | | |
|---|---|---|---|
| 2010/0313157 A1* | 12/2010 | Carlsson | G06F 17/30601 715/769 |
| 2013/0144916 A1* | 6/2013 | Lum | G06F 19/24 707/790 |
| 2013/0187922 A1* | 7/2013 | Sexton | G06T 11/206 345/440 |
| 2015/0127650 A1* | 5/2015 | Carlsson | G06F 17/30663 707/737 |
| 2015/0254370 A1* | 9/2015 | Sexton | G06F 17/30958 707/798 |
| 2016/0246863 A1 | 8/2016 | Sexton | |
| 2016/0350389 A1 | 12/2016 | Kloke | |

* cited by examiner

*Primary Examiner* — Sanchita Roy
(74) *Attorney, Agent, or Firm* — Ahmann Kloke LLP

(57) ABSTRACT

A method comprises receiving data points from a spreadsheet, mapping the data points to a reference space, generating a cover of the reference space, clustering the data points mapped to the reference space to determine each node of a graph, each node including at least one data point, generating a visualization depicting the nodes, the visualization including an edge between every two nodes that share at least one data point, generating a translation data structure indicating location of the data points in the spreadsheet as well as membership of each node, detecting a selection of at least one node, determining the location of data points in the spreadsheet corresponding to data points that are members of the selected node(s) using the translation data structure, and providing a first command to a spreadsheet application to provide a first visual identification of the first set of data points in the spreadsheet.

23 Claims, 35 Drawing Sheets

| Patient ID | Gene 1 Expression | Gene 2 Expression | ... | Gene y Expression | Clinical Outcome |
|---|---|---|---|---|---|
| P1 | G1a | G2a | ... | Gya | Outcome P1 |
| P2 | G1b | G2b | ... | Gyb | Outcome P2 |
| P3 | G1c | G2c | ... | Gyc | Outcome P3 |
| ... | ... | ... | ... | ... | ... |
| Pn | G1n | G2n | ... | Gyn | Outcome Pn |

FIG. 13

TOPOLOGICAL DATA ANALYSIS UTILIZING SPREADSHEETS

CROSS-REFERENCE TO RELATED APPLICATIONS

This application claims priority to U.S. Patent Application Ser. No. 62/365,355, filed Jul. 21, 2016 and entitled "Integrating TDA with Excel for Advanced In-Excel Machine Learning," which is hereby incorporated by reference herein.

BACKGROUND

1. Field of the Invention(s)

Embodiments discussed herein are directed to topological data analysis of data contained in one or more spreadsheets.

2. Related Art

As the collection and storage of data has increased, there is an increased need to analyze and make sense of large amounts of data. Examples of large datasets may be found in financial services companies, oil exploration, insurance, health care, biotech, and academia. Unfortunately, previous methods of analysis of large multidimensional datasets tend to be insufficient (if possible at all) to identify important relationships and may be computationally inefficient.

In order to process large datasets, some previous methods of analysis use clustering. Clustering often breaks important relationships and is often too blunt an instrument to assist in the identification of important relationships in the data. Similarly, previous methods of linear regression, projection pursuit, principal component analysis, and multidimensional scaling often do not reveal important relationships. Further, existing linear algebraic and analytic methods are too sensitive to large scale distances and, as a result, lose detail.

Even if the data is analyzed, sophisticated experts are often necessary to interpret and understand the output of previous methods. Although some previous methods allow graphs that depict some relationships in the data, the graphs are not interactive and require considerable time for a team of such experts to understand the relationships. Further, the output of previous methods does not allow for exploratory data analysis where the analysis can be quickly modified to discover new relationships. Rather, previous methods require the formulation of a hypothesis before testing.

SUMMARY OF THE INVENTION(S)

An example method comprises receiving data points from a spreadsheet, receiving a lens function identifier, a metric function identifier, and a resolution function identifier, mapping the data points from the spreadsheet to a reference space utilizing a lens function identified by the lens function identifier, generating a cover of the reference space using a resolution function identified by the resolution identifier, clustering the data points mapped to the reference space using the cover and a metric function identified by the metric function identifier to determine each node of a plurality of nodes of a graph, each node including at least one data point from the spreadsheet, generating a visualization depicting the nodes, the visualization including an edge between every two nodes that share at least one data point from the spreadsheet as a member, generating a translation data structure indicating location of the data points in the spreadsheet as well as membership of each node in the visualization, detecting a selection of at least one node in the visualization, determining the location of a first set of data points in the spreadsheet corresponding to one or more data points that are members of the at least one node selected in the visualization using the translation data structure, and providing a first command to a spreadsheet application interacting with the spreadsheet to provide a first visual identification of each of the first set of data points in the spreadsheet that correspond to the one or more data points that are members of the at least one node selected in the visualization. In some embodiments, the method further comprises detecting a selection of a second set of data points in the spreadsheet, determining a set of nodes in the visualization that include data points that correspond to the second set of data points, and providing a second command to an analysis system to provide a second visual identification of the set of nodes.

In various embodiments, the method may further comprise detecting a selection of a column corresponding to a dimension in the spreadsheet, determining a range of values corresponding to dimension values for data points in the spreadsheet, determining a range of colors that correspond to the range of values, determining a node value associated with each node, each node value being based at least in part on the dimension value of each data point that is a member of the particular node, and providing a third command to the analysis system to color the nodes of the visualization based on the range of colors. Determining the node value associated with a first node of the visualization may comprise determining data points that are members of the first node, determining entries for the dimension for each of the data points that are members of the first node, and averaging the entries for the dimension for each of the data points that are members of the first node to create the node value. The method may further comprise determining a legend that identifies the range of colors associated with at least a part of the range of values and providing a fifth command to depict the legend in the visualization.

The method may further comprise generating explain information indicating significance of at least a subset of dimensions for the data points that are members of the selected nodes, and providing a sixth command to the spreadsheet application to generate a worksheet associated with the spreadsheet and depict the explain information. Generating the explain information may comprise determining if at least one dimension in the spreadsheet is a continuous dimension and calculating a p value of the at least one dimension that is the continuous dimension. Determining if at least one dimension in the spreadsheet is a continuous dimension may comprise determining if dimension values of the at least one dimension for at least the data points that correspond to the data points in the selected nodes are quantitative values and determining that a number of distinct dimension values of the at least on dimension for the at least the data points that correspond to the data points in the selected nodes are greater than a continuous threshold. Generating the explain information may comprise determining if at least one dimension in the spreadsheet is a categorical dimension and calculating a p value of a single dimension value of the at least one dimension that is the categorical dimension. Determining if the at least one dimension in the spreadsheet is a categorical dimension may comprise determining if dimension values of the at least one dimension for at least the data points that correspond to the data points in the selected nodes are qualitative values. Determining if the at least one dimension in the spreadsheet is a categorical dimension may comprise determining that a number of distinct dimension values of the at least on dimension for the at least the data points that correspond to the data points in the selected nodes is less than a categorization threshold.

An example non-transitory computer readable medium may comprise instructions executable by a processor to perform a method. The method may comprise receiving data points from a spreadsheet, receiving a lens function identifier, a metric function identifier, and a resolution function identifier, mapping the data points from the spreadsheet to a reference space utilizing a lens function identified by the lens function identifier, generating a cover of the reference space using a resolution function identified by the resolution identifier, clustering the data points mapped to the reference space using the cover and a metric function identified by the metric function identifier to determine each node of a plurality of nodes of a graph, each node including at least one data point from the spreadsheet, generating a visualization depicting the nodes, the visualization including an edge between every two nodes that share at least one data point from the spreadsheet as a member, generating a translation data structure indicating location of the data points in the spreadsheet as well as membership of each node in the visualization, detecting a selection of at least one node in the visualization, determining the location of a first set of data points in the spreadsheet corresponding to one or more data points that are members of the at least one node selected in the visualization using the translation data structure, and providing a first command to a spreadsheet application interacting with the spreadsheet to provide a first visual identification of each of the first set of data points in the spreadsheet that correspond to the one or more data points that are members of the at least one node selected in the visualization. In some embodiments, the method further comprises detecting a selection of a second set of data points in the spreadsheet, determining a set of nodes in the visualization that include data points that correspond to the second set of data points, and providing a second command to an analysis system to provide a second visual identification of the set of nodes.

An example system may comprise one or more processors and memory containing instructions. The instructions may be executable by at least one of the one or more processors to receive data points from a spreadsheet, receive a lens function identifier, a metric function identifier, and a resolution function identifier, map the data points from the spreadsheet to a reference space utilizing a lens function identified by the lens function identifier, generate a cover of the reference space using a resolution function identified by the resolution identifier, cluster the data points mapped to the reference space using the cover and a metric function identified by the metric function identifier to determine each node of a plurality of nodes of a graph, each node including at least one data point from the spreadsheet, generate a visualization depicting the nodes, the visualization including an edge between every two nodes that share at least one data point from the spreadsheet as a member, generate a translation data structure indicating location of the data points in the spreadsheet as well as membership of each node in the visualization, detect a selection of at least one node in the visualization, determine the location of a first set of data points in the spreadsheet corresponding to one or more data points that are members of the at least one node selected in the visualization using the translation data structure, and provide a first command to a spreadsheet application interacting with the spreadsheet to provide a first visual identification of each of the first set of data points in the spreadsheet that correspond to the one or more data points that are members of the at least one node selected in the visualization.

BRIEF DESCRIPTION OF THE DRAWINGS

FIG. 13 is an example data structure including biological data for a number of patients that may be used to generate the cancer map visualization in some embodiments.

DETAILED DESCRIPTION OF DRAWINGS

Some embodiments described herein may be a part of the subject of Topological Data Analysis (TDA). TDA is an area of research which has produced methods for studying point cloud data sets from a geometric point of view. Other data analysis techniques use "approximation by models" of various types. Examples of other data analysis techniques include regression methods which model data as a graph of a function in one or more variables. Unfortunately, certain qualitative properties (which one can readily observe when the data is two-dimensional) may be of a great deal of importance for understanding, and these features may not be readily represented within such models.

Figure 1A:
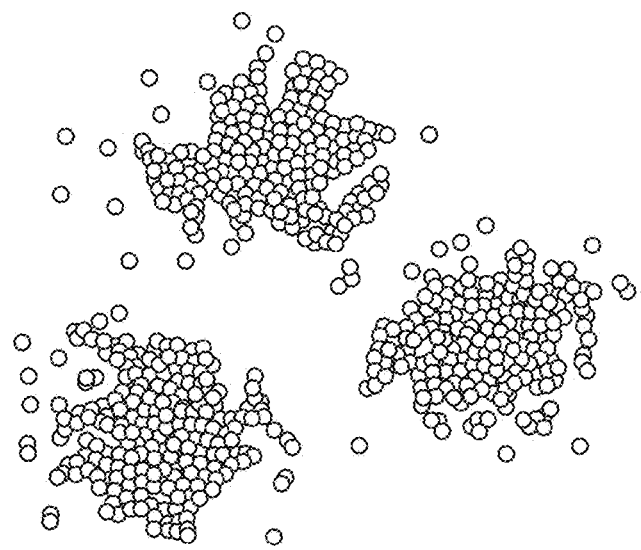
FIG. 1A is an example graph representing data that appears to be divided into three disconnected groups.

FIG. 1A is an example graph representing data that appears to be divided into three disconnected groups. In this example, the data for this graph may be associated with various physical characteristics related to different population groups or biomedical data related to different forms of a disease. Seeing that the data breaks into groups in this fashion can give insight into the data, once one understands what characterizes the groups.

Figure 1B:
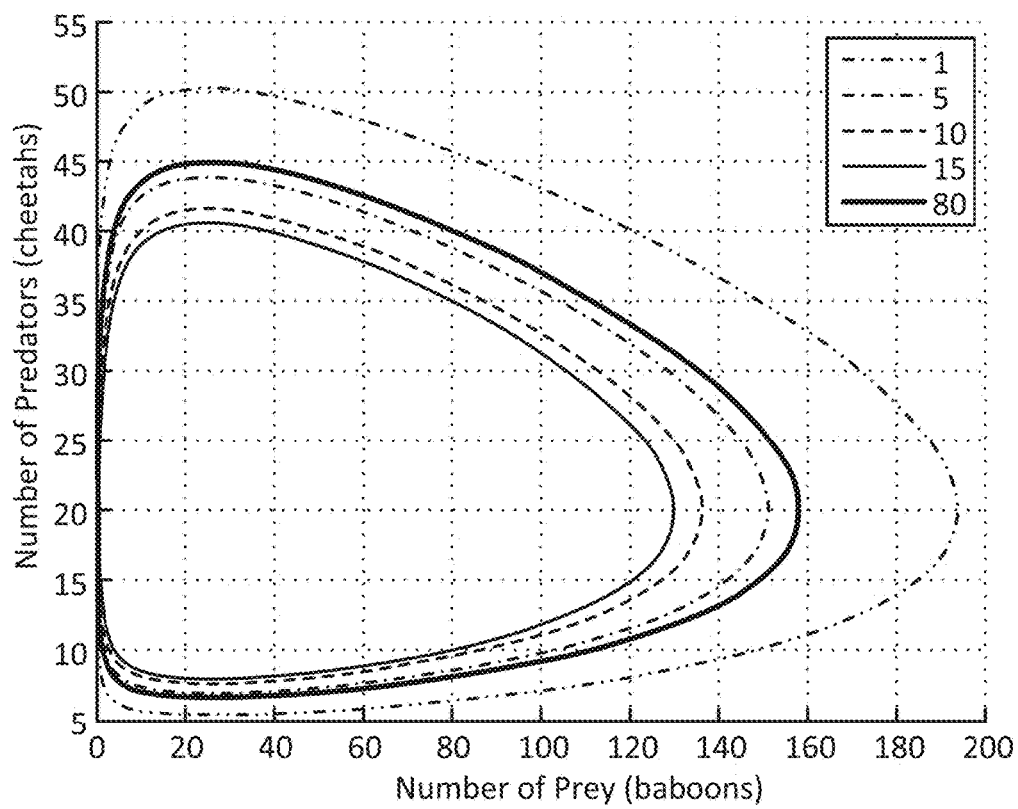
FIG. 1B is an example graph representing data set obtained from a Lotka-Volterra equation modeling the populations of predators and prey over time.

FIG. 1B is an example graph representing data set obtained from a Lotka-Volterra equation modeling the populations of predators and prey over time. From FIG. 1B, one observation about this data is that it is arranged in a loop. The loop is not exactly circular, but it is topologically a circle. The exact form of the equations, while interesting, may not be of as much importance as this qualitative observation which reflects the fact that the underlying phenomenon is recurrent or periodic. When looking for periodic or recurrent phenomena, methods may be developed which can detect the presence of loops without defining explicit models. For example, periodicity may be detectable without having to first develop a fully accurate model of the dynamics.

Figure 1C:
FIG. 1C is an example graph of data sets whereby the data does not break up into disconnected groups, but instead has a structure in which there are lines (or flares) emanating from a central group.

FIG. 1C is an example graph of data sets whereby the data does not break up into disconnected groups, but instead has a structure in which there are lines (or flares) emanating from a central group. In this case, the data also suggests the presence of three distinct groups, but the connectedness of the data does not reflect this. This particular data that is the basis for the example graph in FIG. 1C arises from a study of single nucleotide polymorphisms (SNPs).

In each of the examples above, aspects of the shape of the data are relevant in reflecting information about the data. Connectedness (the simplest property of shape) reflects the presence of a discrete classification of the data into disparate groups. The presence of loops, another simple aspect of shape, often reflect periodic or recurrent behavior. Finally, in the third example, the shape containing flares suggests a classification of the data descriptive of ways in which phenomena can deviate from the norm, which would typically be represented by the central core. These examples support the idea that the shape of data (suitably defined) is an important aspect of its structure, and that it is therefore important to develop methods for analyzing and understanding its shape. The part of mathematics which concerns itself with the study of shape is called topology, and topological data analysis attempts to adapt methods for studying shape which have been developed in pure mathematics to the study of the shape of data, suitably defined.

One question is how notions of geometry or shape are translated into information about point clouds, which are, after all, finite sets? What we mean by shape or geometry can come from a dissimilarity function or metric (e.g., a non-negative, symmetric, real-valued function d on the set of pairs of points in the data set which may also satisfy the triangle inequality, and $d(x; y)=0$ if and only if $x=y$). Such functions exist in profusion for many data sets. For example, when data comes in the form of a numerical matrix, where the rows correspond to the data points and the columns are the fields describing the data, the n-dimensional Euclidean distance function is natural when there are n fields. Similarly, in this example, there are Pearson correlation distances, cosine distances, and other choices.

When the data is not Euclidean, for example if one is considering genomic sequences, various notions of distance may be defined using measures of similarity based on Basic Local Alignment Search Tool (BLAST) type similarity scores. Further, a measure of similarity can come in non-numeric forms, such as social networks of friends or similarities of hobbies, buying patterns, tweeting, and/or professional interests. In any of these ways the notion of shape may be formulated via the establishment of a useful notion of similarity of data points.

One of the advantages of TDA is that TDA may depend on nothing more than such a notion, which is a very primitive or low-level model. TDA may rely on many fewer assumptions than standard linear or algebraic models, for example. Further, the methodology may provide new ways of visualizing and compressing data sets, which facilitate understanding and monitoring data. The methodology may enable study of interrelationships among disparate data sets and/or multiscale/multiresolution study of data sets. Moreover, the methodology may enable interactivity in the analysis of data, using point and click methods.

In some embodiments, TDA may be a very useful complement to more traditional methods, such as Principal Component Analysis (PCA), multidimensional scaling, and hierarchical clustering. These existing methods are often quite useful, but suffer from significant limitations. PCA, for example, is an essentially linear procedure and there are therefore limits to its utility in highly non-linear situations. Multidimensional scaling is a method which is not intrinsically linear, but can in many situations wash out detail, since it may overweight large distances. In addition, when metrics do not satisfy an intrinsic flatness condition, it may have difficulty in faithfully representing the data. Hierarchical clustering does exhibit multiscale behavior, but represents data only as disjoint clusters, rather than retaining any of the geometry of the data set. In all four cases, these limitations matter for many varied kinds of data.

We now summarize example properties of an example construction, in some embodiments, which may be used for representing the shape of data sets in a useful, understandable fashion as a finite graph:

The input may be a collection of data points equipped in some way with a distance or dissimilarity function, or other description. This can be given implicitly when the data is in the form of a matrix, or explicitly as a matrix of distances or even the generating edges of a mathematical network.

One construction may also use one or more lens functions (i.e. real valued functions on the data). Lens function(s) may depend directly on the metric. For example, lens function(s) might be the result of a density estimator or a measure of centrality or data depth. Lens function(s) may, in some embodiments, depend on a particular representation of the data, as when one uses the first one or two coordinates of a principal component or multidimensional scaling analysis. In some embodiments, the lens function(s) may be columns which expert knowledge identifies as being intrinsically interesting, as in cholesterol levels and BMI in a study of heart disease.

In some embodiments, the construction may depend on a choice of two or more processing parameters, resolution, and gain. Increase in resolution typically results in more nodes and an increase in the gain increases the number of edges in a visualization and/or graph in a reference space as further described herein.

The output may be, for example, a visualization (e.g., a display of connected nodes or "network") or simplicial complex. One specific combinatorial formulation in one embodiment may be that the vertices form a finite set, and then the additional structure may be a collection of edges (unordered pairs of vertices) which are pictured as connections in this network.

In various embodiments, a system for handling, analyzing, and visualizing data using drag and drop methods as opposed to text based methods is described herein. Philosophically, data analytic tools are not necessarily regarded as "solvers," but rather as tools for interacting with data. For example, data analysis may consist of several iterations of a process in which computational tools point to regions of interest in a data set. The data set may then be examined by people with domain expertise concerning the data, and the data set may then be subjected to further computational analysis. In some embodiments, methods described herein provide for going back and forth between mathematical constructs, including interactive visualizations (e.g., graphs), on the one hand and data on the other.

In one example of data analysis in some embodiments described herein, an exemplary clustering tool is discussed which may be more powerful than existing technology, in that one can find structure within clusters and study how clusters change over a period of time or over a change of scale or resolution.

An example interactive visualization tool (e.g., a visualization module which is further described herein) may produce combinatorial output in the form of a graph which can be readily visualized. In some embodiments, the example interactive visualization tool may be less sensitive to changes in notions of distance than current methods, such as multidimensional scaling.

Some embodiments described herein permit manipulation of the data from a visualization. For example, portions of the data which are deemed to be interesting from the visualization can be selected and converted into database objects, which can then be further analyzed. Some embodiments described herein permit the location of data points of interest within the visualization, so that the connection between a given visualization and the information the visualization represents may be readily understood.

Figure 2:
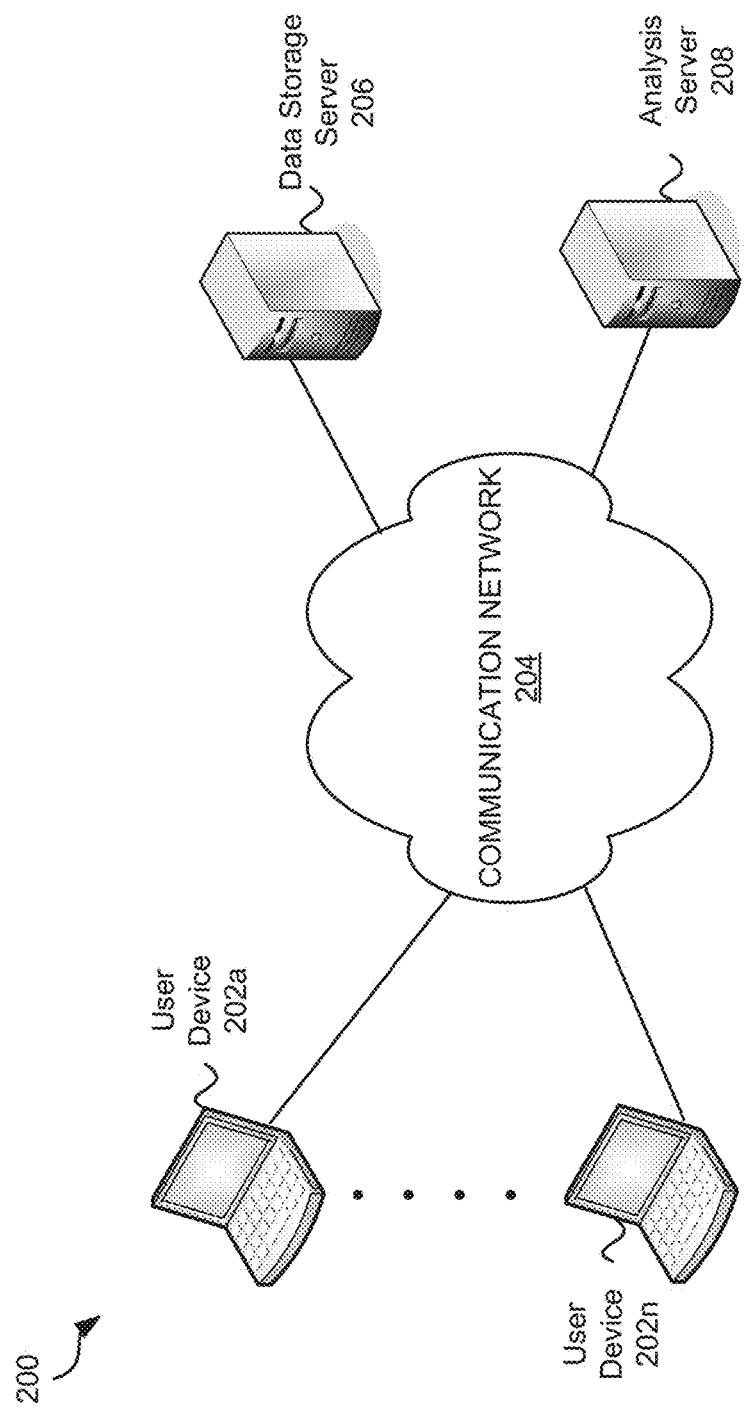
FIG. 2 is an example environment in which embodiments may be practiced.

FIG. 2 is an example environment 200 in which embodiments may be practiced. In various embodiments, data analysis and interactive visualization may be performed locally (e.g., with software and/or hardware on a local digital device), across a network (e.g., via cloud computing), or a combination of both. In many of these embodiments, a data structure is accessed to obtain the data for the analysis, the analysis is performed based on properties and parameters selected by a user, and an interactive visualization is generated and displayed. There are many advantages between performing all or some activities locally and many advantages of performing all or some activities over a network.

Environment 200 comprises user devices 202a-202n, a communication network 204, data storage server 206, and analysis server 208. Environment 200 depicts an embodiment wherein functions are performed across a network. In this example, the user(s) may take advantage of cloud computing by storing data in a data storage server 206 over a communication network 204. The analysis server 208 may perform analysis and generation of an interactive visualization.

User devices 202a-202n may be any digital devices. A digital device is any device that includes memory and a processor. Digital devices are further described in FIG. 18. The user devices 202a-202n may be any kind of digital device that may be used to access, analyze and/or view data including, but not limited to a desktop computer, laptop, notebook, or other computing device.

In various embodiments, a user, such as a data analyst, may generate and/or receive a database or other data structure with the user device 202a to be saved to the data storage server 206. The user device 202a may communicate with the analysis server 208 via the communication network 204 to perform analysis, examination, and visualization of data within the database.

The user device 202a may comprise any number of client programs. One or more of the client programs may interact with one or more applications on the analysis server 208. In other embodiments, the user device 202a may communicate with the analysis server 208 using a browser or other standard program. In various embodiments, the user device 202a communicates with the analysis server 208 via a virtual private network. Those skilled in the art will appreciate that that communication between the user device 202a, the data storage server 206, and/or the analysis server 208 may be encrypted or otherwise secured.

The communication network 204 may be any network that allows digital devices to communicate. The communication network 204 may be the Internet and/or include LAN and WANs. The communication network 204 may support wireless and/or wired communication.

The data storage server 206 is a digital device that is configured to store data. In various embodiments, the data storage server 206 stores databases and/or other data structures. The data storage server 206 may be a single server or a combination of servers. In one example the data storage server 206 may be a secure server wherein a user may store data over a secured connection (e.g., via https). The data may be encrypted and backed-up. In some embodiments, the data storage server 206 is operated by a third-party such as Amazon's S3 service.

The database or other data structure may comprise large high-dimensional datasets. These datasets are traditionally very difficult to analyze and, as a result, relationships within the data may not be identifiable using previous methods. Further, previous methods may be computationally inefficient.

The analysis server 208 may include any number of digital devices configured to analyze data (e.g., the data in the stored database and/or other dataset received and/or generated by the user device 202a). Although only one digital device is depicted in FIG. 2 corresponding to the analysis server 208, it will be appreciated that any number of functions of the analysis server 208 may be performed by any number of digital devices.

In various embodiments, the analysis server 208 may perform many functions to interpret, examine, analyze, and display data and/or relationships within data. In some embodiments, the analysis server 208 performs, at least in part, topological analysis of large datasets applying metrics, filters, and resolution parameters chosen by the user. The analysis is further discussed regarding FIG. 8 herein.

The analysis server 208 may generate graphs in memory, visualized graphs, and/or an interactive visualization of the output of the analysis. The interactive visualization allows the user to observe and explore relationships in the data. In various embodiments, the interactive visualization allows the user to select nodes comprising data that has been clustered. The user may then access the underlying data, perform further analysis (e.g., statistical analysis) on the underlying data, and manually reorient the graph(s) (e.g., structures of nodes and edges described herein) within the interactive visualization. The analysis server 208 may also allow for the user to interact with the data, see the graphic result. The interactive visualization is further discussed in FIGS. 9-11.

The graphs in memory and/or visualized graphs may also include nodes and/or edges as described herein. Graphs that are generated in memory may not be depicted to a user but rather may be in memory of a digital device. Visualized graphs are rendered graphs that may be depicted to the user (e.g., using user device 202a).

In some embodiments, the analysis server 208 interacts with the user device(s) 202a-202n over a private and/or secure communication network. The user device 202a may include a client program that allows the user to interact with the data storage server 206, the analysis server 208, another user device (e.g., user device 202n), a database, and/or an analysis application executed on the analysis server 208.

It will be appreciated that all or part of the data analysis may occur at the user device 202a. Further, all or part of the interaction with the visualization (e.g., graphic) may be performed on the user device 202a. Alternately, all or part of the data analysis may occur on any number of digital devices including, for example, on the analysis server 208.

Although two user devices 202a and 202n are depicted, those skilled in the art will appreciate that there may be any number of user devices in any location (e.g., remote from each other). Similarly, there may be any number of communication networks, data storage servers, and analysis servers.

Cloud computing may allow for greater access to large datasets (e.g., via a commercial storage service) over a faster connection. Further, those skilled in the art will appreciate that services and computing resources offered to the user(s) may be scalable.

Figure 3:
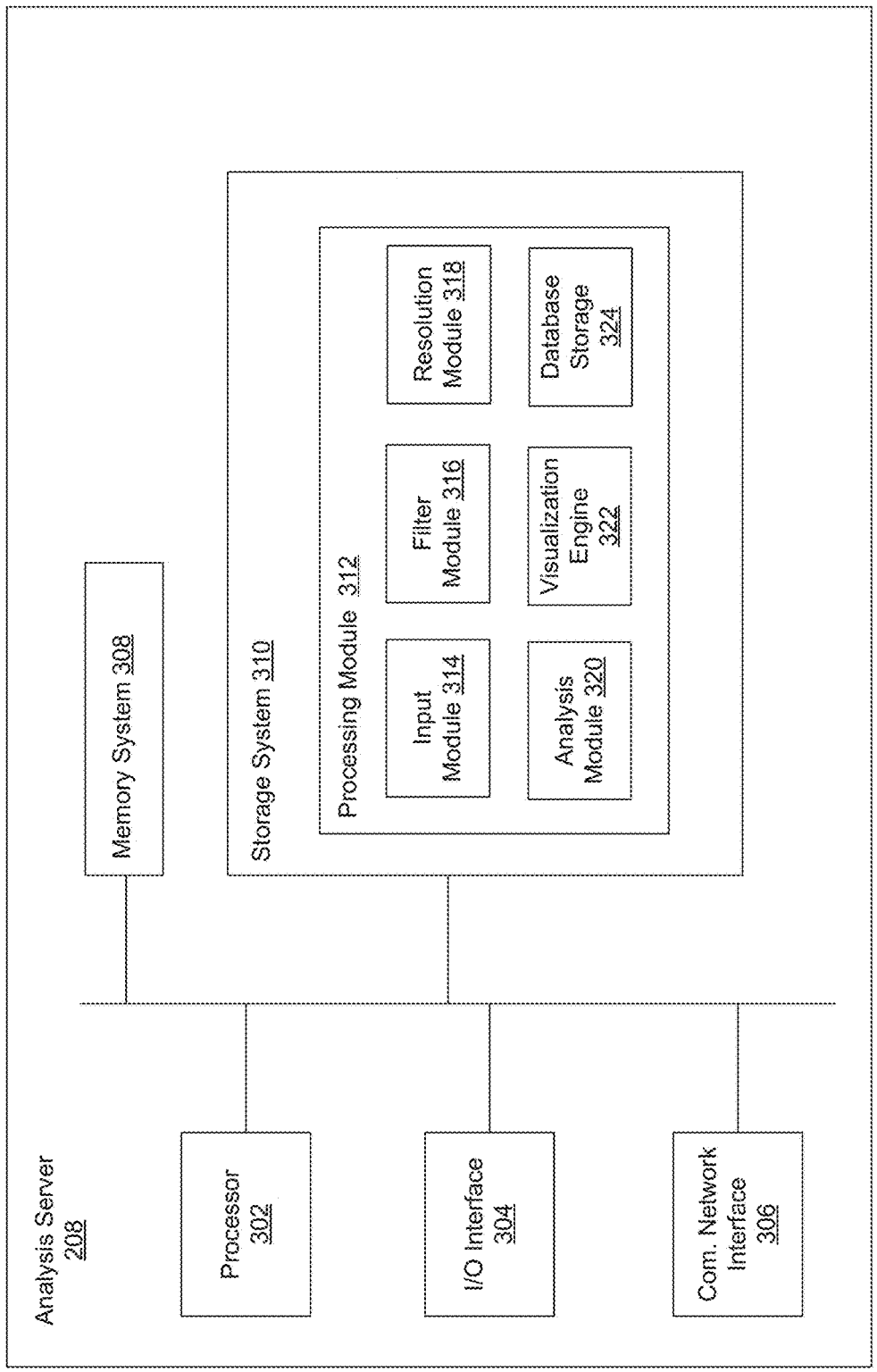
FIG. 3 is a block diagram of an example analysis server.

FIG. 3 is a block diagram of an example analysis server 208. In some embodiments, the analysis server 208 comprises a processor 302, input/output (I/O) interface 304, a communication network interface 306, a memory system 308, a storage system 310, and a processing module 312. The processor 302 may comprise any processor or combination of processors with one or more cores.

The input/output (I/O) interface 304 may comprise interfaces for various I/O devices such as, for example, a keyboard, mouse, and display device. The example communication network interface 306 is configured to allow the analysis server 208 to communication with the communication network 204 (see FIG. 2). The communication network interface 306 may support communication over an Ethernet connection, a serial connection, a parallel connection, and/or an ATA connection. The communication network interface 306 may also support wireless communication (e.g., 802.11 a/b/g/n, WiMax, LTE, WiFi). It will be apparent to those skilled in the art that the communication network interface 306 can support many wired and wireless standards.

The memory system 308 may be any kind of memory including RAM, ROM, or flash, cache, virtual memory, etc. In various embodiments, working data is stored within the memory system 308. The data within the memory system 308 may be cleared or ultimately transferred to the storage system 310.

The storage system 310 includes any storage configured to retrieve and store data. Some examples of the storage system 310 include flash drives, hard drives, optical drives, and/or magnetic tape. Each of the memory system 308 and the storage system 310 comprises a non-transitory computer-readable medium, which stores instructions (e.g., software programs) executable by processor 302.

The storage system 310 comprises a plurality of modules utilized by embodiments of discussed herein. A module may be hardware, software (e.g., including instructions executable by a processor), or a combination of both. In one embodiment, the storage system 310 includes a processing module 312. The processing module 312 may include memory and/or hardware and includes an input module 314, a filter module 316, a resolution module 318, an analysis module 320, a visualization engine 322, and database storage 324. Alternative embodiments of the analysis server 208 and/or the storage system 310 may comprise more, less, or functionally equivalent components and modules.

The input module 314 may be configured to receive commands and preferences from the user device 202a. In various examples, the input module 314 receives selections from the user which will be used to perform the analysis. The output of the analysis may be an interactive visualization.

The input module 314 may provide the user a variety of interface windows allowing the user to select and access a database, choose fields associated with the database, choose a metric, choose one or more filters, and identify resolution parameters for the analysis. In one example, the input module 314 receives a database identifier and accesses a large multidimensional database. The input module 314 may scan the database and provide the user with an interface window allowing the user to identify an ID field. An ID field is an identifier for each data point. In one example, the identifier is unique. The same column name may be present in the table from which filters are selected. After the ID field is selected, the input module 314 may then provide the user with another interface window to allow the user to choose one or more data fields from a table of the database.

Although interactive windows may be described herein, those skilled in the art will appreciate that any window, graphical user interface, and/or command line may be used to receive or prompt a user or user device 202a for information.

The filter module 316 may subsequently provide the user with an interface window to allow the user to select a metric to be used in analysis of the data within the chosen data fields. The filter module 316 may also allow the user to select and/or define one or more filters.

The resolution module 318 may allow the user to select a resolution, including filter parameters. In one example, the user enters a number of intervals and a percentage overlap for a filter.

The analysis module 320 may perform data analysis based on the database and the information provided by the user. In various embodiments, the analysis module 320 performs an algebraic topological analysis to identify structures and relationships within data and clusters of data. Those skilled in the art will appreciate that the analysis module 320 may use parallel algorithms or use generalizations of various statistical techniques (e.g., generalizing the bootstrap to zig-zag methods) to increase the size of data sets that can be processed. The analysis is further discussed herein (e.g., see discussion regarding FIG. 8). It will be appreciated that the analysis module 320 is not limited to algebraic topological analysis but may perform any analysis.

The visualization engine 322 generates an interactive visualization based on the output from the analysis module 320. The interactive visualization allows the user to see all or part of the analysis graphically. The interactive visualization also allows the user to interact with the visualization. For example, the user may select portions of a graph from within the visualization to see and/or interact with the underlying data and/or underlying analysis. The user may then change the parameters of the analysis (e.g., change the metric, filter(s), or resolution(s)) which allows the user to visually identify relationships in the data that may be otherwise undetectable using prior means. The interactive visualization is further described herein (e.g., see discussion regarding FIGS. 9-11).

The database storage 324 is configured to store all or part of the database that is being accessed. In some embodiments, the database storage 324 may store saved portions of the database. Further, the database storage 324 may be used to store user preferences, parameters, and analysis output thereby allowing the user to perform many different functions on the database without losing previous work.

Those skilled in the art will appreciate that that all or part of the processing module 312 may be at the user device 202a or the database storage server 206. In some embodiments, all or some of the functionality of the processing module 312 may be performed by the user device 202a.

In various embodiments, systems and methods discussed herein may be implemented with one or more digital devices. In some examples, some embodiments discussed herein may be implemented by a computer program (instructions) executed by a processor. The computer program may provide a graphical user interface. Although such a computer program is discussed, those skilled in the art will appreciate that embodiments may be performed using any of the following, either alone or in combination, including, but not limited to, a computer program, multiple computer programs, firmware, and/or hardware.

A module and/or engine may include any processor or combination of processors. In some examples, a module and/or engine may include or be a part of a processor, digital signal processor (DSP), application specific integrated circuit (ASIC), an integrated circuit, and/or the like. In various embodiments, the module and/or engine may be software or firmware.

Figure 4:
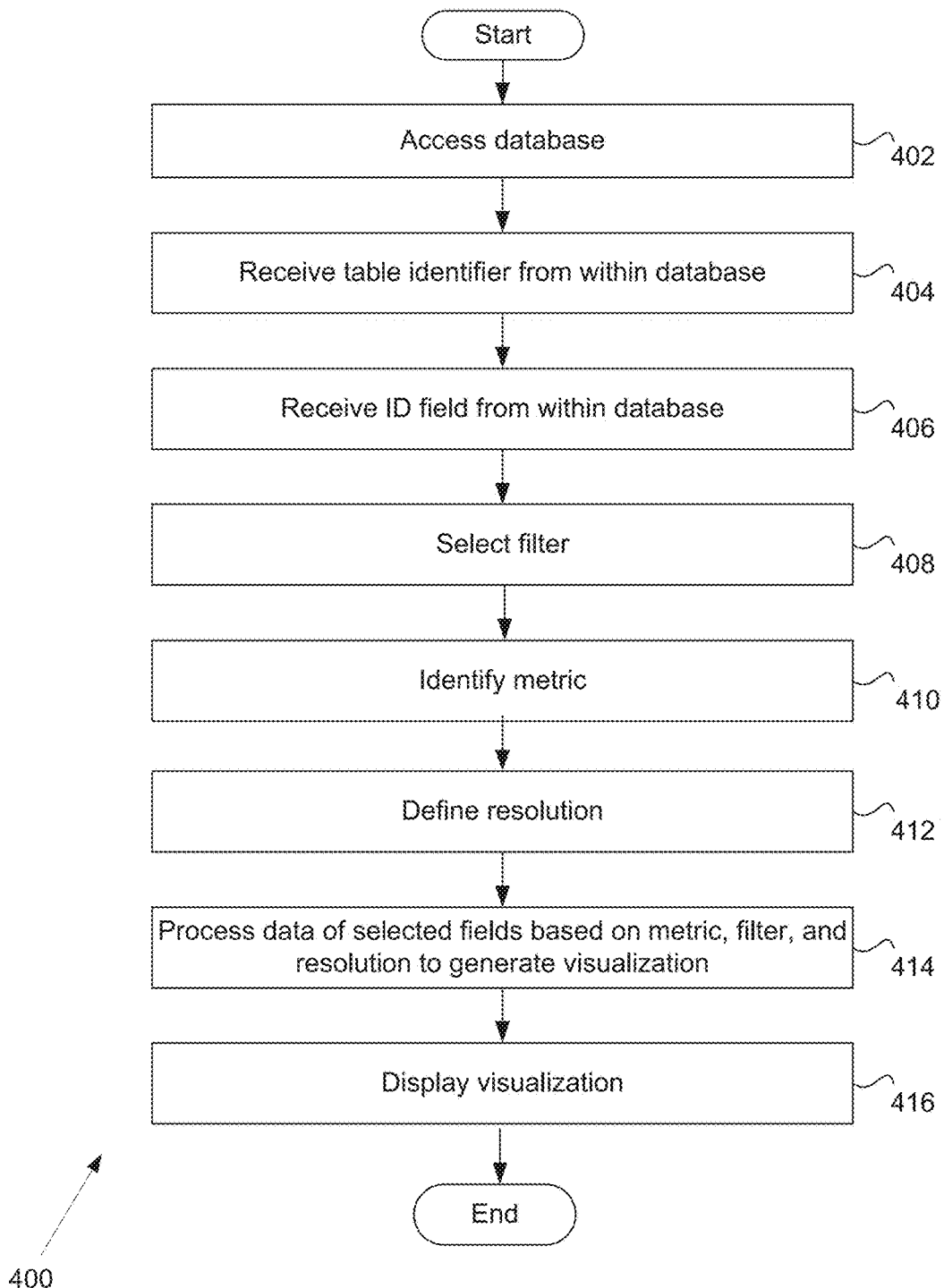
FIG. 4 is a flow chart depicting an example method of dataset analysis and visualization in some embodiments.

FIG. 4 is a flow chart 400 depicting an example method of dataset analysis and visualization in some embodiments. In step 402, the input module 314 accesses a database. The database may be any data structure containing data (e.g., a very large dataset of multidimensional data). In some embodiments, the database may be a relational database. In some examples, the relational database may be used with MySQL, Oracle, Microsoft SQL Server, Aster nCluster, Teradata, and/or Vertica. Those skilled in the art will appreciate that the database may not be a relational database.

In some embodiments, the input module 314 receives a database identifier and a location of the database (e.g., the data storage server 206) from the user device 202a (see FIG. 2). The input module 314 may then access the identified database. In various embodiments, the input module 314 may read data from many different sources, including, but not limited to MS Excel files, text files (e.g., delimited or CSV), Matlab.mat format, or any other file.

In some embodiments, the input module 314 receives an IP address or hostname of a server hosting the database, a username, password, and the database identifier. This information (herein referred to as "connection information") may be cached for later use. It will be appreciated that the database may be locally accessed and that all, some, or none of the connection information may be required. In one example, the user device 202a may have full access to the database stored locally on the user device 202a so the IP address is unnecessary. In another example, the user device 202a may already have loaded the database and the input module 314 merely begins by accessing the loaded database.

In various embodiments, the identified database stores data within tables. A table may have a "column specification" which stores the names of the columns and their data types.

A "row" in a table, may be a tuple with one entry for each column of the correct type. In one example, a table to store employee records might have a column specification such as:

employee_id primary key int (this may store the employee's ID as an integer, and uniquely identifies a row)
    age int
    gender char(1) (gender of the employee may be a single character either M or F)
    salary double (salary of an employee may be a floating point number)
    name varchar (name of the employee may be a variable-length string)

In this example, each employee corresponds to a row in this table. Further, the tables in this example relational database are organized into logical units called databases. An analogy to file systems is that databases can be thought of as folders and files as tables. Access to databases may be controlled by the database administrator by assigning a username/password pair to authenticate users.

Once the database is accessed, the input module 314 may allow the user to access a previously stored analysis or to begin a new analysis. If the user begins a new analysis, the input module 314 may provide the user device 202a with an interface window allowing the user to identify a table from within the database. In one example, the input module 314 provides a list of available tables from the identified database.

In step 404, the input module 314 receives a table identifier identifying a table from within the database. The input module 314 may then provide the user with a list of available ID fields from the table identifier. In step 406, the input module 314 receives the ID field identifier from the user and/or user device 202a. The ID field is, in some embodiments, the primary key.

Having selected the primary key, the input module 314 may generate a new interface window to allow the user to select data fields for analysis. In step 408, the input module 314 receives data field identifiers from the user device 202a. The data within the data fields may be later analyzed by the analysis module 320.

In step 408, the filter module 316 selects one or more filters. In some embodiments, the filter module 316 and/or the input module 314 generates an interface window allowing the user of the user device 202a options for a variety of different metrics and filter preferences. The interface window may be a drop down menu identifying a variety of distance metrics to be used in the analysis.

In some embodiments, the user selects and/or provides filter identifier(s) to the filter module 316. The role of the filters in the analysis is also further described herein. The filters, for example, may be user defined, geometric, or based on data which has been pre-processed. In some embodiments, the data based filters are numerical arrays which can assign a set of real numbers to each row in the table or each point in the data generally.

A variety of geometric filters may be available for the user to choose. Geometric filters may include, but are not limited to:
  Density
  L1 Eccentricity
  L-infinity Eccentricity
  Witness based Density
  Witness based Eccentricity
  Eccentricity as distance from a fixed point
  Approximate Kurtosis of the Eccentricity In step 410, the filter module 316 identifies a metric. Metric options may include, but are not limited to, Euclidean, DB Metric, variance normalized Euclidean, and total normalized Euclidean. The metric and the analysis are further described herein.

In step 412, the resolution module 318 defines the resolution to be used with a filter in the analysis. The resolution may comprise a number of intervals and an overlap parameter. In various embodiments, the resolution module 318 allows the user to adjust the number of intervals and overlap parameter (e.g., percentage overlap) for one or more filters.

In step 414, the analysis module 320 processes data of selected fields based on the metric, filter(s), and resolution(s) to generate the visualization. This process is further discussed herein (e.g., see discussion regarding FIG. 8).

In step 416, the visualization engine 322 displays the interactive visualization. In various embodiments, the visualization may be rendered in two or three dimensional space. The visualization engine 322 may use an optimization algorithm for an objective function which is correlated with good visualization (e.g., the energy of the embedding). The visualization may show a collection of nodes corresponding to each of the partial clusters in the analysis output and edges connecting them as specified by the output. The interactive visualization is further discussed herein (e.g., see discussion regarding FIGS. 9-11).

Although many examples discuss the input module 314 as providing interface windows, it will be appreciated that all or some of the interface may be provided by a client on the user device 202a. Further, in some embodiments, the user device 202a may be running all or some of the processing module 312.

Figure 5:
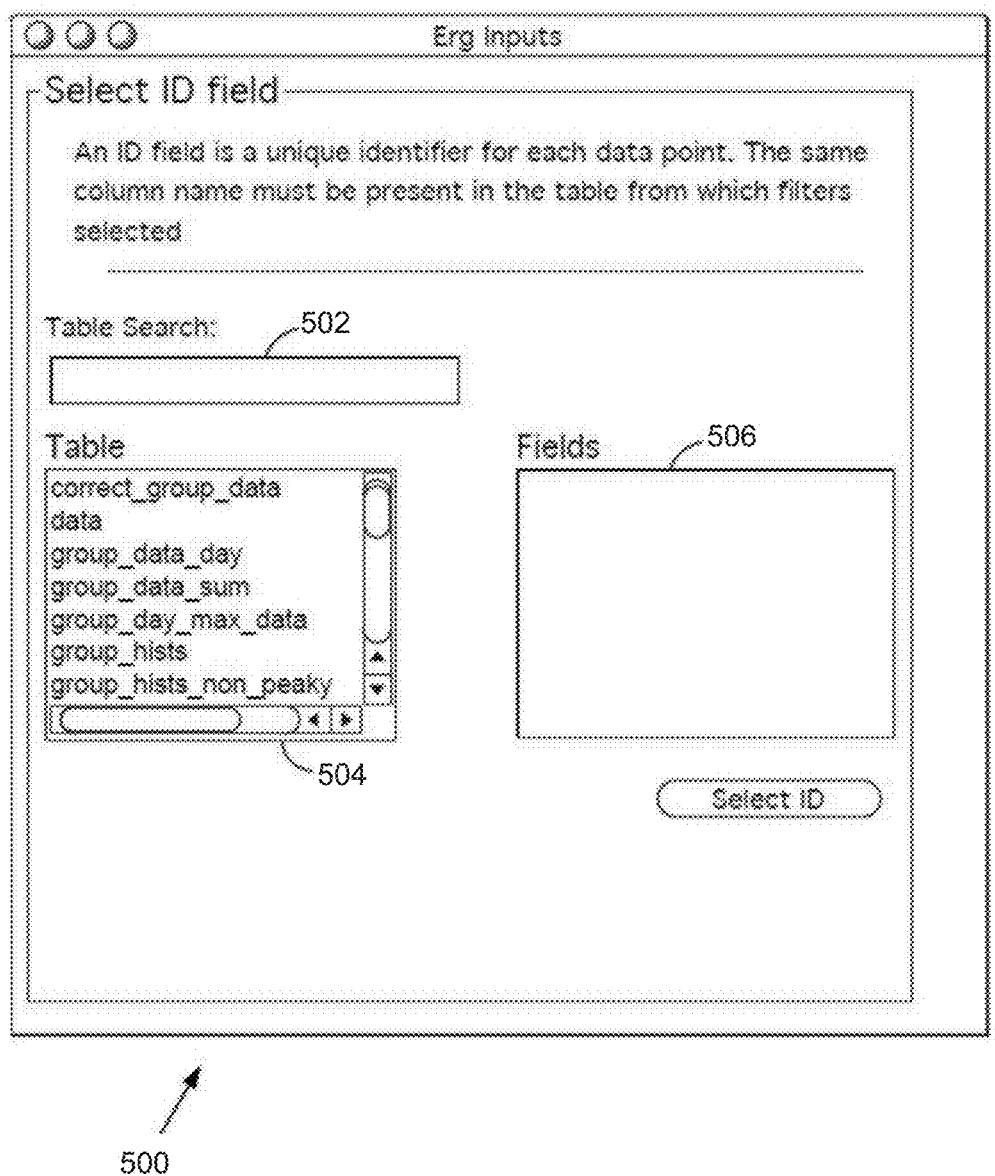
FIG. 5 is an example ID field selection interface window in some embodiments.
Figure 6A:
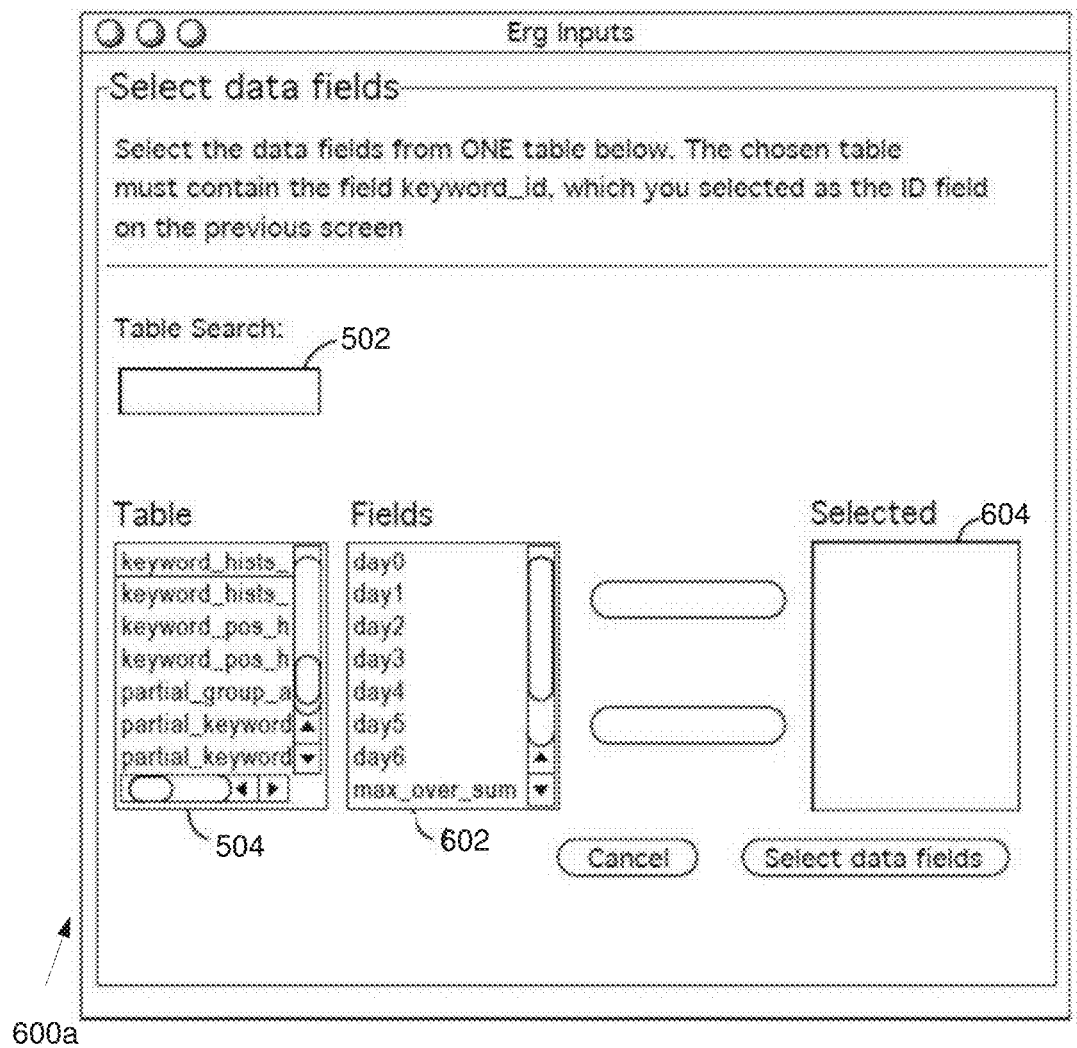
FIG. 6A is an example data field selection interface window in some embodiments.
Figure 6B:
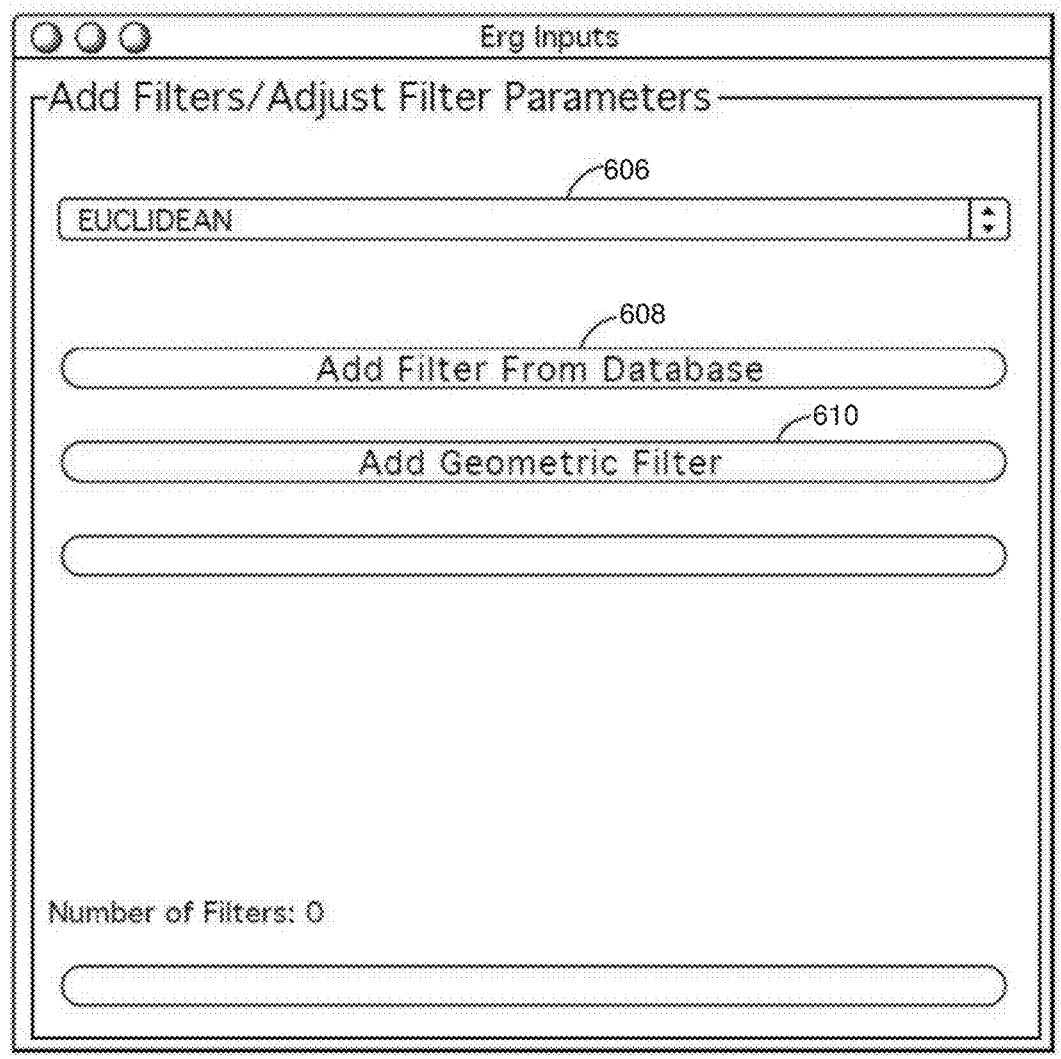
FIG. 6B is an example metric and filter selection interface window in some embodiments.
Figure 7:
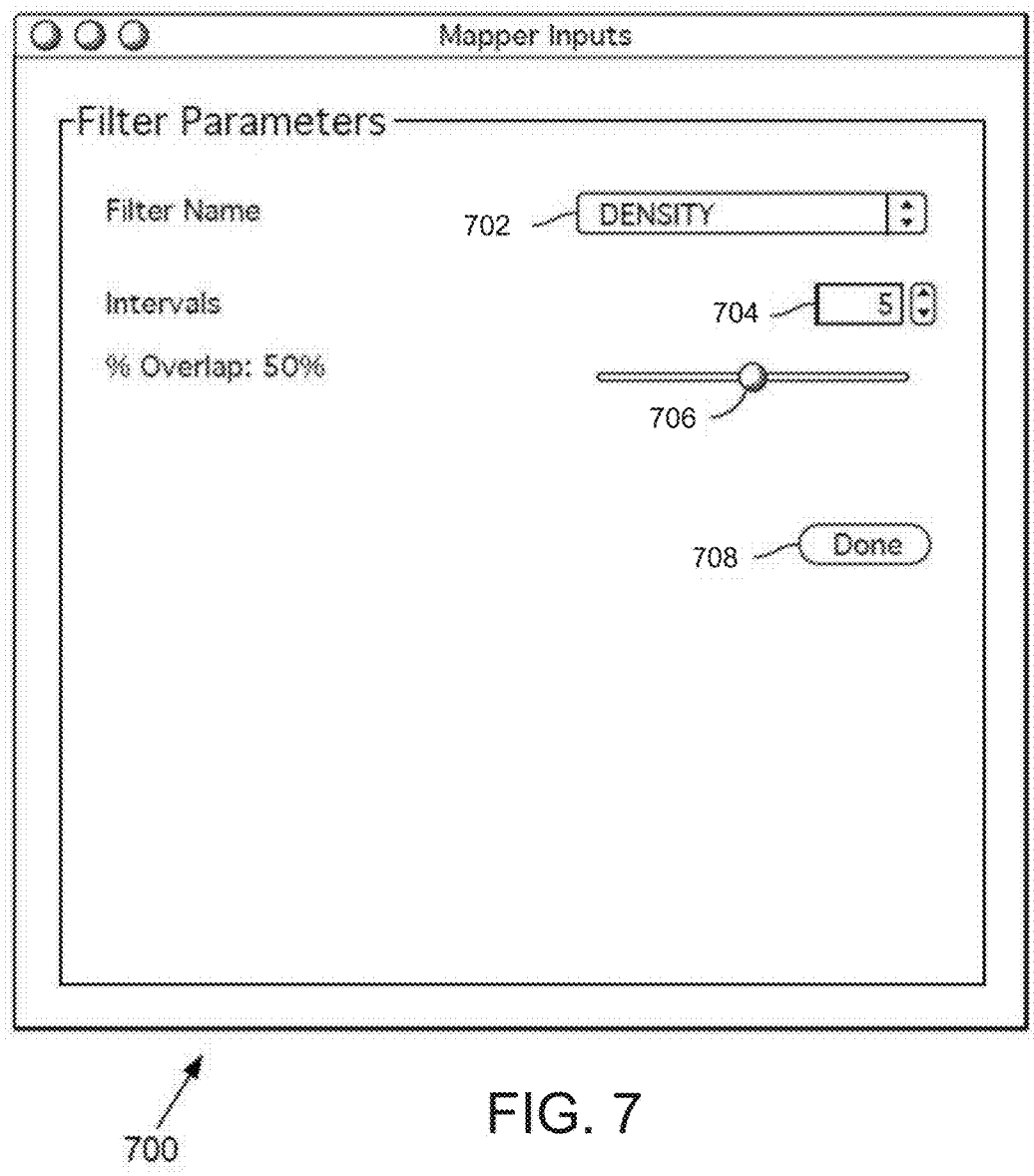
FIG. 7 is an example filter parameter interface window in some embodiments.

FIGS. 5-7 depict various interface windows to allow the user to make selections, enter information (e.g., fields, metrics, and filters), provide parameters (e.g., resolution), and provide data (e.g., identify the database) to be used with analysis. It will be appreciated that any graphical user interface or command line may be used to make selections, enter information, provide parameters, and provide data.

FIG. 5 is an exemplary ID field selection interface window 500 in some embodiments. The ID field selection interface window 500 allows the user to identify an ID field. The ID field selection interface window 500 comprises a table search field 502, a table list 504, and a fields selection window 506.

In various embodiments, the input module 314 identifies and accesses a database from the database storage 324, user device 202a, or the data storage server 206. The input module 314 may then generate the ID field selection interface window 500 and provide a list of available tables of the selected database in the table list 504. The user may click on a table or search for a table by entering a search query (e.g., a keyword) in the table search field 502. Once a table is identified (e.g., clicked on by the user), the fields selection window 506 may provide a list of available fields in the selected table. The user may then choose a field from the fields selection window 506 to be the ID field. In some embodiments, any number of fields may be chosen to be the ID field(s).

FIG. 6A is an example data field selection interface window 600a in some embodiments. The data field selection interface window 600a allows the user to identify data fields. The data field selection interface window 600a comprises a table search field 502, a table list 504, a fields selection window 602, and a selected window 604.

In various embodiments, after selection of the ID field, the input module 314 provides a list of available tables of the selected database in the table list 504. The user may click on a table or search for a table by entering a search query (e.g., a keyword) in the table search field 502. Once a table is identified (e.g., clicked on by the user), the fields selection window 506 may provide a list of available fields in the selected table. The user may then choose any number of fields from the fields selection window 602 to be data fields. The selected data fields may appear in the selected window 604. The user may also deselect fields that appear in the selected window 604.

Those skilled in the art will appreciate that the table selected by the user in the table list 504 may be the same table selected with regard to FIG. 5. In some embodiments, however, the user may select a different table. Further, the user may, in various embodiments, select fields from a variety of different tables.

FIG. 6B is an example metric and filter selection interface window 600b in some embodiments. The metric and filter selection interface window 600b allows the user to identify a metric, add filter(s), and adjust filter parameters. The metric and filter selection interface window 600b comprises a metric pull down menu 606, an add filter from database button 608, and an add geometric filter button 610.

In various embodiments, the user may click on the metric pull down menu 606 to view a variety of metric options. Various metric options are described herein. In some embodiments, the user may define a metric. The user defined metric may then be used with the analysis.

In one example, finite metric space data may be constructed from a data repository (i.e., database, spreadsheet, or Matlab file). This may mean selecting a collection of fields whose entries will specify the metric using the standard Euclidean metric for these fields, when they are floating point or integer variables. Other notions of distance, such as graph distance between collections of points, may be supported.

The analysis module 320 may perform analysis using the metric as a part of a distance function. The distance function can be expressed by a formula, a distance matrix, or other routine which computes it. The user may add a filter from a database by clicking on the add filter from database button 608. The metric space may arise from a relational database, a Matlab file, an Excel spreadsheet, or other methods for storing and manipulating data. The metric and filter selection interface window 600*b* may allow the user to browse for other filters to use in the analysis. The analysis and metric function are further described herein (e.g., see discussion regarding FIG. 8).

The user may also add a geometric filter 610 by clicking on the add geometric filter button 610. In various embodiments, the metric and filter selection interface window 600*b* may provide a list of geometric filters from which the user may choose.

FIG. 7 is an example filter parameter interface window 700 in some embodiments.

The filter parameter interface window 700 allows the user to determine a resolution for one or more selected filters (e.g., filters selected in the metric and filter selection interface window 600). The filter parameter interface window 700 comprises a filter name menu 702, an interval field 704, an overlap bar 706, and a done button 708.

The filter parameter interface window 700 allows the user to select a filter from the filter name menu 702. In some embodiments, the filter name menu 702 is a drop down box indicating all filters selected by the user in the metric and filter selection interface window 600. Once a filter is chosen, the name of the filter may appear in the filter name menu 702. The user may then change the intervals and overlap for one, some, or all selected filters.

The interval field 704 allows the user to define a number of intervals for the filter identified in the filter name menu 702. The user may enter a number of intervals or scroll up or down to get to a desired number of intervals. Any number of intervals may be selected by the user. The function of the intervals is further discussed herein (e.g., see discussion regarding FIG. 8).

The overlap bar 706 allows the user to define the degree of overlap of the intervals for the filter identified in the filter name menu 702. In one example, the overlap bar 706 includes a slider that allows the user to define the percentage overlap for the interval to be used with the identified filter. Any percentage overlap may be set by the user.

Once the intervals and overlap are defined for the desired filters, the user may click the done button. The user may then go back to the metric and filter selection interface window 600 and see a new option to run the analysis. In some embodiments, the option to run the analysis may be available in the filter parameter interface window 700. Once the analysis is complete, the result may appear in an interactive visualization further described herein (e.g., see discussion regarding FIGS. 9-11).

It will be appreciated that interface windows in FIGS. 4-7 are examples. The example interface windows are not limited to the functional objects (e.g., buttons, pull down menus, scroll fields, and search fields) shown. Any number of different functional objects may be used. Further, as described herein, any other interface, command line, or graphical user interface may be used.

Figure 8:
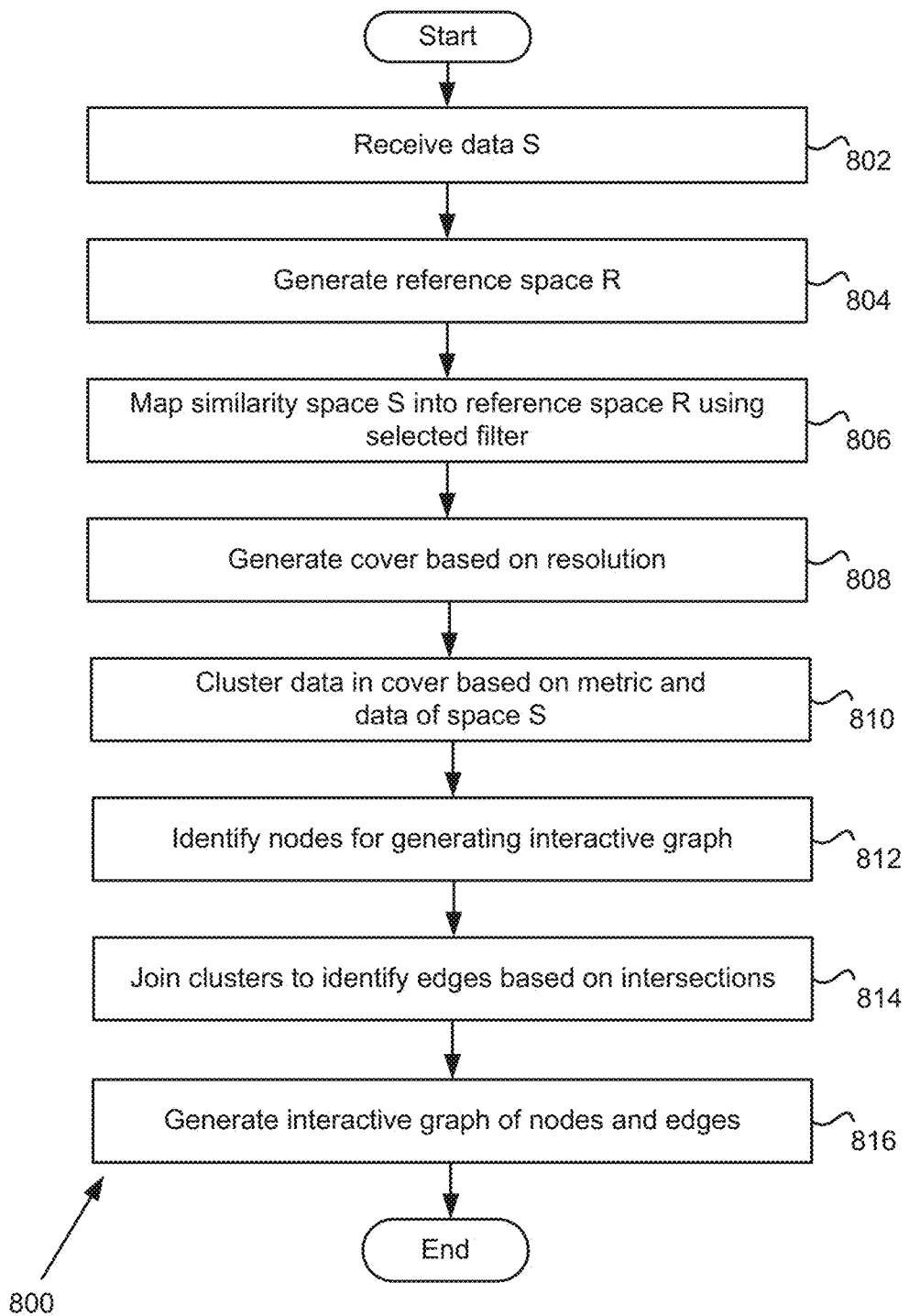
FIG. 8 is a flowchart for data analysis and generating a visualization in some embodiments.

FIG. 8 is a flowchart 800 for data analysis and generating an interactive visualization in some embodiments. In various embodiments, the processing on data and user-specified options is motivated by techniques from topology and, in some embodiments, algebraic topology. These techniques may be robust and general. In one example, these techniques apply to almost any kind of data for which some qualitative idea of "closeness" or "similarity" exists. The techniques discussed herein may be robust because the results may be relatively insensitive to noise in the data and even to errors in the specific details of the qualitative measure of similarity, which, in some embodiments, may be generally refer to as "the distance function" or "metric." It will be appreciated that while the description of the algorithms below may seem general, the implementation of techniques described herein may apply to any level of generality.

In step 802, the input module 314 receives data S. In one example, a user identifies a data structure and then identifies ID and data fields. Data S may be based on the information within the ID and data fields. In various embodiments, data S is treated as being processed as a finite "similarity space," where data S has a real-valued function d defined on pairs of points s and t in S, such that:

$d(s,s)=0$ $d(s,t)=d(t,s)$ $d(s,t)\geq 0$

These conditions may be similar to requirements for a finite metric space, but the conditions may be weaker. In various examples, the function is a metric.

It will be appreciated that data S may be a finite metric space, or a generalization thereof, such as a graph or weighted graph. In some embodiments, data S be specified by a formula, an algorithm, or by a distance matrix which specifies explicitly every pairwise distance.

In step 804, the input module 314 generates reference space R. In one example, reference space R may be a well-known metric space (e.g., such as the real line). The reference space R may be defined by the user. In step 806, the analysis module 320 generates a map ref( ) from S into R. The map ref( ) from S into R may be called the "reference map."

In one example, a reference of map from S is to a reference metric space R. R may be Euclidean space of some dimension, but it may also be the circle, torus, a tree, or other metric space. The map can be described by one or more filters (i.e., real valued functions on S). These filters can be defined by geometric invariants, such as the output of a density estimator, a notion of data depth, or functions specified by the origin of S as arising from a data set.

In step 808, the resolution module 318 generates a cover of R based on the resolution received from the user (e.g., filter(s), intervals, and overlap—see discussion regarding FIG. 7 for example). The cover of R may be a finite collection of open sets (in the metric of R) such that every point in R lies in at least one of these sets. In various examples, R is k-dimensional Euclidean space, where k is the number of filter functions. More precisely in this example, R is a box in k-dimensional Euclidean space given by the product of the intervals [min_k, max_k], where min_k is the minimum value of the k-th filter function on S, and max_k is the maximum value.

For example, suppose there are 2 filter functions, F1 and F2, and that F1's values range from −1 to +1, and F2's values range from 0 to 5. Then the reference space is the rectangle in the x/y plane with corners (−1,0), (1,0), (−1, 5), (1, 5), as every point s of S will give rise to a pair (F 1 (s), F2 (s)) that lies within that rectangle.

In various embodiments, the cover of R is given by taking products of intervals of the covers of [min_k,max_k] for each of the k filters. In one example, if the user requests 2 intervals and a 50% overlap for F1, the cover of the interval [−1,+1] will be the two intervals (−1.5, 0.5), (−0.5, 1.5). If the user requests 5 intervals and a 30% overlap for F2, then that cover of [0, 5] will be (−0.3, 1.3), (0.7, 2.3), (1.7, 3.3), (2.7, 4.3), (3.7, 5.3). These intervals may give rise to a cover of the 2-dimensional box by taking all possible pairs of intervals where the first of the pair is chosen from the cover for F1 and the second from the cover for F2. This may give rise to 2*5, or 10, open boxes that covered the 2-dimensional reference space. However, those skilled in the art will appreciate that the intervals may not be uniform, or that the covers of a k-dimensional box may not be constructed by products of intervals. In some embodiments, there are many other choices of intervals. Further, in various embodiments, a wide range of covers and/or more general reference spaces may be used.

In one example, given a cover, $C_1, \ldots, C_m$, of R, the reference map is used to assign a set of indices to each point in S, which are the indices of the $C_j$ such that ref(s) belongs to $C_j$. This function may be called ref_tags(s). In a language such as Java, ref_tags would be a method that returned an int[]. Since the C's cover R in this example, ref(s) must lie in at least one of them, but the elements of the cover usually overlap one another, which means that points that "land near the edges" may well reside in multiple cover sets. In considering the two filter example, if F1 (s) is −0.99, and F2 (s) is 0.001, then ref(s) is (−0.99, 0.001), and this lies in the cover element (−1.5, 0.5)×(−0.3,1.3). Supposing that was labeled $C_1$, the reference map may assign s to the set {1}. On the other hand, if t is mapped by F1, F2 to (0.1, 2.1), then ref(t) will be in (−1.5, 0.5)×(0.7, 2.3), (−0.5, 1.5)×(0.7, 2.3), (−1.5, 0.5)×(1.7, 3.3), and (−0.5, 1.5)×(1.7, 3.3), so the set of indices would have four elements for t.

Having computed, for each point, which "cover tags" it is assigned to, for each cover element, $C_d$, the points may be constructed, whose tags included, as set S(d). This may mean that every point s is in S(d) for some d, but some points may belong to more than one such set. In some embodiments, there is, however, no requirement that each S(d) is non-empty, and it is frequently the case that some of these sets are empty. In the non-parallelized version of some embodiments, each point x is processed in turn, and x is inserted into a hash-bucket for each j in ref_tags(t) (that is, this may be how S(d) sets are computed).

It will be appreciated that the cover of the reference space R may be controlled by the number of intervals and the overlap identified in the resolution (e.g., see further discussion regarding FIG. 7). For example, the finer the resolution in S—that is, the fewer points in each S(d), but the more similar (with respect to the filters) these points may be. The greater the overlap, the more times that clusters in S(d) may intersect clusters in S(e)—this means that more "relationships" between points may appear, but, in some embodiments, the greater the overlap, the more likely that accidental relationships may appear.

In step 810, the analysis module 320 clusters each S(d) based on the metric, filter, and the space S. In some embodiments, a dynamic single-linkage clustering algorithm may be used to partition S(d). It will be appreciated that any number of clustering algorithms may be used with embodiments discussed herein. For example, the clustering scheme may be k-means clustering for some k, single linkage clustering, average linkage clustering, or any method specified by the user.

The significance of the user-specified inputs may now be seen. In some embodiments, a filter may amount to a "forced stretching" in a certain direction. In some embodiments, the analysis module 320 may not cluster two points unless ALL of the filter values are sufficiently "related" (recall that while normally related may mean "close," the cover may impose a much more general relationship on the filter values, such as relating two points s and t if ref(s) and ref(t) are sufficiently close to the same circle in the plane). In various embodiments, the ability of a user to impose one or more "critical measures" makes this technique more powerful than regular clustering, and the fact that these filters can be anything, is what makes it so general.

The output may be a simplicial complex, from which one can extract its 1-skeleton. The nodes of the complex may be partial clusters, (i.e., clusters constructed from subsets of S specified as the preimages of sets in the given covering of the reference space R).

In step 812, the visualization engine 322 identifies nodes which are associated with a subset of the partition elements of all of the S(d) for generating an interactive visualization. For example, suppose that S={1, 2, 3, 4}, and the cover is $C_1, C_2, C_3$. Then if ref_tags(1)={1, 2, 3} and ref_tags(2)={2, 3}, and ref_tags(3)={3}, and finally ref_tags(4)={1, 3}, then S(1) in this example is {1, 4}, S(2)={1,2}, and S(3)={1,2,3,4}. If 1 and 2 are close enough to be clustered, and 3 and 4 are, but nothing else, then the clustering for S(1) may be {1} {3}, and for S(2) it may be {1,2}, and for S(3) it may be {1,2}, {3,4}. So the generated graph has, in this example, at most four nodes, given by the sets {1}, {4}, {1,2}, and {3,4} (note that {1,2} appears in two different clusterings). Of the sets of points that are used, two nodes intersect provided that the associated node sets have a non-empty intersection (although this could easily be modified to allow users to require that the intersection is "large enough" either in absolute or relative terms).

Nodes may be eliminated for any number of reasons. For example, a node may be eliminated as having too few points and/or not being connected to anything else. In some embodiments, the criteria for the elimination of nodes (if any) may be under user control or have application-specific requirements imposed on it. For example, if the points are consumers divided by area code, for instance, clusters with too few people in area codes served by a company could be eliminated. If a cluster was found with "enough" customers, however, this might indicate that expansion into area codes of the other consumers in the cluster could be warranted.

In step 814, the visualization engine 322 joins clusters to identify edges (e.g., connecting lines between nodes). Once the nodes are constructed, the intersections (e.g., edges) may be computed "all at once," by computing, for each point, the set of node sets (not ref_tags, this time). That is, for each s in S, node_id_set(s) may be computed, which is an into. In some embodiments, if the cover is well behaved, then this operation is linear in the size of the set S, and we then iterate over each pair in node_id_set(s). There may be an edge between two node_id's if they both belong to the same node_id_set( ) value, and the number of points in the intersection is precisely the number of different node_id sets in which that pair is seen. This means that, except for the clustering step (which is often quadratic in the size of the sets S(d), but whose size may be controlled by the choice of cover), all of the other steps in the graph construction algorithm may be linear in the size of S, and may be computed quite efficiently.

Figure 9:
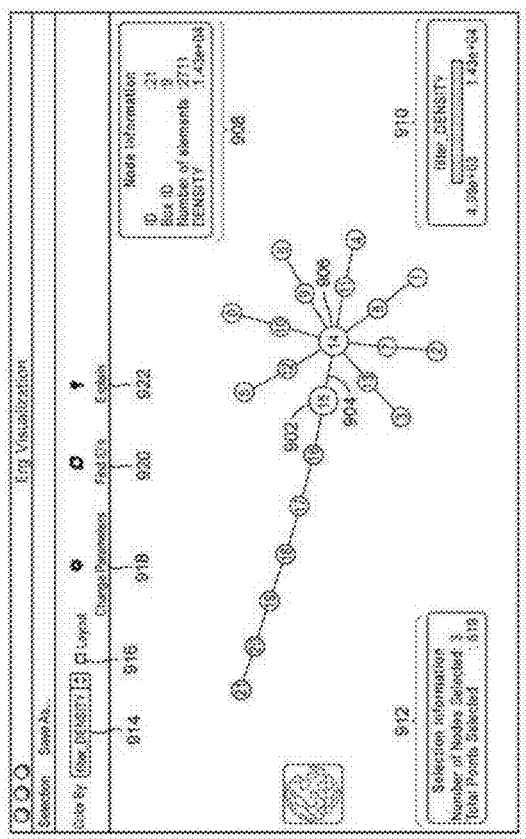
FIG. 9 is an example interactive visualization in some embodiments.
Figure 10:
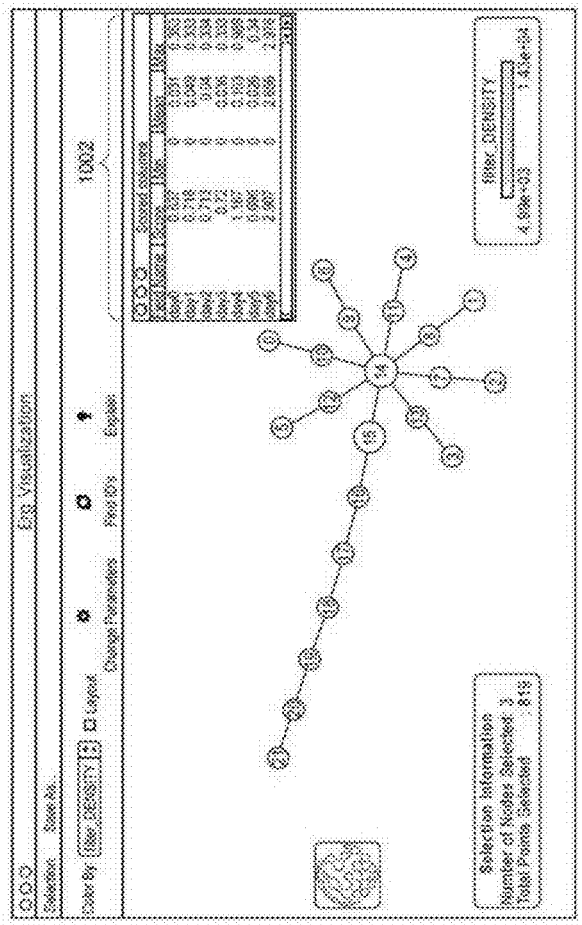
FIG. 10 is an example interactive visualization displaying an explain information window in some embodiments.

In step 816, the visualization engine 322 generates the interactive visualization of interconnected nodes (e.g., nodes and edges displayed in FIGS. 9 and 10).

It will be appreciated that it is possible, in some embodiments, to make sense in a fairly deep way of connections between various ref( ) maps and/or choices of clustering. Further, in addition to computing edges (pairs of nodes), the embodiments described herein may be extended to compute triples of nodes, etc. For example, the analysis module 320 may compute simplicial complexes of any dimension (by a variety of rules) on nodes, and apply techniques from homology theory to the graphs to help users understand a structure in an automatic (or semi-automatic) way.

Further, it will be appreciated that uniform intervals in the covering may not always be a good choice. For example, if the points are exponentially distributed with respect to a given filter, uniform intervals can fail—in such case adaptive interval sizing may yield uniformly-sized S(d) sets, for instance.

Further, in various embodiments, an interface may be used to encode techniques for incorporating third-party extensions to data access and display techniques. Further, an interface may be used to for third-party extensions to underlying infrastructure to allow for new methods for generating coverings, and defining new reference spaces.

FIG. 9 is an example interactive visualization 900 in some embodiments. The display of the interactive visualization may be considered a "graph" in the mathematical sense. The interactive visualization comprises of two types of objects: nodes (e.g., nodes 902 and 906) (which may be balls and may be colored) and the edges (e.g., edge 904) (the black lines). The edges connect pairs of nodes (e.g., edge 904 connects node 902 with node 906). As discussed herein, each node may represent a collection of data points (rows in the database identified by the user). In one example, connected nodes tend to include data points which are "similar to" (e.g., clustered with) each other. The collection of data points may be referred to as being "in the node." The interactive visualization may be two-dimensional, three-dimensional, or a combination of both.

In various embodiments, connected nodes and edges may form a graph or structure. There may be multiple graphs in the interactive visualization. In one example, the interactive visualization may display two or more unconnected structures of nodes and edges.

The visual properties of the nodes and edges (such as, but not limited to, color, stroke color, text, texture, shape, coordinates of the nodes on the screen) can encode any data based property of the data points within each node. For example, coloring of the nodes and/or the edges may indicate (but is not limited to) the following:
  Values of fields or filters
  Any general functions of the data in the nodes (e.g., if the data were unemployment rates by state, then GDP of the states may be identifiable by color the nodes)
  Number of data points in the node The interactive visualization 900 may contain a "bar" 910 which may comprise a legend indicating patterns and/or coloring of the nodes (e.g., balls) and may also identify what the patterns and/or colors indicate. For example, in FIG. 9, bar 910 may indicate that color of some nodes is based on the density filter with blue (on the far left of the bar 910) indicating "4.99e+03" and red (on the far right of the bar 910) indicating "1.43e+04." In general this might be expanded to show any other legend by which nodes and/or edges are colored. It will be appreciated that, in some embodiments, the user may control the color as well as what the color (and/or stroke color, text, texture, shape, coordinates of the nodes on the screen) indicates.

The user may also drag and drop objects of the interactive visualization 900. In various embodiments, the user may reorient structures of nodes and edges by dragging one or more nodes to another portion of the interactive visualization (e.g., a window). In one example, the user may select node 902, hold node 902, and drag the node across the window. The node 902 will follow the user's cursor, dragging the structure of edges and/or nodes either directly or indirectly connected to the node 902. In some embodiments, the interactive visualization 900 may depict multiple unconnected structures. Each structure may include nodes, however, none of the nodes of either structure are connected to each other. If the user selects and drags a node of the first structure, only the first structure will be reoriented with respect to the user action. The other structure will remain unchanged. The user may wish to reorient the structure in order to view nodes, select nodes, and/or better understand the relationships of the underlying data.

In one example, a user may drag a node to reorient the interactive visualization (e.g., reorient the structure of nodes and edges). While the user selects and/or drags the node, the nodes of the structure associated with the selected node may move apart from each other in order to provide greater visibility. Once the user lets go (e.g., deselects or drops the node that was dragged), the nodes of the structure may continue to move apart from each other.

In various embodiments, once the visualization engine 322 generates the interactive display, the depicted structures may move by spreading out the nodes from each other. In one example, the nodes spread from each other slowly allowing the user to view nodes distinguish from each other as well as the edges. In some embodiments, the visualization engine 322 optimizes the spread of the nodes for the user's view. In one example, the structure(s) stop moving once an optimal view has been reached.

It will be appreciated that the interactive visualization 900 may respond to gestures (e.g., multi-touch), stylus, or other interactions allowing the user to reorient nodes and edges and/or interacting with the underlying data.

The interactive visualization 900 may also respond to user actions such as when the user drags, clicks, or hovers a mouse cursor over a node. In some embodiments, when the user selects a node or edge, node information or edge information may be displayed. In one example, when a node is selected (e.g., clicked on by a user with a mouse or a mouse cursor hovers over the node), a node information box 908 may appear that indicates information regarding the selected node. In this example, the node information box 908 indicates an ID, box ID, number of elements (e.g., data points associated with the node), and density of the data associated with the node.

The user may also select multiple nodes and/or edges by clicking separate on each object, or drawing a shape (such as a box) around the desired objects. Once the objects are selected, a selection information box 912 may display some information regarding the selection. For example, selection information box 912 indicates the number of nodes selected and the total points (e.g., data points or elements) of the selected nodes.

The interactive visualization 900 may also allow a user to further interact with the display. Color option 914 allows the user to display different information based on color of the objects. Color option 914 in FIG. 9 is set to filter_Density, however, other filters may be chosen and the objects re-colored based on the selection. It will be appreciated that the objects may be colored based on any filter, property of data, or characterization. When a new option is chosen in the color option 914, the information and/or colors depicted in the color bar 910 may be updated to reflect the change.

Layout checkbox 916 may allow the user to anchor the interactive visualization 900. In one example, the layout checkbox 916 is checked indicating that the interactive visualization 900 is anchored. As a result, the user will not be able to select and drag the node and/or related structure. Although other functions may still be available, the layout checkbox 916 may help the user keep from accidentally moving and/or reorienting nodes, edges, and/or related structures. It will be appreciated the layout checkbox 916 may indicate that the interactive visualization 900 is anchored when the layout checkbox 916 is unchecked and that when the layout checkbox 916 is checked the interactive visualization 900 is no longer anchored.

The change parameters button 918 may allow a user to change the parameters (e.g., add/remove filters and/or change the resolution of one or more filters). In one example, when the change parameters button 918 is activated, the user may be directed back to the metric and filter selection interface window 600 (see FIG. 6) which allows the user to add or remove filters (or change the metric). The user may then view the filter parameter interface 700 (see FIG. 7) and change parameters (e.g., intervals and overlap) for one or more filters. The analysis module 320 may then re-analyze the data based on the changes and display a new interactive visualization 900 without again having to specify the data sets, filters, etc.

The find ID's button 920 may allow a user to search for data within the interactive visualization 900. In one example, the user may click the find ID's button 920 and receive a window allowing the user to identify data or identify a range of data. Data may be identified by ID or searching for the data based on properties of data and/or metadata. If data is found and selected, the interactive visualization 900 may highlight the nodes associated with the selected data. For example, selecting a single row or collection of rows of a database or spreadsheet may produce a highlighting of nodes whose corresponding partial cluster contains any element of that selection.

In various embodiments, the user may select one or more objects and click on the explain button 922 to receive in-depth information regarding the selection. In some embodiments, when the user selects the explain button 922, the information about the data from which the selection is based may be displayed. The function of the explain button 922 is further discussed herein (e.g., see discussion regarding FIG. 10).

In various embodiments, the interactive visualization 900 may allow the user to specify and identify subsets of interest, such as output filtering, to remove clusters or connections which are too small or otherwise uninteresting. Further, the interactive visualization 900 may provide more general coloring and display techniques, including, for example, allowing a user to highlight nodes based on a user-specified predicate, and coloring the nodes based on the intensity of user-specified weighting functions.

The interactive visualization 900 may comprise any number of menu items. The "Selection" menu may allow the following functions:

Select singletons (select nodes which are not connected to other nodes)
Select all (selects all the nodes and edges)
Select all nodes (selects all nodes)
Select all edges
Clear selection (no selection)
Invert Selection (selects the complementary set of nodes or edges)
Select "small" nodes (allows the user to threshold nodes based on how many points they have)
Select leaves (selects all nodes which are connected to long "chains" in the graph)
Remove selected nodes
Show in a table (shows the selected nodes and their associated data in a table)
Save selected nodes (saves the selected data to whatever format the user chooses. This may allow the user to subset the data and create new data sources which may be used for further analysis.)

In one example of the "show in a table" option, information from a selection of nodes may be displayed. The information may be specific to the origin of the data. In various embodiments, elements of a database table may be listed, however, other methods specified by the user may also be included. For example, in the case of microarray data from gene expression data, heat maps may be used to view the results of the selections.

The interactive visualization 900 may comprise any number of menu items. The "Save" menu may allow may allow the user to save the whole output in a variety of different formats such as (but not limited to):

Image files (PNG/JPG/PDF/SVG etc.)
Binary output (The interactive output is saved in the binary format. The user may reopen this file at any time to get this interactive window again)

In some embodiments, graphs may be saved in a format such that the graphs may be used for presentations. This may include simply saving the image as a pdf or png file, but it may also mean saving an executable .xml file, which may permit other users to use the search and save capability to the database on the file without having to recreate the analysis.

In various embodiments, a relationship between a first and a second analysis output/interactive visualization for differing values of the interval length and overlap percentage may be displayed. The formal relationship between the first and second analysis output/interactive visualization may be that when one cover refines the next, there is a map of simplicial complexes from the output of the first to the output of the second. This can be displayed by applying a restricted form of a three-dimensional graph embedding algorithm, in which a graph is the union of the graphs for the various parameter values and in which the connections are the connections in the individual graphs as well as connections from one node to its image in the following graph. The constituent graphs may be placed in its own plane in 3D space. In some embodiments, there is a restriction that each constituent graph remain within its associated plane. Each constituent graph may be displayed individually, but a small change of parameter value may result in the visualization of the adjacent constituent graph. In some embodiments, nodes in the initial graph will move to nodes in the next graph, in a readily visualizable way.

FIG. 10 is an example interactive visualization 1000 displaying an explain information window 1002 in some embodiments. In various embodiments, the user may select a plurality of nodes and click on the explain button. When the explain button is clicked, the explain information window 1002 may be generated. The explain information window 1002 may identify the data associated with the selected object(s) as well as information (e.g., statistical information) associated with the data.

In some embodiments, the explain button allows the user to get a sense for which fields within the selected data fields are responsible for "similarity" of data in the selected nodes and the differentiating characteristics. There can be many ways of scoring the data fields. The explain information window 1002 (i.e., the scoring window in FIG. 10) is shown along with the selected nodes. The highest scoring fields may distinguish variables with respect to the rest of the data.

In one example, the explain information window 1002 indicates that data from fields day0-day6 has been selected. The minimum value of the data in all of the fields is 0. The explain information window 1002 also indicates the maximum values. For example, the maximum value of all of the data associated with the day( ) field across all of the points of the selected nodes is 0.353. The average (i.e., mean) of all of the data associated with the day( ) field across all of the points of the selected nodes is 0.031. The score may be a relative (e.g., normalized) value indicating the relative function of the filter; here, the score may indicate the relative density of the data associated with the day( ) field across all of the points of the selected nodes. Those skilled in the art will appreciate that any information regarding the data and/or selected nodes may appear in the explain information window 1002.

It will be appreciated that the data and the interactive visualization 1000 may be interacted with in any number of ways. The user may interact with the data directly to see where the graph corresponds to the data, make changes to the analysis and view the changes in the graph, modify the graph and view changes to the data, or perform any kind of interaction.

Figure 11:
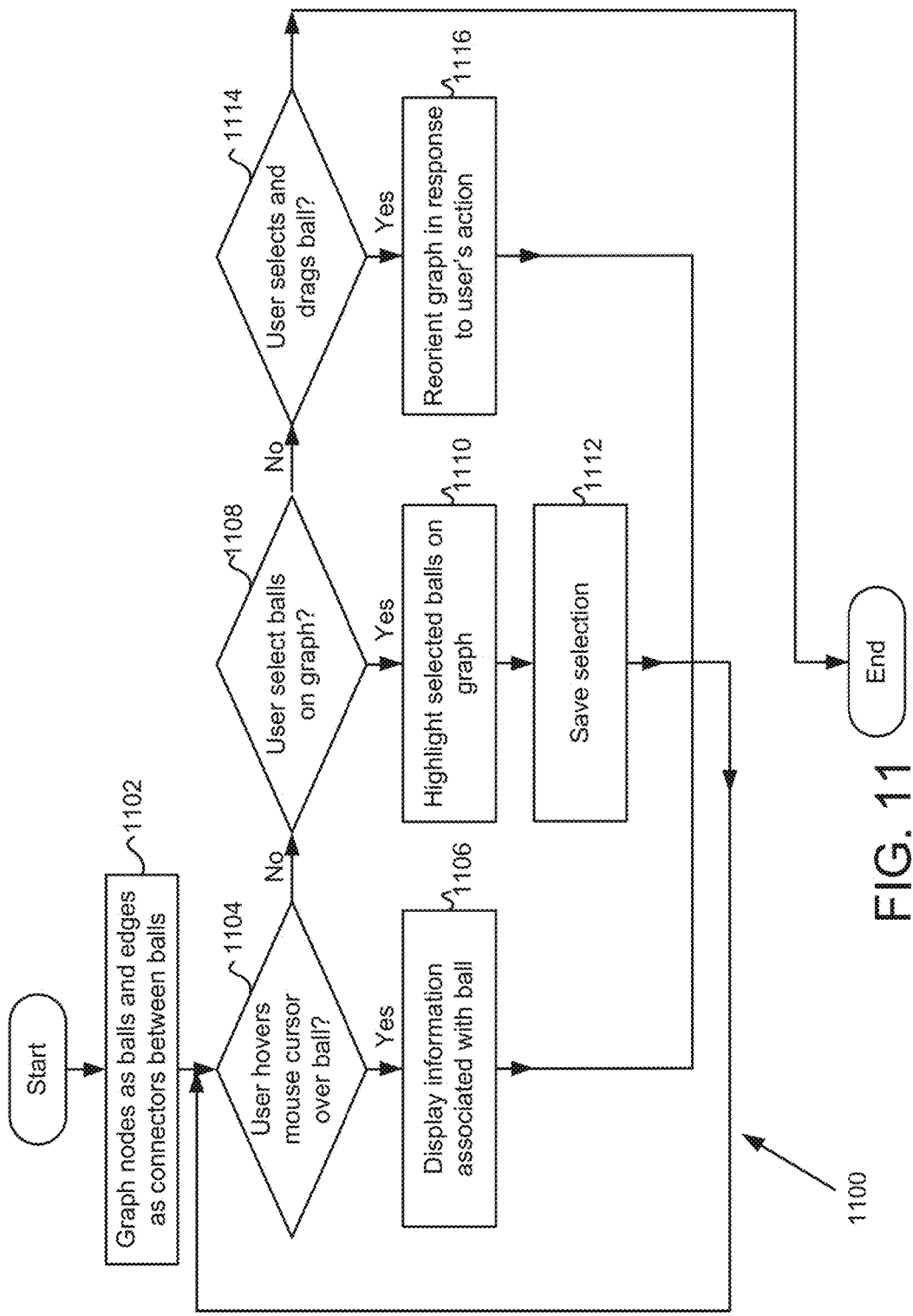
FIG. 11 is a flowchart of functionality of the interactive visualization in some embodiments.

FIG. 11 is a flowchart 1100 of functionality of the interactive visualization in some embodiments. In step 1102, the visualization engine 322 receives the analysis from the analysis module 320 and graphs nodes as balls and edges as connectors between balls 1202 to create interactive visualization 900 (see FIG. 9).

In step 1104, the visualization engine 322 determines if the user is hovering a mouse cursor over (or has selected) a ball (i.e., a node). If the user is hovering a mouse cursor over a ball or is selecting a ball, then information may be displayed regarding the data associated with the ball. In one example, the visualization engine 322 displays a node information window 908.

If the visualization engine 322 does not determine that the user is hovering a mouse cursor over (or has selected) a ball, then the visualization engine 322 determines if the user has selected balls on the graph (e.g., by clicking on a plurality of balls or drawing a box around a plurality of balls). If the user has selected a plurality of balls on the graph, the visualization engine 322 may highlight the selected balls on the graph in step 1110. The visualization engine 322 may also display information regarding the selection (e.g., by displaying a selection information window 912). The user may also click on the explain button 922 to receive more information associated with the selection (e.g., the visualization engine 322 may display the explain information window 1002).

In step 1112, the user may save the selection. For example, the visualization engine 322 may save the underlying data, selected metric, filters, and/or resolution. The user may then access the saved information and create a new structure in another interactive visualization 900 thereby allowing the user to focus attention on a subset of the data.

If the visualization engine 322 does not determine that the user has selected balls on the graph, the visualization engine 322 may determine if the user selects and drags a ball on the graph in step 1114. If the user selects and drags a ball on the graph, the visualization engine 322 may reorient the selected balls and any connected edges and balls based on the user's action in step 1116. The user may reorient all or part of the structure at any level of granularity.

It will be appreciated that although FIG. 11 discussed the user hovering over, selecting, and/or dragging a ball, the user may interact with any object in the interactive visualization 900 (e.g., the user may hover over, select, and/or drag an edge). The user may also zoom in or zoom out using the interactive visualization 900 to focus on all or a part of the structure (e.g., one or more balls and/or edges). Any number of actions and operations may be performed using the interactive visualization 900.

Further, although balls are discussed and depicted in FIGS. 9-11, it will be appreciated that the nodes may be any shape and appear as any kind of object. Further, although some embodiments described herein discuss an interactive visualization being generated based on the output of algebraic topology, the interactive visualization may be generated based on any kind of analysis and is not limited.

For years, researchers have been collecting huge amounts of data on breast cancer, yet we are still battling the disease. Complexity, rather than quantity, is one of the fundamental issues in extracting knowledge from data. A topological data exploration and visualization platform may assist the analysis and assessment of complex data. In various embodiments, a predictive and visual cancer map generated by the topological data exploration and visualization platform may assist physicians to determine treatment options.

In one example, a breast cancer map visualization may be generated based on the large amount of available information already generated by many researchers. Physicians may send biopsy data directly to a cloud-based server which may localize a new patient's data within the breast cancer map visualization. The breast cancer map visualization may be annotated (e.g., labeled) such that the physician may view outcomes of patients with similar profiles as well as different kinds of statistical information such as survival probabilities. Each new data point from a patient may be incorporated into the breast cancer map visualization to improve accuracy of the breast cancer map visualization over time.

Although the following examples are largely focused on cancer map visualizations, it will be appreciated that at least some of the embodiments described herein may apply to any biological condition and not be limited to cancer and/or disease. For example, some embodiments, may apply to different industries.

Figure 12:
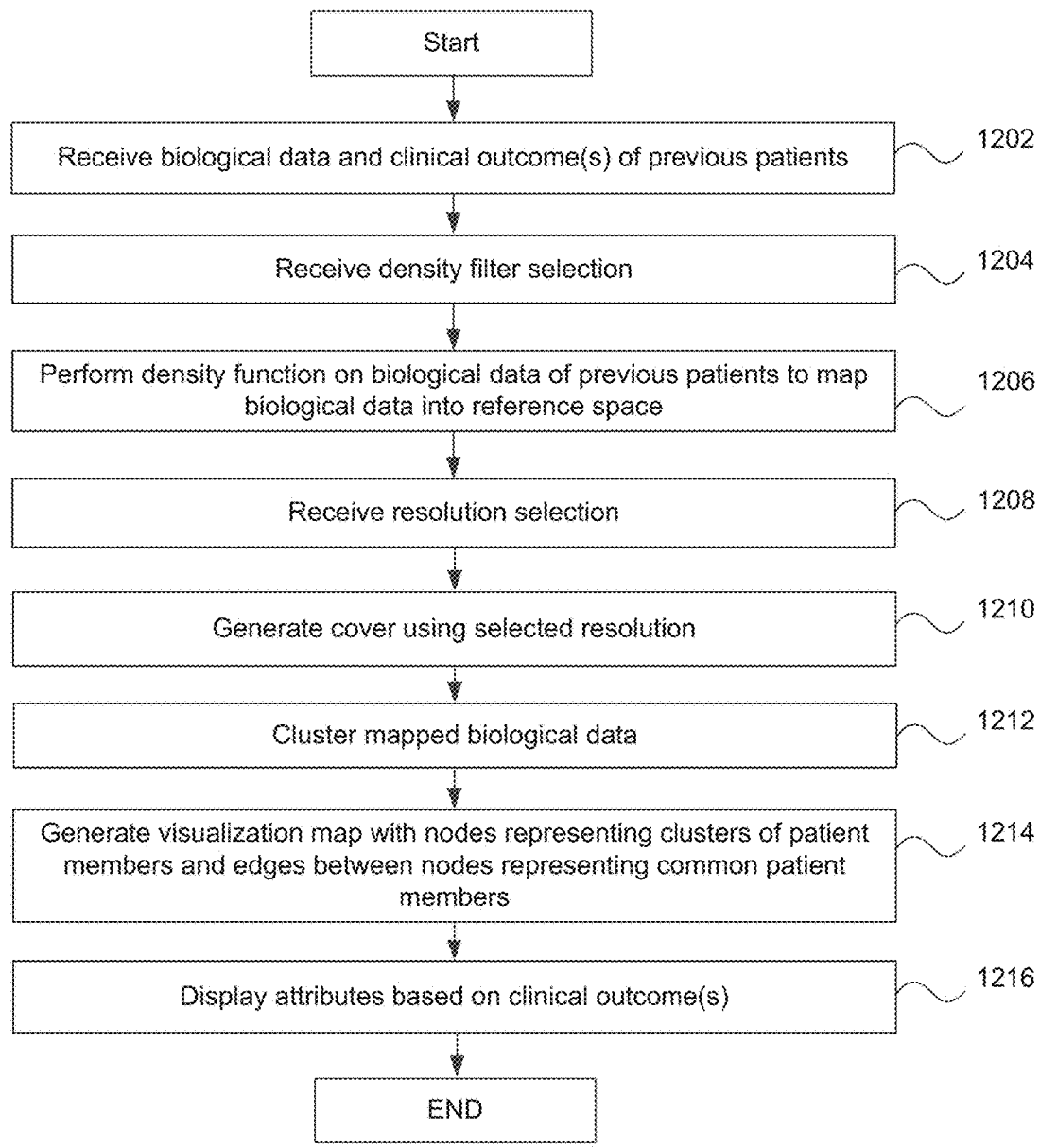
FIG. 12 is a flowchart of for generating a cancer map visualization utilizing biological data of a plurality of patients in some embodiments.

FIG. 12 is a flowchart for generating a cancer map visualization utilizing biological data of a plurality of patients in some embodiments. In various embodiments, the processing of data and user-specified options is motivated by techniques from topology and, in some embodiments, algebraic topology. As discussed herein, these techniques may be robust and general. In one example, these techniques apply to almost any kind of data for which some qualitative idea of "closeness" or "similarity" exists. It will be appreciated that the implementation of techniques described herein may apply to any level of generality.

In various embodiments, a cancer map visualization is generated using genomic data linked to clinical outcomes (i.e., medical characteristics) which may be used by physicians during diagnosis and/or treatment. Initially, publicly available data sets may be integrated to construct the topological map visualizations of patients (e.g., breast cancer patients). It will be appreciated that any private, public, or combination of private and public data sets may be integrated to construct the topological map visualizations. A map visualization may be based on biological data such as, but not limited to, gene expression, sequencing, and copy number variation. As such, the map visualization may comprise many patients with many different types of collected data. Unlike traditional methods of analysis where distinct studies of breast cancer appear as separate entities, the map visualization may fuse disparate data sets while utilizing many datasets and data types.

In various embodiments, a new patient may be localized on the map visualization. With the map visualization for subtypes of a particular disease and a new patient diagnosed with the disease, point(s) may be located among the data points used in computing the map visualization (e.g., nearest neighbor) which is closest to the new patient point. The new patient may be labeled with nodes in the map visualization containing the closest neighbor. These nodes may be highlighted to give a physician the location of the new patient among the patients in the reference data set. The highlighted nodes may also give the physician the location of the new patient relative to annotated disease subtypes.

The visualization map may be interactive and/or searchable in real-time thereby potentially enabling extended analysis and providing speedy insight into treatment.

In step 1202, biological data and clinical outcomes of previous patients may be received. The clinical outcomes may be medical characteristics. Biological data is any data that may represent a condition (e.g., a medical condition) of a person. Biological data may include any health related, medical, physical, physiological, pharmaceutical data associated with one or more patients. In one example, biological data may include measurements of gene expressions for any number of genes. In another example, biological data may include sequencing information (e.g., RNA sequencing).

In various embodiments, biological data for a plurality of patients may be publicly available. For example, various medical health facilities and/or public entities may provide gene expression data for a variety of patients. In addition to the biological data, information regarding any number of clinical outcomes, treatments, therapies, diagnoses and/or prognoses may also be provided. Those skilled in the art will appreciate that any kind of information may be provided in addition to the biological data.

The biological data, in one example, may be similar to data S as discussed with regard to step 802 of FIG. 8. The biological data may include ID fields that identify patients and data fields that are related to the biological information (e.g., gene expression measurements).

FIG. 13 is an example data structure 1300 including biological data 1304a-1304y for a number of patients 1308a-1308n that may be used to generate the cancer map visualization in some embodiments. Column 1302 represents different patient identifiers for different patients. The patient identifiers may be any identifier.

At least some biological data may be contained within gene expression measurements 1304a-1304y. In FIG. 13, "y" represents any number. For example, there may be 50,000 or more separate columns for different gene expressions related to a single patient or related to one or more samples from a patient. It will be appreciated that column 1304a may represent a gene expression measurement for each patient (if any for some patients) associated with the patient identifiers in column 1302. The column 1304b may represent a gene expression measurement of one or more genes that are different than that of column 1304a. As discussed, there may be any number of columns representing different gene expression measurements.

Column 1306 may include any number of clinical outcomes, prognoses, diagnoses, reactions, treatments, and/or any other information associated with each patient. All or some of the information contained in column 1306 may be displayed (e.g., by a label or an annotation that is displayed on the visualization or available to the user of the visualization via clicking) on or for the visualization.

Rows 1308a-1308n each contains biological data associated with the patient identifier of the row. For example, gene expressions in row 1308a are associated with patient identifier P1. As similarly discussed with regard to "y" herein, "n" represents any number. For example, there may be 100,000 or more separate rows for different patients.

It will be appreciated that there may be any number of data structures that contain any amount of biological data for any number of patients. The data structure(s) may be utilized to generate any number of map visualizations.

In step 1204, the analysis server may receive a filter selection. In some embodiments, the filter selection is a density estimation function. It will be appreciated that the filter selection may include a selection of one or more functions to generate a reference space.

In step 1206, the analysis server performs the selected filter(s) on the biological data of the previous patients to map the biological data into a reference space. In one example, a density estimation function, which is well known in the art, may be performed on the biological data (e.g., data associated with gene expression measurement data 1304a-1304y) to relate each patient identifier to one or more locations in the reference space (e.g., on a real line).

In step 1208, the analysis server may receive a resolution selection. The resolution may be utilized to identify overlapping portions of the reference space (e.g., a cover of the reference space R) in step 1210.

As discussed herein, the cover of R may be a finite collection of open sets (in the metric of R) such that every point in R lies in at least one of these sets. In various examples, R is k-dimensional Euclidean space, where k is the number of filter functions. Those skilled in the art will appreciate that the cover of the reference space R may be controlled by the number of intervals and the overlap identified in the resolution (e.g., see FIG. 7). For example, the more intervals, the finer the resolution in S (e.g., the similarity space of the received biological data)—that is, the fewer points in each S(d), but the more similar (with respect to the filters) these points may be. The greater the overlap, the more times that clusters in S(d) may intersect clusters in S(e)—this means that more "relationships" between points may appear, but, in some embodiments, the greater the overlap, the more likely that accidental relationships may appear.

In step 1212, the analysis server receives a metric to cluster the information of the cover in the reference space to partition S(d). In one example, the metric may be a Pearson Correlation. The clusters may form the groupings (e.g., nodes or balls). Various cluster means may be used including, but not limited to, a single linkage, average linkage, complete linkage, or k-means method.

As discussed herein, in some embodiments, the analysis module 320 may not cluster two points unless filter values are sufficiently "related" (recall that while normally related may mean "close," the cover may impose a much more general relationship on the filter values, such as relating two points s and t if ref(s) and ref(t) are sufficiently close to the same circle in the plane where ref( ) represents one or more filter functions). The output may be a simplicial complex, from which one can extract its 1-skeleton. The nodes of the complex may be partial clusters, (i.e., clusters constructed from subsets of S specified as the preimages of sets in the given covering of the reference space R).

In step 1214, the analysis server may generate the visualization map with nodes representing clusters of patient members and edges between nodes representing common patient members. In one example, the analysis server identifies nodes which are associated with a subset of the partition elements of all of the S(d) for generating an interactive visualization.

As discussed herein, for example, suppose that S={1, 2, 3, 4}, and the cover is $C_1$, $C_2$, $C_3$. Suppose cover $C_1$ contains {1, 4}, $C_2$ contains {1,2}, and $C_3$ contains {1,2,3,4}. If 1 and 2 are close enough to be clustered, and 3 and 4 are, but nothing else, then the clustering for S(1) may be {1}, {4}, and for S(2) it may be {1,2}, and for S(3) it may be {1,2}, {3,4}. So the generated graph has, in this example, at most four nodes, given by the sets {1}, {4}, {1, 2}, and {3, 4} (note that {1, 2} appears in two different clusterings). Of the sets of points that are used, two nodes intersect provided that the associated node sets have a non-empty intersection (although this could easily be modified to allow users to require that the intersection is "large enough" either in absolute or relative terms).

As a result of clustering, member patients of a grouping may share biological similarities (e.g., similarities based on the biological data).

The analysis server may join clusters to identify edges (e.g., connecting lines between nodes). Clusters joined by edges (i.e., interconnections) share one or more member patients. In step 1216, a display may display a visualization map with attributes based on the clinical outcomes contained in the data structures (e.g., see FIG. 13 regarding clinical outcomes). Any labels or annotations may be utilized based on information contained in the data structures. For example, treatments, prognoses, therapies, diagnoses, and the like may be used to label the visualization. In some embodiments, the physician or other user of the map visualization accesses the annotations or labels by interacting with the map visualization.

The resulting cancer map visualization may reveal interactions and relationships that were obscured, untested, and/or previously not recognized.

Figure 14:
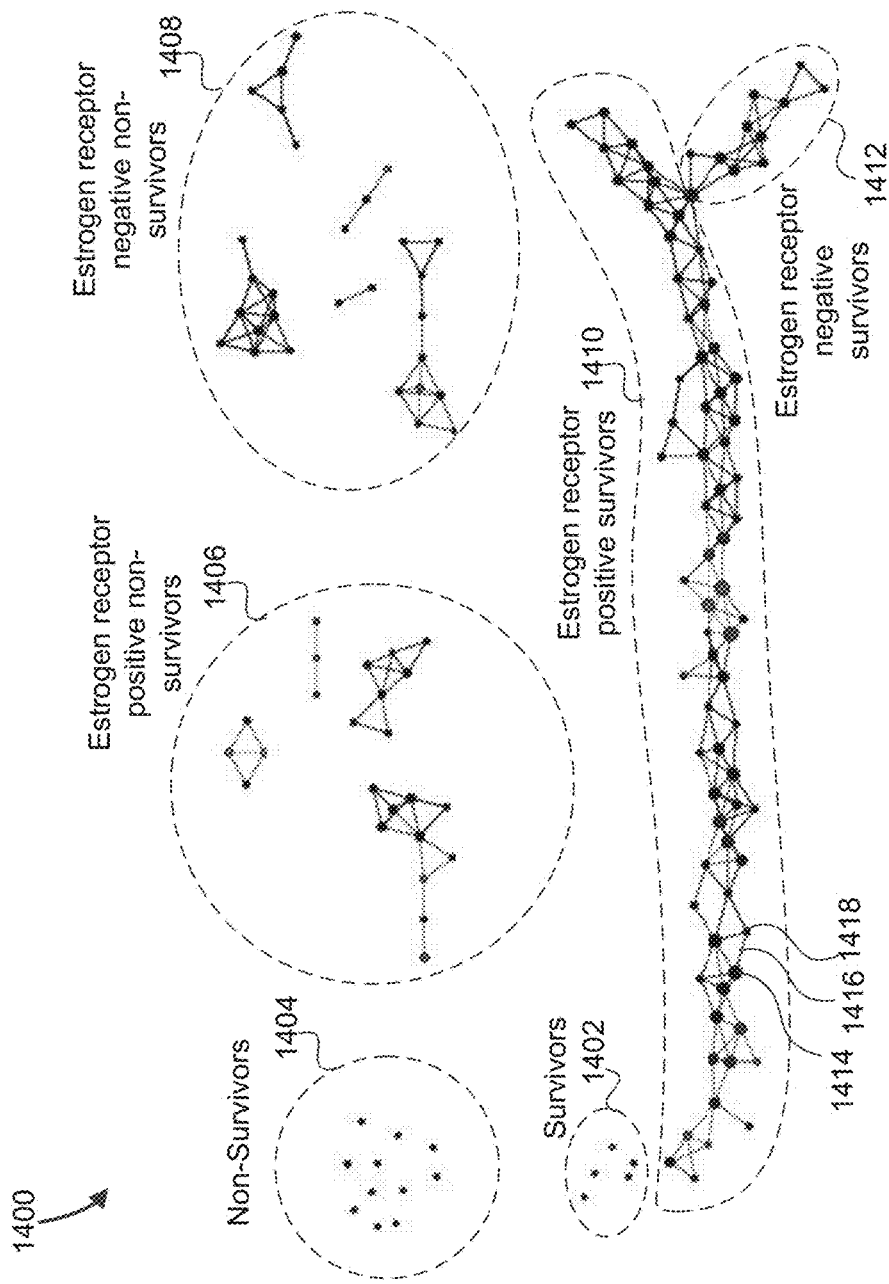
FIG. 14 is an example visualization displaying the cancer map in some embodiments.

FIG. 14 is an example visualization displaying the cancer map visualization 1400 in some embodiments. The cancer map visualization 1400 represents a topological network of cancer patients. The cancer map visualization 1400 may be based on publicly and/or privately available data.

In various embodiments, the cancer map visualization 1400 is created using gene expression profiles of excised tumors. Each node (i.e., ball or grouping displayed in the map visualization 1400) contains a subset of patients with similar genetic profiles.

As discussed herein, one or more patients (i.e., patient members of each node or grouping) may occur in multiple nodes. A patient may share a similar genetic profile with multiple nodes or multiple groupings. In one example, of 50,000 different gene expressions of the biological data, multiple patients may share a different genetic profiles (e.g., based on different gene expression combinations) with different groupings. When a patient shares a similar genetic profile with different groupings or nodes, the patient may be included within the groupings or nodes.

The cancer map visualization 1400 comprises groupings and interconnections that are associated with different clinical outcomes. All or some of the clinical outcomes may be associated with the biological data that generated the cancer map visualization 1400. The cancer map visualization 1400 includes groupings associated with survivors 1402 and groupings associated with non-survivors 1404. The cancer map visualization 1400 also includes different groupings associated with estrogen receptor positive non-survivors 1406, estrogen receptor negative non-survivors 1408, estrogen receptor positive survivors 1410, and estrogen receptor negative survivors 1412.

In various embodiments, when one or more patients are members of two or more different nodes, the nodes are interconnected by an edge (e.g., a line or interconnection). If there is not an edge between the two nodes, then there are no common member patients between the two nodes. For example, grouping 1414 shares at least one common member patient with grouping 1418. The intersection of the two groupings is represented by edge 1416. As discussed herein, the number of shared member patients of the two groupings may be represented in any number of ways including color of the interconnection, color of the groupings, size of the interconnection, size of the groupings, animations of the interconnection, animations of the groupings, brightness, or the like. In some embodiments, the number and/or identifiers of shared member patients of the two groupings may be available if the user interacts with the groupings 1414 and/or 1418 (e.g., draws a box around the two groupings and the interconnection utilizing an input device such as a mouse).

In various embodiments, a physician, on obtaining some data on a breast tumor, direct the data to an analysis server (e.g., analysis server 208 over a network such as the Internet) which may localize the patient relative to one or more groupings on the cancer map visualization 1400. The context of the cancer map visualization 1400 may enable the physician to assess various possible outcomes (e.g., proximity of representation of new patient to the different associations of clinical outcomes).

Figure 15:
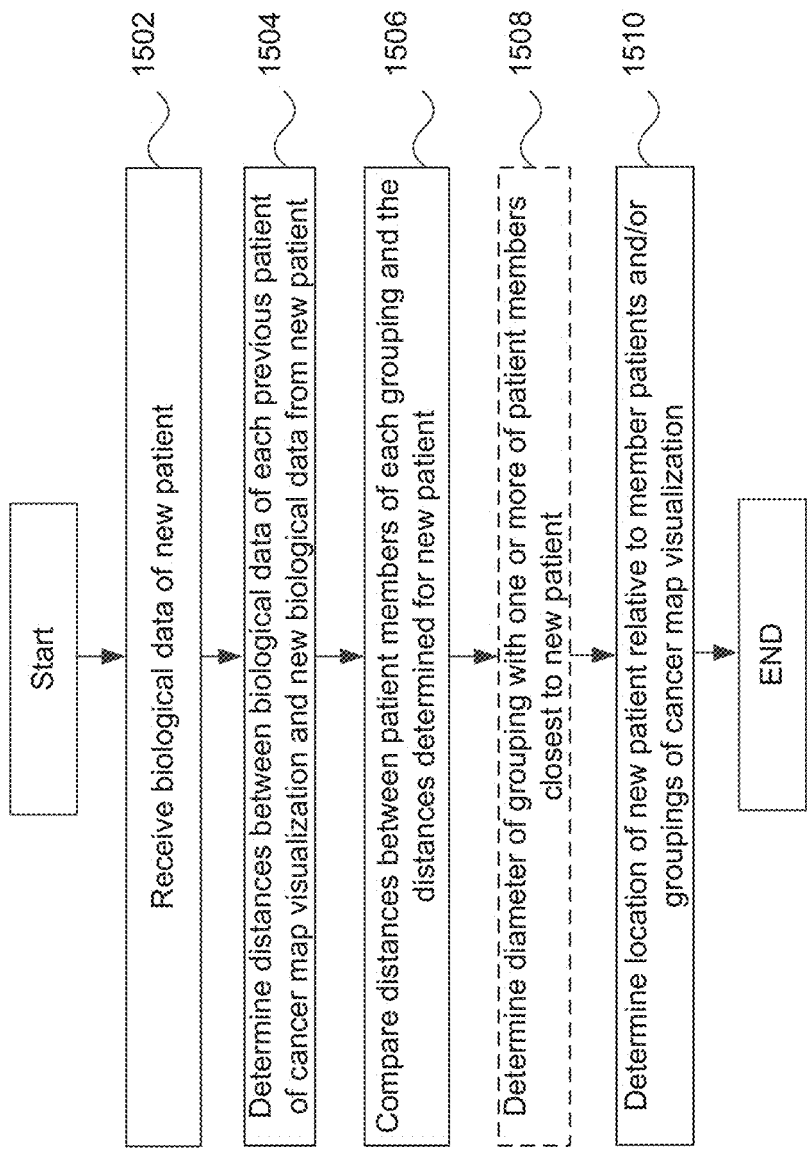
FIG. 15 is a flowchart of for positioning new patient data relative to the cancer map visualization in some embodiments.

FIG. 15 is a flowchart of for positioning new patient data relative to a cancer map visualization in some embodiments. In step 1502, new biological data of a new patient is received. In various embodiments, an input module 314 of an analysis server (e.g., analysis server 208 of FIGS. 1 and 2) may receive biological data of a new patient from a physician or medical facility that performed analysis of one or more samples to generate the biological data. The biological data may be any data that represents a biological data of the new patient including, for example, gene expressions, sequencing information, or the like.

In some embodiments, the analysis server 208 may comprise a new patient distance module and a location engine. In step 1504, the new patient distance module determines distances between the biological data of each patient of the cancer map visualization 1600 and the new biological data from the new patient. For example, the previous biological data that was utilized in the generation of the cancer map visualization 1600 may be stored in mapped data structures. Distances may be determined between the new biological data of the new patient and each of the previous patient's biological data in the mapped data structure.

It will be appreciated that distances may be determined in any number of ways using any number of different metrics or functions. Distances may be determined between the biological data of the previous patients and the new patients. For example, a distance may be determined between a first gene expression measurement of the new patient and each (or a subset) of the first gene expression measurements of the previous patients (e.g., the distance between G1 of the new patient and G1 of each previous patient may be calculated). Distances may be determined between all (or a subset of) other gene expression measurements of the new patient to the gene expression measurements of the previous patients.

In various embodiments, a location of the new patient on the cancer map visualization 1600 may be determined relative to the other member patients utilizing the determined distances.

In step 1506, the new patient distance module may compare distances between the patient members of each grouping to the distances determined for the new patient. The new patient may be located in the grouping of patient members that are closest in distance to the new patient. In some embodiments, the new patient location may be determined to be within a grouping that contains the one or more patient members that are closest to the new patient (even if other members of the grouping have longer distances with the new patient). In some embodiments, this step is optional.

In various embodiments, a representative patient member may be determined for each grouping. For example, some or all of the patient members of a grouping may be averaged or otherwise combined to generate a representative patient member of the grouping (e.g., the distances and/or biological data of the patient members may be averaged or aggregated). Distances may be determined between the new patient biological data and the averaged or combined biological data of one or more representative patient members of one or more groupings. The location engine may determine the location of the new patient based on the distances. In some embodiments, once the closest distance between the new patient and the representative patient member is found, distances may be determined between the new patient and the individual patient members of the grouping associated with the closest representative patient member.

In optional step 1508, a diameter of the grouping with the one or more of the patient members that are closest to the new patient (based on the determined distances) may be determined. In one example, the diameters of the groupings of patient members closest to the new patient are calculated. The diameter of the grouping may be a distance between two patient members who are the farthest from each other when compared to the distances between all patient members of the grouping. If the distance between the new patient and the closest patient member of the grouping is less than the diameter of the grouping, the new patient may be located within the grouping. If the distance between the new patient and the closest patient member of the grouping is greater than the diameter of the grouping, the new patient may be outside the grouping (e.g., a new grouping may be displayed on the cancer map visualization with the new patient as the single patient member of the grouping). If the distance between the new patient and the closest patient member of the grouping is equal to the diameter of the grouping, the new patient may be placed within or outside the grouping.

It will be appreciated that the determination of the diameter of the grouping is not required in determining whether the new patient location is within or outside of a grouping. In various embodiments, a distribution of distances between member patients and between member patients and the new patient is determined. The decision to locate the new patient within or outside of the grouping may be based on the distribution. For example, if there is a gap in the distribution of distances, the new patient may be separated from the grouping (e.g., as a new grouping). In some embodiments, if the gap is greater than a preexisting threshold (e.g., established by the physician, other user, or previously programmed), the new patient may be placed in a new grouping that is placed relative to the grouping of the closest member patients. The process of calculating the distribution of distances of candidate member patients to determine whether there may be two or more groupings may be utilized in generation of the cancer map visualization further described herein (e.g., in the process as described with regard to FIG. 12). It will be appreciated that there may be any number of ways to determine whether a new patient should be included within a grouping of other patient members.

In step 1510, the location engine determines the location of the new patient relative to the member patients and/or groupings of the cancer map visualization. The new location may be relative to the determined distances between the new patient and the previous patients. The location of the new patient may be part of a previously existing grouping or may form a new grouping.

In some embodiments, the location of the new patient with regard to the cancer map visualization may be performed locally to the physician. For example, the cancer map visualization 1400 may be provided to the physician (e.g., via a digital device). The physician may load the new patient's biological data locally and the distances may be determined locally or via a cloud-based server. The location(s) associated with the new patient may be overlaid on the previously existing cancer map visualization either locally or remotely.

It will be appreciated that, in some embodiments, the previous state of the cancer map visualization (e.g., cancer map visualization 1400) may be retained or otherwise stored and a new cancer map visualization generated utilizing the new patient biological data (e.g., in a method similar to that discussed with regard to FIG. 12). The newly generated map may be compared to the previous state and the differences may be highlighted thereby, in some embodiments, highlighting the location(s) associated with the new patient. In this way, distances may be not be calculated as described with regard to FIG. 15, but rather, the process may be similar to that as previously discussed.

Figure 16:
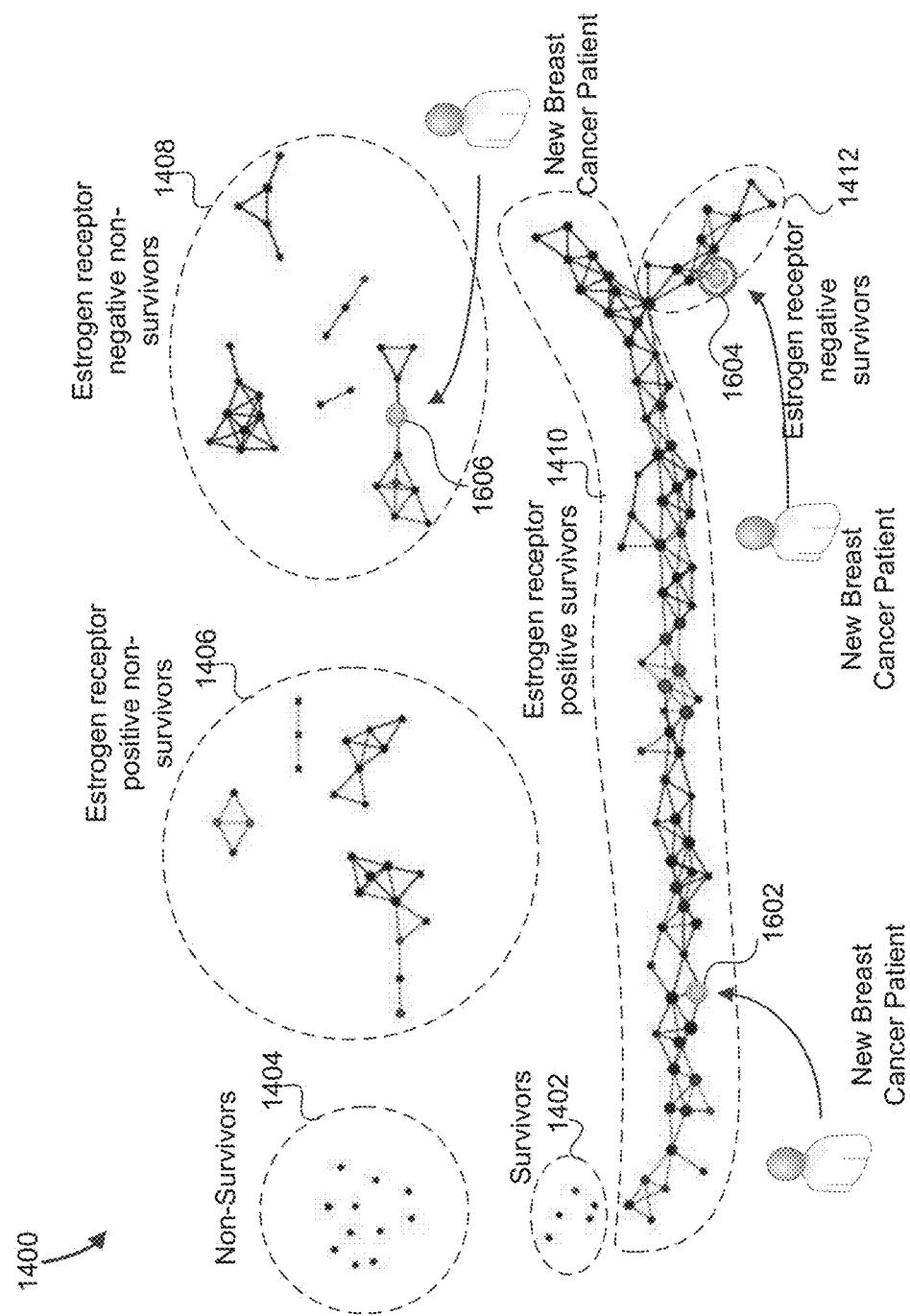
FIG. 16 is an example visualization displaying the cancer map including positions for three new cancer patients in some embodiments.

FIG. 16 is an example visualization displaying the cancer map including positions for three new cancer patients in some embodiments. The cancer map visualization 1400 comprises groupings and interconnections that are associated with different clinical outcomes as discussed with regard to FIG. 14. All or some of the clinical outcomes may be associated with the biological data that generated the cancer map visualization 1400. The cancer map visualization 1400 includes different groupings associated with survivors 1402, groupings associated with non-survivors 1404, estrogen receptor positive non-survivors 1406, estrogen receptor negative non-survivors 1408, estrogen receptor positive survivors 1410, and estrogen receptor negative survivors 1412.

The cancer map visualization 1400 includes three locations for three new breast cancer patients. The breast cancer patient location 1602 is associated with the clinical outcome of estrogen receptor positive survivors. The breast cancer patient location 1604 is associated with the clinical outcome of estrogen receptor negative survivors. Unfortunately, breast cancer patient location 1606 is associated with estrogen receptor negative non-survivors. Based on the locations, a physician may consider different diagnoses, prognoses, treatments, and therapies to maintain or attempt to move the breast cancer patient to a different location utilizing the cancer map visualization 1400.

In some embodiments, the physician may assess the underlying biological data associated with any number of member patients of any number of groupings to better understand the genetic similarities and/or dissimilarities. The physician may utilize the information to make better informed decisions.

The patient location 1604 is highlighted on the cancer map visualization 1400 as active (e.g., selected by the physician). It will be appreciated that the different locations may be of any color, size, brightness, and/or animated to highlight the desired location(s) for the physician. Further, although only one location is identified for three different breast cancer patients, any of the breast cancer patients may have multiple locations indicating different genetic similarities.

It will be appreciated that the cancer map visualization 1400 may be updated with new information at any time. As such, as new patients are added to the cancer map visualization 1400, the new data updates the visualization such that as future patients are placed in the map, the map may already include the updated information. As new information and/or new patient data is added to the cancer map visualization 1400, the cancer map visualization 1400 may improve as a tool to better inform physicians or other medical professionals.

In various embodiments, the cancer map visualization 1400 may track changes in patients over time. For example, updates to a new patient may be visually tracked as changes in are measured in the new patient's biological data. In some embodiments, previous patient data is similarly tracked which may be used to determine similarities of changes based on condition, treatment, and/or therapies, for example. In various embodiments, velocity of change and/or acceleration of change of any number of patients may be tracked over time using or as depicted on the cancer map visualization 1400. Such depictions may assist the treating physician or other personnel related to the treating physician to better understand changes in the patient and provide improved, current, and/or updated diagnoses, prognoses, treatments, and/or therapies.

Figure 17:
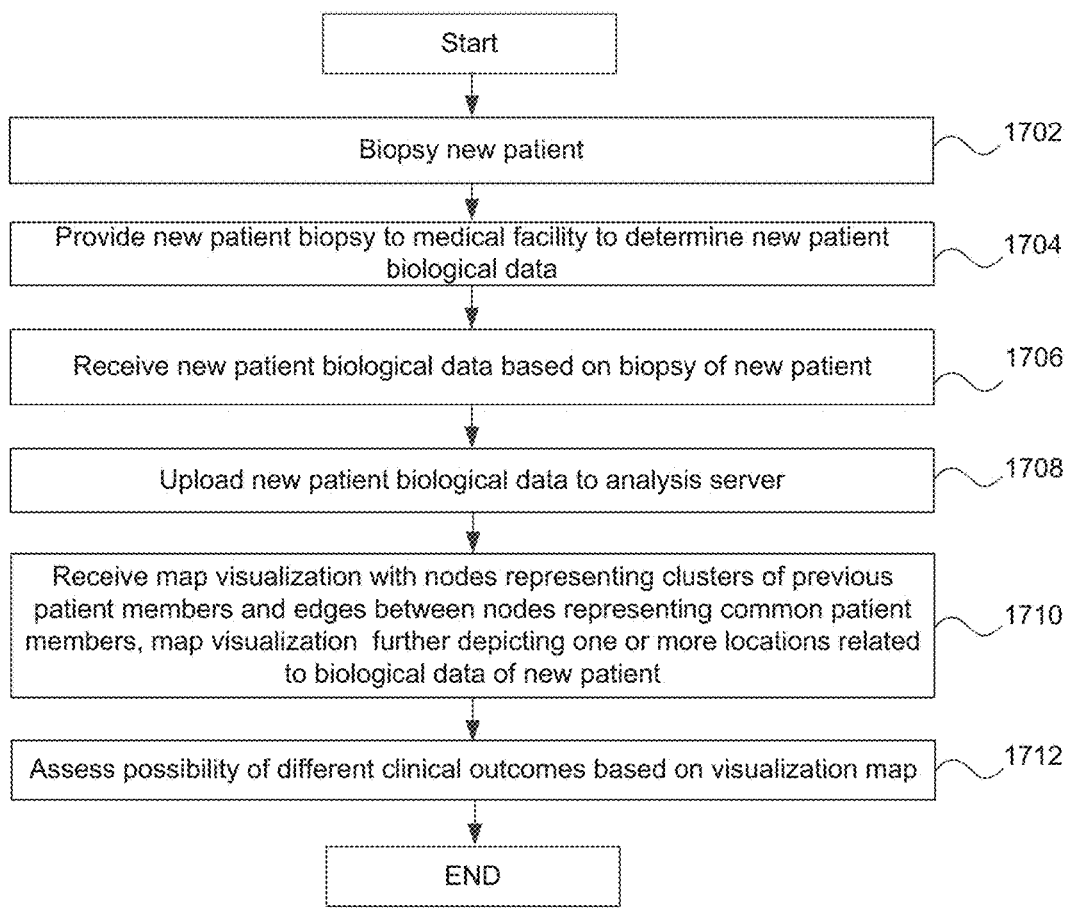
FIG. 17 is a flowchart of utilization the visualization and positioning of new patient data in some embodiments

FIG. 17 is a flowchart of utilization the visualization and positioning of new patient data in some embodiments. In various embodiments, a physician may collect amounts of genomic information from tumors removed from a new patient, input the data (e.g., upload the data to an analysis server), and receive a map visualization with a location of the new patient. The new patient's location within the map may offer the physician new information about the similarities to other patients. In some embodiments, the map visualization may be annotated so that the physician may check the outcomes of previous patients in a given region of the map visualization are distributed and then use the information to assist in decision-making for diagnosis, treatment, prognosis, and/or therapy.

In step 1702, a medical professional or other personnel may remove a sample from a patient. The sample may be of a tumor, blood, or any other biological material. In one example, a medical professional performs a tumor excision. Any number of samples may be taken from a patient.

In step 1704, the sample(s) may be provided to a medical facility to determine new patient biological data. In one example, the medical facility measures genomic data such as gene expression of a number of genes or protein levels.

In step 1706, the medical professional or other entity associated with the medical professional may receive the new patient biological data based on the sample(s) from the new patient. In one example, a physician may receive the new patient biological data. The physician may provide all or some of the new patient biological data to an analysis server over the Internet (e.g., the analysis server may be a cloud-based server). In some embodiments, the analysis server is the analysis server 208 of FIG. 2. In some embodiments, the medical facility that determines the new patient biological data provides the biological data in an electronic format which may be uploaded to the analysis server. In some embodiments, the medical facility that determines the new patient biological data (e.g., the medical facility that measures the genomic data) provide the biological data to the analysis server at the request of the physician or others associated with the physician. It will be appreciated that the biological data may be provided to the analysis server in any number of ways.

The analysis server may be any digital device and may not be limited to a digital device on a network. In some embodiments, the physician may have access to the digital device. For example, the analysis server may be a table, personal computer, local server, or any other digital device.

Once the analysis server receives the biological data of the new patient (e.g., the new patient biological data may be uploaded to the analysis serer in step 1708), the new patient may be localized in the map visualization and the information may be sent back to the physician in step 1710. The visualization may be a map with nodes representing clusters of previous patient members and edges between nodes representing common patient members. The visualization may further depict one or more locations related to the biological data of the new patient.

The map visualization may be provided to the physician or other associated with the physician in real-time. For example, once the biological data associated with the new patient is provided to the analysis server, the analysis server may provide the map visualization back to the physician or other associated with the physician within a reasonably short time (e.g., within seconds or minutes). In some embodiments, the physician may receive the map visualization over any time.

The map visualization may be provided to the physician in any number of ways. For example, the physician may receive the map visualization over any digital device such as, but not limited to, an office computer, iPad, tablet device, media device, smartphone, e-reader, or laptop.

In step 1712, the physician may assess possible different clinical outcomes based on the map visualization. In one example, the map-aided physician may make decisions on therapy and treatments depending on where the patient lands on the visualization (e.g., survivor or non-survivor). The map visualization may include annotations or labels that identify one or more sets of groupings and interconnections as being associated with one or more clinical outcomes. The physician may assess possible clinical outcomes based on the position(s) on the map associated with the new patient.

Figure 18:
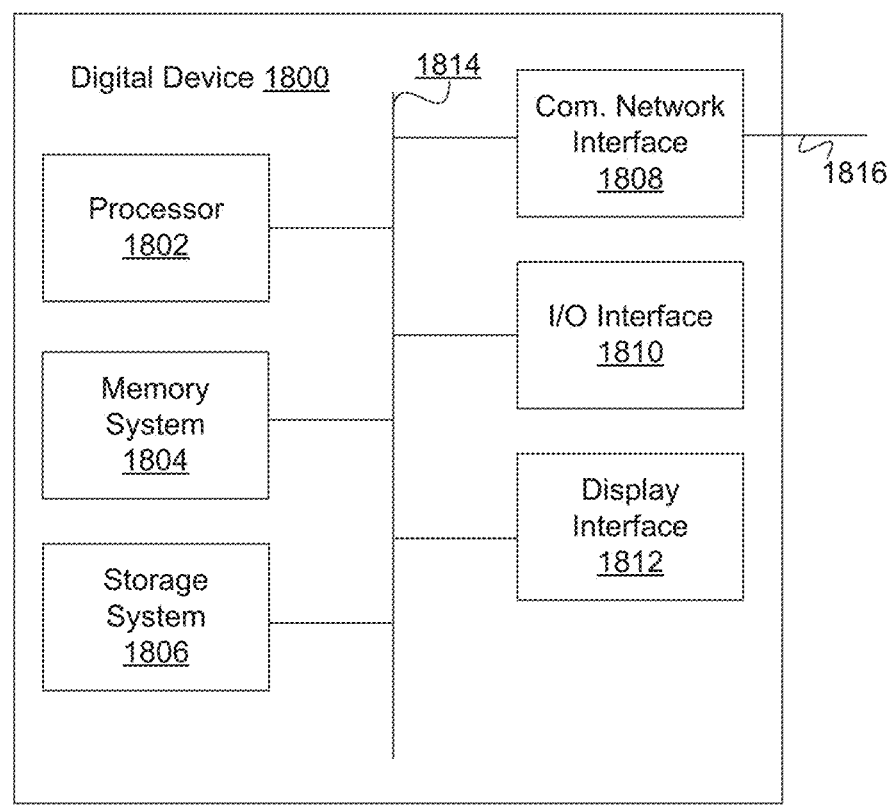
FIG. 18 is an example digital device in some embodiments.

FIG. 18 is a block diagram of an exemplary digital device 1800. The digital device 1800 comprises a processor 1802, a memory system 1804, a storage system 1806, a communication network interface 1808, an I/O interface 1810, and a display interface 1812 communicatively coupled to a bus 1814. The processor 1802 may be configured to execute executable instructions (e.g., programs). In some embodiments, the processor 1802 comprises circuitry or any processor capable of processing the executable instructions.

The memory system 1804 is any memory configured to store data. Some examples of the memory system 1804 are storage devices, such as RAM or ROM. The memory system 1804 can comprise the ram cache. In various embodiments, data is stored within the memory system 1804. The data within the memory system 1804 may be cleared or ultimately transferred to the storage system 1806.

The storage system 1806 is any storage configured to retrieve and store data. Some examples of the storage system 1806 are flash drives, hard drives, optical drives, and/or magnetic tape. In some embodiments, the digital device 1800 includes a memory system 1804 in the form of RAM and a storage system 1806 in the form of flash data. Both the memory system 1804 and the storage system 1806 comprise computer readable media which may store instructions or programs that are executable by a computer processor including the processor 1802.

The communication network interface (com. network interface) 1808 can be coupled to a data network (e.g., communication network 204) via the link 1816. The communication network interface 1808 may support communication over an Ethernet connection, a serial connection, a parallel connection, or an ATA connection, for example. The communication network interface 1808 may also support wireless communication (e.g., 1802.11 a/b/g/n, WiMAX). It will be apparent to those skilled in the art that the communication network interface 1808 can support many wired and wireless standards.

The optional input/output (I/O) interface 1810 is any device that receives input from the user and output data. The optional display interface 1812 is any device that may be configured to output graphics and data to a display. In one example, the display interface 1812 is a graphics adapter.

It will be appreciated that the hardware elements of the digital device 1800 are not limited to those depicted in FIG. 18. A digital device 1800 may comprise more or less hardware elements than those depicted. Further, hardware elements may share functionality and still be within various embodiments described herein. In one example, encoding and/or decoding may be performed by the processor 1802 and/or a co-processor located on a GPU.

In various embodiments, the analysis system utilizes methodologies and/or a suite of algorithms to perform topological data analysis (TDA) utilizing data from one or more spreadsheet(s). As discussed herein, data from any source or combination of sources may be analyzed using TDA. In some embodiments, TDA functions may function with or be integrated into spreadsheets for performing analysis. For example, TDA functions may leverage, supplement, and/or replace spreadsheet functionality.

A spreadsheet application is an interactive computer application for organization, analysis and storage of data in tabular form. A spreadsheet is typically a grid of cells arranged in numbered rows and named columns to organize data manipulations like arithmetic operations. Rows may be numbered and columns are often identified by letters. Besides performing basic arithmetic and mathematical functions, modern spreadsheets provide built-in functions for common financial and statistical operations. For example, a spreadsheet application may have a battery of supplied functions to provide for statistical, engineering, and financial needs. In addition, some spreadsheet applications can display data as line graphs, histograms and charts.

Spreadsheet users may generally adjust any stored value and observe the effects on calculated values. Modern spreadsheet software may have multiple interacting sheets, and can display data either as text and numerals, or in graphical form.

In various embodiments, TDA functionality may be utilized with or integrated into a spreadsheet application such as MICROSOFT EXCEL. For example, the analysis system described herein may receive information from a spreadsheet generated by MICROSOFT EXCEL. Further, an interaction application may be utilized to communicate between and/or control functions of the spreadsheet or TDA visualization. For example, the interaction application may control or provide information regarding selections within the spreadsheet to enable corresponding changes in a related TDA visualization. In another example, the interaction application may control or provide information regarding selections within the TDA visualization to enable corresponding changes (e.g., highlighted columns, highlighted rows, or depiction of new information) in a related spreadsheet.

Although MICROSOFT EXCEL is discussed herein as an example spreadsheet application, it will be appreciated that many examples or embodiments described herein may function with any spreadsheet created by any spreadsheet application. Although many examples discussed herein refer to a spreadsheet, it will be appreciated that any or all systems and methods discussed herein may utilize any number of spreadsheets (e.g., related spreadsheets or worksheets) in one or more spreadsheet applications.

MICROSOFT EXCEL is currently the most popular spreadsheet application. Today, a lot of organizations are still relaying on MICROSOFT EXCEL to do data analysis. Although some entities are trying to disrupt MICROSOFT EXCEL with online reporting tools, MICROSOFT EXCEL still has a lot reporting capabilities liked by data analyst. Traditional data warehouse type of data analytics generally support integration with MICROSOFT EXCEL, The ODBO protocol is generally utilized for MICROSOFT EXCEL to communicate with the enterprise data warehouse.

Enabling TDA interaction with spreadsheet(s) in MICROSOFT EXCEL may provide significant benefits to data analysts. For example, at a high level, data analysts can view, manipulate and modify the data in MICROSOFT EXCEL. Subsequently, the data analyst may execute TDA on any or all data in the spreadsheet within MICROSOFT EXCEL with a button click to generate a topological graph. After graph is generated, data binding may occur in any number of ways. For example, when a user selects rows in MICROSOFT EXCEL, the corresponding nodes in the graph may be highlighted. In another example, when a user selects nodes in the TDA visualization, the corresponding rows in MICROSOFT EXCEL may be highlighted. Users, in some embodiments, can apply the TDA to a graph or visualization to find topological groups. Once the groups are identified, MICROSOFT EXCEL may create separate data sheets (e.g., worksheets) containing data for a particular group. Statistical explains can be generated by comparing two sheets. In some embodiments, statistical explains may be generated by comparing one or more groups (e.g., of data points that are members of grouped nodes) against the rest of the data points in the data set.

In addition to standalone TDA within MICROSOFT EXCEL, ODBO protocol for MICROSOFT EXCEL can be leveraged to communicate with one or more TDA systems.

With this capability, MICROSOFT EXCEL may be able to connect to a TDA platform to provide data and/or fetch data and metadata. Once connected, a user may upload and download data from the systems, and also view metadata associated with the data like column statistics, or the like. In some embodiments, the user may be able to adjust parameters like resolution and gain and click a button to request the system to run TDA analysis and return the graph to display in MICROSOFT EXCEL.

Figure 19:
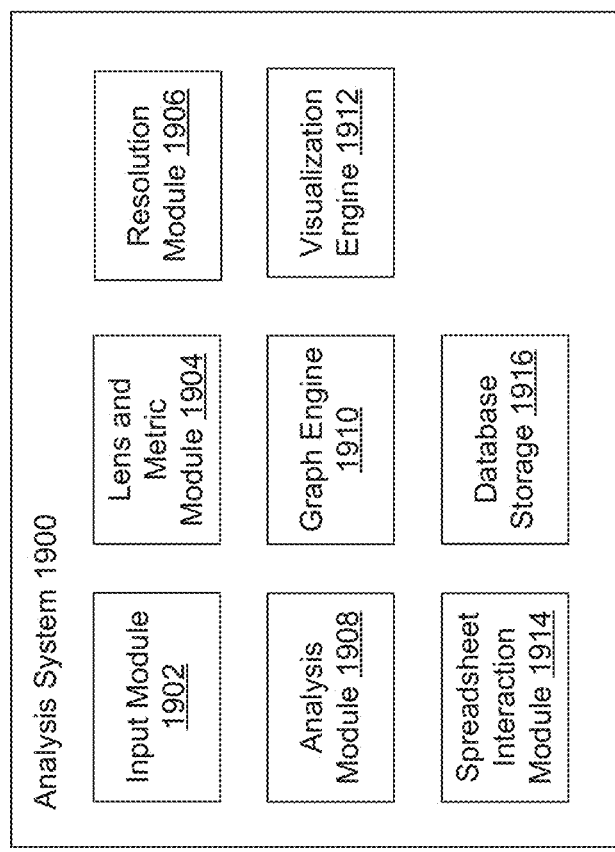
FIG. 19 is a block diagram of an example analysis system.

FIG. 19 is a block diagram of an example analysis system 1900. In some embodiments, the analysis system 1900 may be the analysis server 208 (see FIGS. 1 and 3) or a part of the analysis server 208. In various embodiments, the analysis server 208 may be a part of the analysis system 1900. The analysis system may be any digital device including a processor and memory (e.g., the digital device depicted in FIG. 18).

The analysis system 1900 may include an input module 1902, a lens and metric module 1904, a resolution module 1906, an analysis module 1908, a graph engine 1910, a visualization engine 1912, a spreadsheet interaction module 1914, and a database storage 1916. A module may be hardware, software (e.g., including instructions executable by a processor), or a combination of both. Alternative embodiments of the analysis system 1900 may comprise more, less, or functionally equivalent components and modules.

The input module 1902 may be configured to receive commands and preferences from the user device, data analyst, administrator, data storage device, or the like. In various examples, the input module 1902 receives lens function(s), metric function(s), and resolution selections to be used to perform TDA analysis. The output of the analysis may be a visualization of a graph and/or a report indicating relationships of data based on the TDA analysis.

The input module 1902 may receive a set of data or receive links (e.g., identifiers) to data in any number of databases or data structures. The links may be utilized by the analysis system 1900 to access or retrieve any data to be analyzed. In some embodiments, the input module 1902 may receive data or retrieve data stored in one or more spreadsheets.

In some embodiments, the input module 1902 may provide the user a variety of interface windows allowing the user to select and access a database, choose data for analysis, choose one or more lens functions, choose one or more metric functions, and identify resolution parameters for the analysis.

Although interactive windows may be described herein, those skilled in the art will appreciate that any window, graphical user interface, and/or command line may be used to receive or prompt a user or user device 202a for information.

The lens and metric module 1904 may receive one or more lens functions, one or more metric functions, and resolution to be utilized in TDA analysis. The lens and metric module 1904 may receive the lens function(s), and metric function(s) from an interface provided by the input module 1902. In some embodiments, the lens and metric module 1904 may allow a user or a digital device to provide or define the one or more lens functions, one or more metric functions, and/or a resolution.

The resolution module 1906 may receive a resolution, lens parameter(s), and/or metric parameter(s). In one example, the user enters a number of intervals and a percentage overlap for a cover of a reference space. It will be appreciated that the resolution, lens function(s), and/or metric function(s) may be determined based on heuristics applied to the data from the spreadsheets. In some embodiments, the resolution, lens function(s), and/or metric function(s) may be determined by outcome analysis (discussed in US Publication 2016/0350389, titled "Outcome Analysis for Graph Generation," filed May 26, 2016, and incorporated herein by reference), or any other source.

The analysis module 1908 may perform TDA analysis based on the data identified and/or provided by the user. The data to be analyzed may include data received by the analysis system 1900 and/or data that has been identified (or linked) in one or more data sources (e.g., cloud storage, hard drive, server storage, data warehouse, digital device, and/or the like). In various embodiments, the data to be analyzed may be in one or more spreadsheets and/or in any number of sources.

The analysis module 1908 may perform TDA (as discussed herein) on the data points. For example, the analysis module 1908 may retrieve data points from a spreadsheet. Each row in the spreadsheet may be a data point and any number of columns may include a dimension or characteristic (e.g., attribute) of the data points.

The analysis module 1908 map the data points into a reference space using the selected lens function(s) (optionally in conjunction with one or more of the selected metric function(s)). The analysis module 1908 may generate a cover using the resolution and cluster the data points using the metric function(s) to identify nodes in a graph (e.g., unvisualized). Each of the nodes in the graph may include data points of the data from the spreadsheet(s). In some embodiments, the graph engine 1910 generates the graph that includes nodes containing data points (e.g., data points may be members of nodes).

The visualization engine 1912 optionally generates a visualization of the graph based on the output from the analysis module 1908 and/or the graph engine 1910. The interactive visualization allows the user to see all or part of the analysis graphically.

In some embodiments, the visualization of the graph may optionally allow the user to interact with the visualization. In one example, the user may select portions of a graph from within the visualization to see and/or interact with the underlying data and/or underlying analysis. The user may then change the parameters of the analysis (e.g., change the metric, filter(s), or resolution(s)) which allows the user to visually identify relationships in the data that may be otherwise undetectable using prior means. The interactive visualization is further described herein. In other embodiments, the visualization is not interactive.

The spreadsheet interaction module 1914 may enable interaction between one or more spreadsheet applications (e.g., enabling interaction with any number of spreadsheets and/or worksheets) and any number of analysis systems 1900. In some embodiments, the spreadsheet interaction module 1914 may enable interactions between a visualization of a TDA network and spreadsheet functionality. For example, if a user selects nodes in a TDA network visualization, data rows in the spreadsheet corresponding to data points that are members of the selected nodes may be automatically highlighted in the spreadsheet. Similarly, if a user selects one or more rows in a spreadsheet, the spreadsheet interaction module 1914 may enable automatic highlighting of nodes in the TDA visualization that contain corresponding data points. Further, the spreadsheet interaction module 1914 may enable additional information (e.g., explain information) indicating additional detail regarding selected data points in the spreadsheet.

The spreadsheet interaction module 1914 may provide information and/or control interactions between an analysis system and a spreadsheet in any number of ways. For example, the interaction module 1914 may include one or more sensors to detect and/or identify interactions within the TDA visualization and/or spreadsheet. For example, selections or commands of a TDA visualization provided by a user may be detected by the spreadsheet interaction module 1914. Similarly, selections or commands of a spreadsheet provided by a user may be detected by the spreadsheet interaction module 1914. The spreadsheet interaction module 1914 may include a translation module configured to identify actions and/or data. For example, if a user interaction is detected regarding a node in the TDA visualization, the translation module may determine the data points in the spreadsheet that correspond to data points in the node. The translation module may then issue a command or provide information to an API of the spreadsheet application to highlight the data points in the spreadsheet or perform other functions. The spreadsheet interaction module 1914 is further discussed herein.

The database storage 1916 is configured to store all or part of the data, subsets of data, graph information, explaining information (e.g., information indicating relationships, similarity, and/or dissimilarity of data in the modified graph) or any other information. Further, the database storage 1916 may be used to store user preferences, lens functions, metric functions, resolutions, parameters, and analysis output thereby allowing the user to perform many different functions without losing previous work.

Those skilled in the art will appreciate that that the analysis system 1900 may include a processing module (e.g., processing module 312) that may include any number of processors.

In various embodiments, systems and methods discussed herein may be implemented with one or more digital devices. In some examples, some embodiments discussed herein may be implemented by a computer program (instructions) executed by a processor. The computer program may provide a graphical user interface. Although such a computer program is discussed, those skilled in the art will appreciate that embodiments may be performed using any of the following, either alone or in combination, including, but not limited to, a computer program, multiple computer programs, firmware, and/or hardware.

A module and/or engine may include any processor or combination of processors. In some examples, a module and/or engine may include or be a part of a processor, digital signal processor (DSP), application specific integrated circuit (ASIC), an integrated circuit, and/or the like. In various embodiments, the module and/or engine may be software or firmware.

Figure 20:
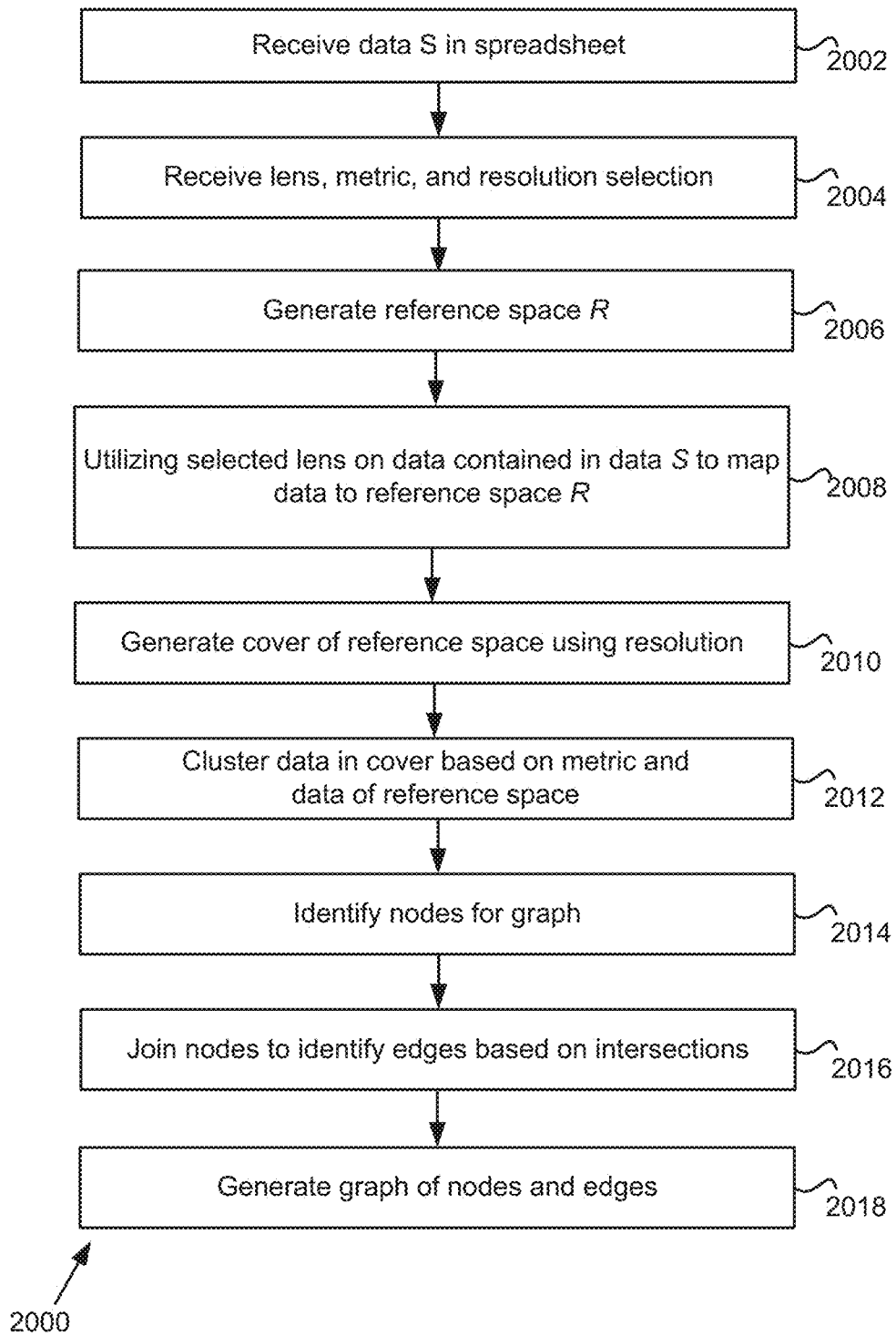
FIG. 20 is a flow chart for performing TDA on a data using lens function(s), metric function(s), and a resolution in some embodiments.

FIG. 20 is a flow chart 2000 for performing TDA on a data using lens function(s), metric function(s), and a resolution in some embodiments. As similarly discussed regarding the flowchart of FIG. 8, in various embodiments, the processing on data and user-specified options is motivated by techniques from topology and, in some embodiments, topological data analysis. These techniques may be robust and general. In one example, these techniques apply to almost any kind of data for which some qualitative idea of "closeness" or "similarity" exists. The techniques discussed herein may be robust because the results may be relatively insensitive to noise in the data and even to errors in the specific details of the qualitative measure of similarity, which, in some embodiments, may be generally refer to as "the distance function" or "metric." It will be appreciated that while the description of the algorithms below may seem general, the implementation of techniques described herein may apply to any level of generality.

In this flowchart, performing TDA on any data set (e.g., data in received from or accessed from any number of sources including one or more spreadsheets) is discussed. It will be appreciated that steps 2006-2014 may be performed on any data set. In step 2002, the input module 1902 (see FIG. 9) receives data S from a spreadsheet. In various embodiments, data S is treated as being processed as a finite "similarity space," where data S has a real-valued function d (e.g., where d is a metric defined by the metric function(s)) defined on pairs of points s and t in S, such that:

$d(s,s)=0$ $d(s,t)=d(t,s)$ $d(s,t)>=0$

These conditions may be similar to requirements for a finite metric space, but the conditions may be weaker.

Figure 21:
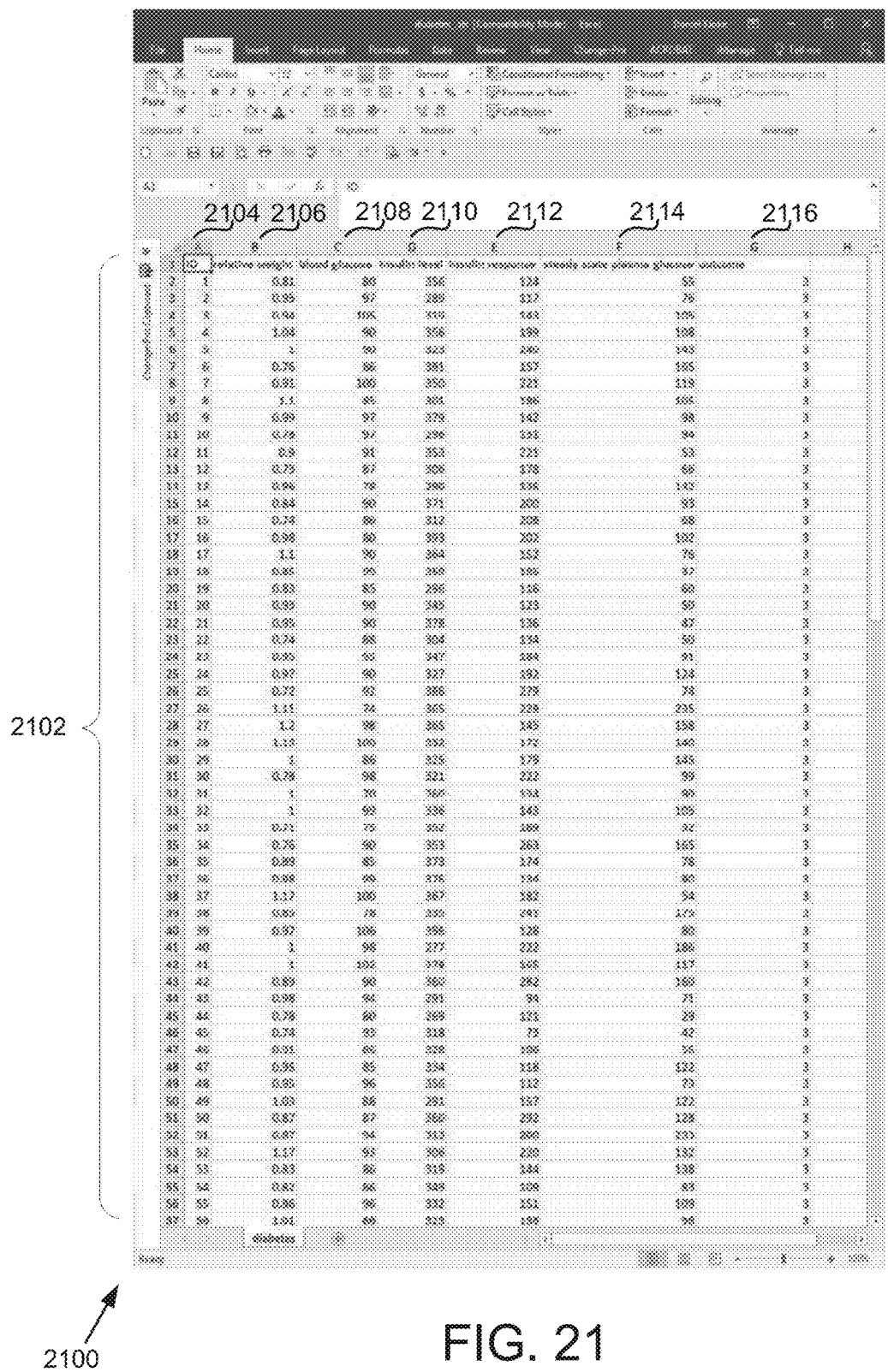
FIG. 21 depicts an example spreadsheet application interface displaying an example spreadsheet.

FIG. 21 depicts an example spreadsheet application interface displaying an example spreadsheet 2100. In this example, the spreadsheet application interface is an interface for MICROSOFT EXCEL. The spreadsheet 2100 contains data related to patients that have or may have diabetes. Each row of data in the spreadsheet 2100 is a data point indicating a particular patient. Each column may include entries (e.g., values) associated with a dimension (e.g., attribute of the data point). The "A" column indicates patient identifier 2104. It will be appreciated that the patient identifier may be optional. For example, since rows in a spreadsheet are typically numbered by default, each data point (e.g., row) in a spreadsheet may be associated with an identifier (e.g., number) provided by the spreadsheet application.

The "B" column of the spreadsheet 2100 indicates a relative weight 2106 values for each particular data point. The "C" column of the spreadsheet 2100 indicates a blood glucose 2108 values for each particular data point. The "D" column of the spreadsheet 2100 indicates an insulin level 2110 values for each particular data point. The "E" column of the spreadsheet 2100 indicates an insulin response 2112 values for each particular data point. The "F" column of the spreadsheet 2100 indicates steady state plasma glucose 2114 values for each particular data point. The "G" column of the spreadsheet 2100 indicates outcome 2116 values for each particular data point. Each column may include entries that are categorical or entries that indicate a point on a continuum. For example, the outcome 2116 column includes categorical entries. In this example, the outcome 2116 column includes three separate outcomes designated by the values "1," "2," or "3." The insulin level 2110 column includes entries from a continuum designated by values that range from 269 to 1568.

Although columns A-G are shown in spreadsheet 2100, it will be appreciated that there may be any number of columns in any order. Further, although each column identifies a separate value for a data point, there may be no value in some columns for some data points, the value may be a null, or the values may be strings, numbers, letters, links, functions, equations, or any combination. Further, although 56 different data points are displayed in the spreadsheet 2100 in FIG. 21, it will be appreciated that there may be any number of rows. For example, in this case, there are 145 data points (e.g., 145 patients, each with related information).

Data S may include any number of the data points in spreadsheet 2100. Similarly, data S may include any number of columns from the spreadsheet 2100. In some embodiments, any or all of the data or subsets of data from any column may be changed, altered (e.g., using a function to generate a new value), or disregarded. Similarly, additional columns (e.g., dimensions) may be created using information from different sources and/or using one or more functions based on existing data in the spreadsheet 2100.

It will be appreciated that data S may be a finite metric space, or a generalization thereof, such as a graph or weighted graph. In some embodiments, data S be specified by a formula, an algorithm, or by a distance matrix which specifies explicitly every pairwise distance. It will be appreciated that in this example, data S may include a subset of data or the entire set of data.

In step 2004, the input module 1902 may receive a lens function and metric function selection. The lens function may be any function or combination of functions that project data (e.g., maps data) based on data S in a reference space. There may be any number of selected lens functions. The metric function may be any function or combination of functions for clustering data in a covered reference space.

The lens and/or metric function selections may be provided by a data analyst, administrator, inferred from all or part of data S, in the data S, or any other source. The lens function may be any function, including, but not limited to L1 centrality, L2 centrality, Gaussian density, PCA, metric PCA, MDS, or the like.

In steps 2006 and 2008, the input module 1902, the lens and metric module 1904, and/or the analysis module 1908 may generate reference space R and may map data S to the reference space utilizing the selected lens function and data S. In some embodiments, the selected lens function may utilize the selected metric function to map data S to the reference Space R. It will be appreciated that, in some embodiments, steps 2006 and 2008 may be the same step.

In one example of step 2008, the analysis module 2008 utilizes the selected lens function(s) using one or more of the selected metric function(s) on all or some of the data contained in data S to map the data S to the reference space R (e.g., where data S has m rows and n columns). Reference space R may be a metric space (e.g., such as the real line). In some embodiments, the analysis module 1908 generates a map ref( ) from S into R. The map ref( ) from S into R may be called the "reference map." In one example, R may be Euclidean space of some dimension, but it may also be the circle, torus, a tree, or other metric space. The map can be described by one or more metrics (i.e., real valued functions on S).

In step 2010, the resolution module 1906 generates a cover of R based on the resolution (e.g., len(es), intervals, and overlap—see discussion regarding FIG. 7 for example). The resolution may be received from data analyst, administrator, inferred from all or part of data S, in the data S, determined by outcome analysis (discussed in US Publication 2016/0350389, titled "Outcome Analysis for Graph Generation," filed May 26, 2016, and incorporated herein by reference), or any other source. Similarly, in some embodiments, one or more of the lens function(s) and/or the metric function(s) may be determined by outcome analysis described in the reference above.

The cover of R may be a finite collection of open sets (in the metric of R) such that every point in R lies in at least one of these sets. In various examples, R is k-dimensional Euclidean space, where k is the number of lens functions. More precisely in this example, R is a box in k-dimensional Euclidean space given by the product of the intervals [min_k, max_k], where min_k is the minimum value of the k-th lens function on S, and max_k is the maximum value.

As discussed herein, suppose there are 2 lens functions, F1 and F2, and that F1's values range from −1 to +1, and F2's values range from 0 to 5. Then the reference space is the rectangle in the x/y plane with corners (−1,0), (1,0), (−1, 5), (1, 5), as every point s of S will give rise to a pair (F1(s), F2(s)) that lies within that rectangle.

In various embodiments, the cover of R is given by taking products of intervals of the covers of [min_k,max_k] for each of the k filters. In one example, if the user requests 2 intervals and a 50% overlap for F1, the cover of the interval [−1,+1] will be the two intervals (−1.5, 0.5), (−0.5, 1.5). If the user requests 5 intervals and a 30% overlap for F2, then that cover of [0, 5] will be (−0.3, 1.3), (0.7, 2.3), (1.7, 3.3), (2.7, 4.3), (3.7, 5.3). These intervals may give rise to a cover of the 2-dimensional box by taking all possible pairs of intervals where the first of the pair is chosen from the cover for F1 and the second from the cover for F2. This may give rise to 2*5, or 10, open boxes that covered the 2-dimensional reference space. However, those skilled in the art will appreciate that the intervals may not be uniform, or that the covers of a k-dimensional box may not be constructed by products of intervals. In some embodiments, there are many other choices of intervals. Further, in various embodiments, a wide range of covers and/or more general reference spaces may be used.

In one example, given a cover, $C_1, \ldots, C_m$, of R, the reference map is used to assign a set of indices to each point in S, which are the indices of the $C_j$ such that ref(s) belongs to $C_j$. This function may be called ref_tags(s). In a language such as Java, ref_tags would be a method that returned an int[]. Since the C's cover R in this example, ref(s) must lie in at least one of them, but the elements of the cover usually overlap one another, which means that points that "land near the edges" may well reside in multiple cover sets. In considering the two filter example, if F1 (s) is −0.99, and F2 (s) is 0.001, then ref(s) is (−0.99, 0.001), and this lies in the cover element (−1.5, 0.5)×(−0.3, 1.3). Supposing that was labeled $C_1$, the reference map may assign s to the set {1}. On the other hand, if t is mapped by F1, F2 to (0.1, 2.1), then ref(t) will be in (−1.5, 0.5)×(0.7, 2.3), (−0.5, 1.5)×(0.7, 2.3), (−1.5, 0.5)×(1.7, 3.3), and (−0.5, 1.5)×(1.7, 3.3), so the set of indices would have four elements for t.

Having computed, for each point, which "cover tags" it is assigned to, for each cover element, Ca, the points may be constructed, whose tags included, as set S(d). This may mean that every point s is in S(d) for some d, but some points may belong to more than one such set. In some embodiments, there is, however, no requirement that each S(d) is non-empty, and it is frequently the case that some of these sets are empty. In the non-parallelized version of some embodiments, each point x is processed in turn, and x is inserted into a hash-bucket for each j in ref_tags(t) (that is, this may be how S(d) sets are computed).

It will be appreciated that the cover of the reference space R may be controlled by the number of intervals and the overlap identified in the resolution (e.g., see further discussion regarding FIG. 7). For example, the more intervals, the finer the resolution in S—that is, the fewer points in each S(d), but the more similar (with respect to the lens) these points may be. The greater the overlap, the more times that clusters in S(d) may intersect clusters in S(e)—this means that more "relationships" between points may appear, but, in some embodiments, the greater the overlap, the more likely that accidental relationships may appear.

In step 2012, the analysis module 1908 clusters data in the cover based on the selected metric function (e.g., cosine distance) and data S (e.g., each S(d) based on the metric function).

In some embodiments, the selected metric function may amount to a "forced stretching" in a certain direction. In some embodiments, the analysis module 1908 may not cluster two points unless all of the metric values (e.g., metric values being based on data in the reference space after application of the selected metric) are sufficiently "related" (recall that while normally related may mean "close," the cover may impose a much more general relationship on the metric values, such as relating two points s and t if ref(s) and ref(t) are sufficiently close to the same circle in the plane).

The output may be a simplicial complex, from which one can extract its 1-skeleton. The nodes of the complex may be partial clusters, (i.e., clusters constructed from subsets of S specified as the preimages of sets in the given covering of the reference space R).

In step 2014, the graph engine 1910 identifies nodes which are associated with a subset of the partition elements of all of the S(d) for generating a graph. For example, suppose that S={1, 2, 3, 4}, and the cover is $C_1$, $C_2$, $C_3$. Then if ref_tags(1)={1, 2, 3} and ref_tags(2)={2, 3}, and ref_tags (3)={3}, and finally ref_tags(4)={1, 3}, then S(1) in this example is {1, 4}, S(2)={1,2}, and S(3)={1,2,3,4}. If 1 and 2 are close enough to be clustered, and 3 and 4 are, but nothing else, then the clustering for S(1) may be {1} {3}, and for S(2) it may be {1,2}, and for S(3) it may be {1,}, {3,4}. So the generated graph has, in this example, at most four nodes, given by the sets {1}, {4}, {1,2}, and {3,4} (note that {1,2} appears in two different clusterings). Of the sets of points that are used, two nodes intersect provided that the associated node sets have a non-empty intersection (although this could easily be modified to allow users to require that the intersection is "large enough" either in absolute or relative terms).

Nodes may be eliminated for any number of reasons. For example, a node may be eliminated as having too few points and/or not being connected to anything else. In some embodiments, the criteria for the elimination of nodes (if any) may be under user control or have application-specific requirements imposed on it.

In step 2016, the graph engine 1910 optionally determine intersections of clusters to identify edges (e.g., connecting lines between nodes). Once the nodes are constructed, the graph engine 1910 may compute intersections (e.g., edges) by computing, for each point, the set of node sets. For example, for each s in S, node_id_set(s) may be computed, which is an int[]. In some embodiments, if the cover is well behaved, then this operation is linear in the size of the set S, and may then iterate over each pair in node_id_set(s). There may be an edge between two node_id's if they both belong to the same node_id_set( ) value, and the number of points in the intersection is the number of different node_id sets in which that pair is seen. This means that, except for the clustering step (which is often quadratic in the size of the sets S(d), but whose size may be controlled by the choice of cover), all of the other steps in the graph construction algorithm may be linear in the size of S, and may be computed quite efficiently. In various embodiments, the graph engine 1910 may generate a graph (e.g., structure graph or boost graph) without generating edges between nodes.

In step 2018, the graph engine 1910 generates the graph (e.g., modified graph) of interconnected nodes. In various embodiments, the visualization engine 1912 generates a visualization of the graph (e.g., nodes and edges displayed in FIGS. 9 and 10). The visualization may be interactive as described herein.

Figure 22:
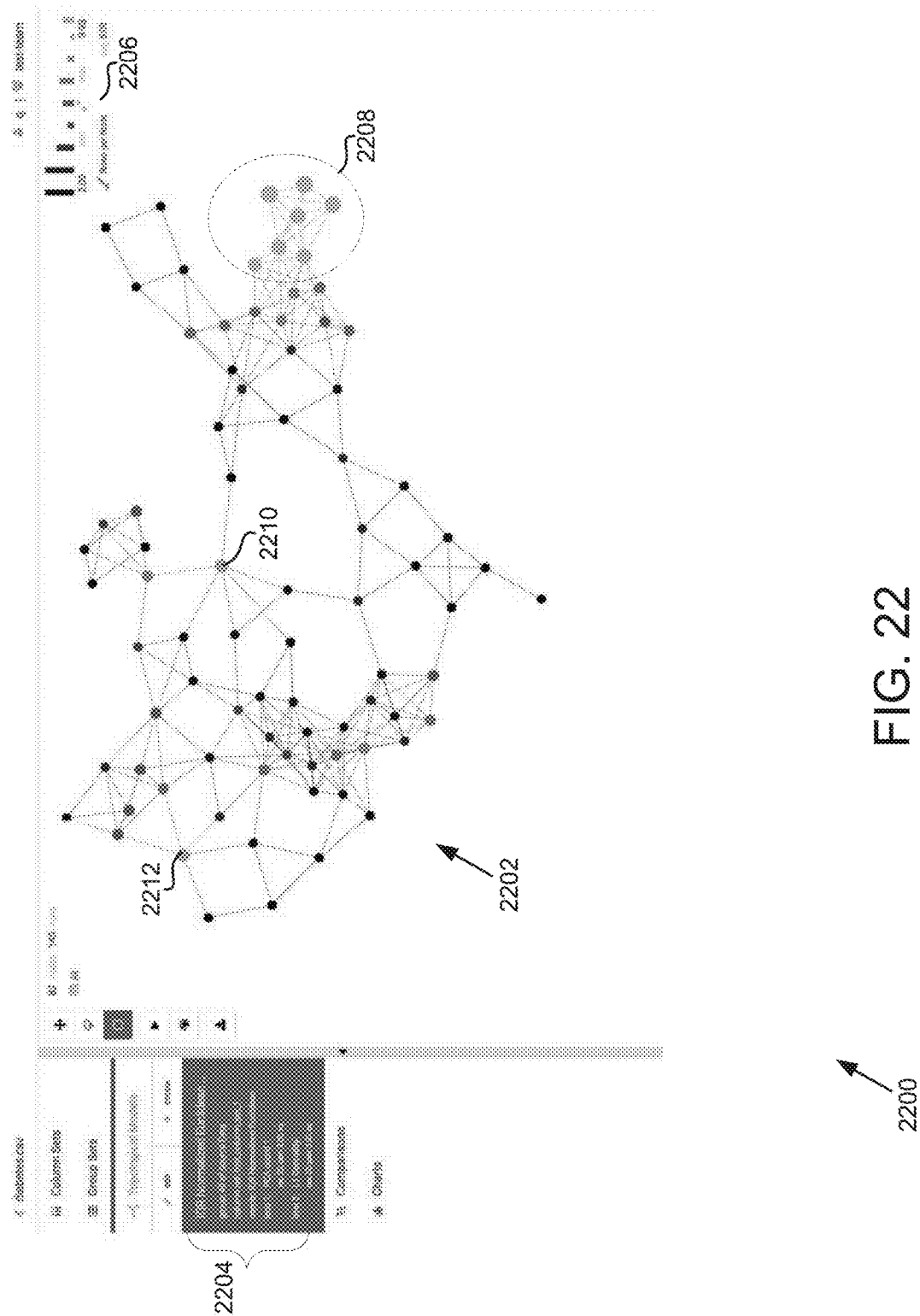
FIG. 22 depicts an interface including a visualization of a network including nodes and edges.

FIG. 22 depicts an interface 2200 including a visualization 2202 of a network including nodes and edges. The interface 2200 includes a menu including analysis information 2204 related to generation of the network of nodes and edges. In this example, the analysis information 2204 indicates that an IQR (Interquartile Range) normalized Euclidean metric was used in the TDA analysis as well as a PCA coordinate 1 lens and an L1 centrality lens. A resolution of 20 with a gain of 3 (i.e., 20 intervals with 66% overlap) is used in the TDA analysis.

The nodes may be colored in the visualization 2202 based on a dimension or attribute. For example, the nodes in the visualization 2202 may be colored based on outcome, insulin level, insulin response, or any other dimension or combination of dimensions. In this example, the nodes in group 2208 share the same color as nodes 2210 and 2212.

As discussed herein, nodes can be colored based on any number of factors. In one example, if the nodes are colored based on the blood glucose dimension, the analysis system 1900 may scan (or the spreadsheet may provide) the range of values of the blood glucose dimension. Alternately, the range of possible values may be received from another source. The analysis system 1900 may associate the range of values for blood glucose with a range of colors (e.g., greyscale values, heatmap colors, or the like).

The visualization engine 1912 may determine a color for each node based on the data points that are members of that particular node. If there is only one data point that is a member of the node, the visualization engine 1912 may color that node based on the color associated with that data point's value in that particular dimension. For example, if node 2210 only includes data point 22 from the spreadsheet identified in FIG. 21, then the visualization engine 1912 may color the node with the color associated with blood glucose value 88 (e.g., the visualization engine 1912 may include a range of values associated with each color of the range such as values 80-90 may be dark grey).

If there are more than one data point that is a member of the node, the visualization engine 1912 may average the value of that dimension for all data points or any other summary statistic (e.g., mean, median, or mode) to determine a node representation dimension value and then may color the node based on the color associated with the node representation value. It will be appreciated that that the visualization engine 1912 may determine a node representation dimension value using any function or combination of functions (and is not limited to averaging of values).

In various embodiments, the visualization engine 1912 may display the range of colors, range of values, dimensions that are being colored, statistical values, and/or the like in legend 2206 of the visualization 2202.

In some embodiments, in addition to computing edges (pairs of nodes), the embodiments described herein may be extended to compute triples of nodes, etc. For example, the analysis module 1908 may compute simplicial complexes of any dimension (by a variety of rules) on nodes, and apply techniques from homology theory to the graphs to help users understand a structure in an automatic (or semi-automatic) way.

Further, it will be appreciated that the analysis module 1908 may not generate uniform intervals in the covering. Further, in various embodiments, an interface may be used to encode techniques for incorporating third-party extensions to data access and display techniques. Further, an interface may be used to for third-party extensions to underlying infrastructure to allow for new methods for generating coverings, and defining new reference spaces.

Figure 23:
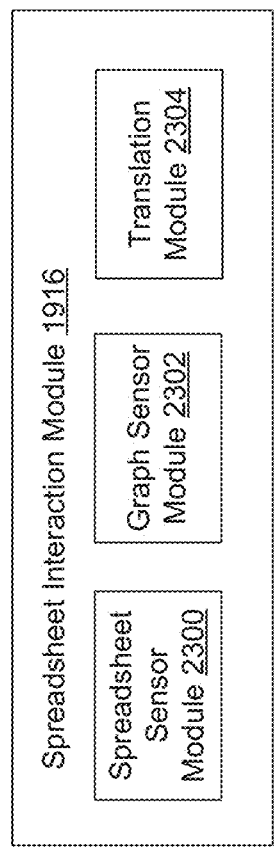
FIG. 23 depicts a spreadsheet interaction module in some embodiments.

FIG. 23 depicts a spreadsheet interaction module 1916 in some embodiments. The spreadsheet interaction module 1916 may comprise a spreadsheet sensor module 2300, a graph sensor module 2302, and a translation module 2304. In various embodiments, the spreadsheet interaction module 1916 may control or assist in controlling interactions of data between a network visualization 2202 and a spreadsheet 2100.

In various embodiments, the spreadsheet interaction module 1916 may associate data points that are members of nodes 1916 in the network visualization with the data points of the spreadsheet 2100. All or part of the spreadsheet interaction module 1916 may detect changes (e.g., highlighting nodes) in the network visualization 2202, identify the data of the spreadsheet that may be affected, and then provide information and/or commands to the spreadsheet application to identify data points, dimensions, or related information to the user. Similarly, the spreadsheet interaction module 1916 may detect changes (e.g., highlighting data points) in the spreadsheet, identify the data points and nodes of the data points in the network visualization that are associated with the highlighted data points, and provide information and/or commands to the interface 2200 and/or the network visualization 2202.

In some embodiments, the spreadsheet interaction module 1916 may associate the spreadsheet sensor module 2300 or configure the spreadsheet sensor module 2300 to detect changes within a spreadsheet. For example, the spreadsheet interaction module 1916 may install the spreadsheet sensor module 2300 within a digital device to communicate with a spreadsheet application to enable interaction with the spreadsheet 2100. The spreadsheet sensor module 2300 may be installed to function with the spreadsheet application. Alternately, the spreadsheet sensor module 2300 may be installed on another digital device in communication with the digital device executing the spreadsheet application.

Similarly, the spreadsheet interaction module 1916 may associate the graph sensor module 2302 or configure the graph sensor module 2302 to detect changes within a TDA network. For example, the spreadsheet interaction module 1916 may install the graph sensor module 2302 within a digital device to communicate with a visualization interface 2200 to enable interaction with the network visualization 2202. The graph sensor module 2302 may be installed to function with the visualization interface 2200. Alternately, the graph sensor module 2302 may be installed on another digital device in communication with the digital device executing the network visualization 2202.

The translation module 2304 may be configured to track information between any number of spreadsheets and any number of visualization. In one example, when the analysis system 1900 receives data from a spreadsheet, the translation module 2304 may track locations of data points (e.g., by a row identifier and/or by an identifier indicated in a column of the spreadsheet) as well as dimensions (e.g., by a column identifier and/or identifier indicated at the top of a column). The translation module 2304 may also track which data points are members of which nodes in the network visualization. For example, the translation module 2304 may generate one or more tables for tracking the location of data points and/or dimensions in the spreadsheet and the network visualization. In this example, a location may refer to the logical location of one or more data points in the spreadsheet (e.g., by row and column). In another example, location may refer to the membership of a data point in one or more nodes and/or degree of similarity with any number of other data point.

The translation module 2304 may also associate information between the network visualization and the spreadsheet. For example, if the user highlights nodes in the network visualization, the translation module 2304 may identify the data points that are members of the highlighted nodes and may also identify the corresponding data points in the spreadsheet. Similarly, if the user highlights data points in the spreadsheet, the translation module 2304 may identify the corresponding nodes that contain the highlighted data points as members in the network visualization.

In various embodiments, the translation module 2304 may also provide commands or API calls associated with the visualization interface (e.g., the TDA application or analysis system 1900 in communication with the visualization interface) and/or the spreadsheet application in communication with the spreadsheet. For example, if the user highlights nodes in the network visualization, the translation module 2304 may identify the data points that are members of the highlighted nodes, identify the corresponding data points in the spreadsheet, and provide commands (or API calls) to the spreadsheet application to highlight the corresponding data points in the spreadsheet. Similarly, if the user highlights data points in the spreadsheet, the translation module 2304 may identify the corresponding nodes that contain the highlighted data points as members in the network visualization and provide commands (or API calls) to the visualization interface (e.g., the TDA application or analysis system 1900 in communication with the visualization interface) to highlight corresponding nodes in the network visualization and/or generate an updated legend. The translation module 2304 may provide any number of function calls and/or API calls for any number of functions.

Figure 24:
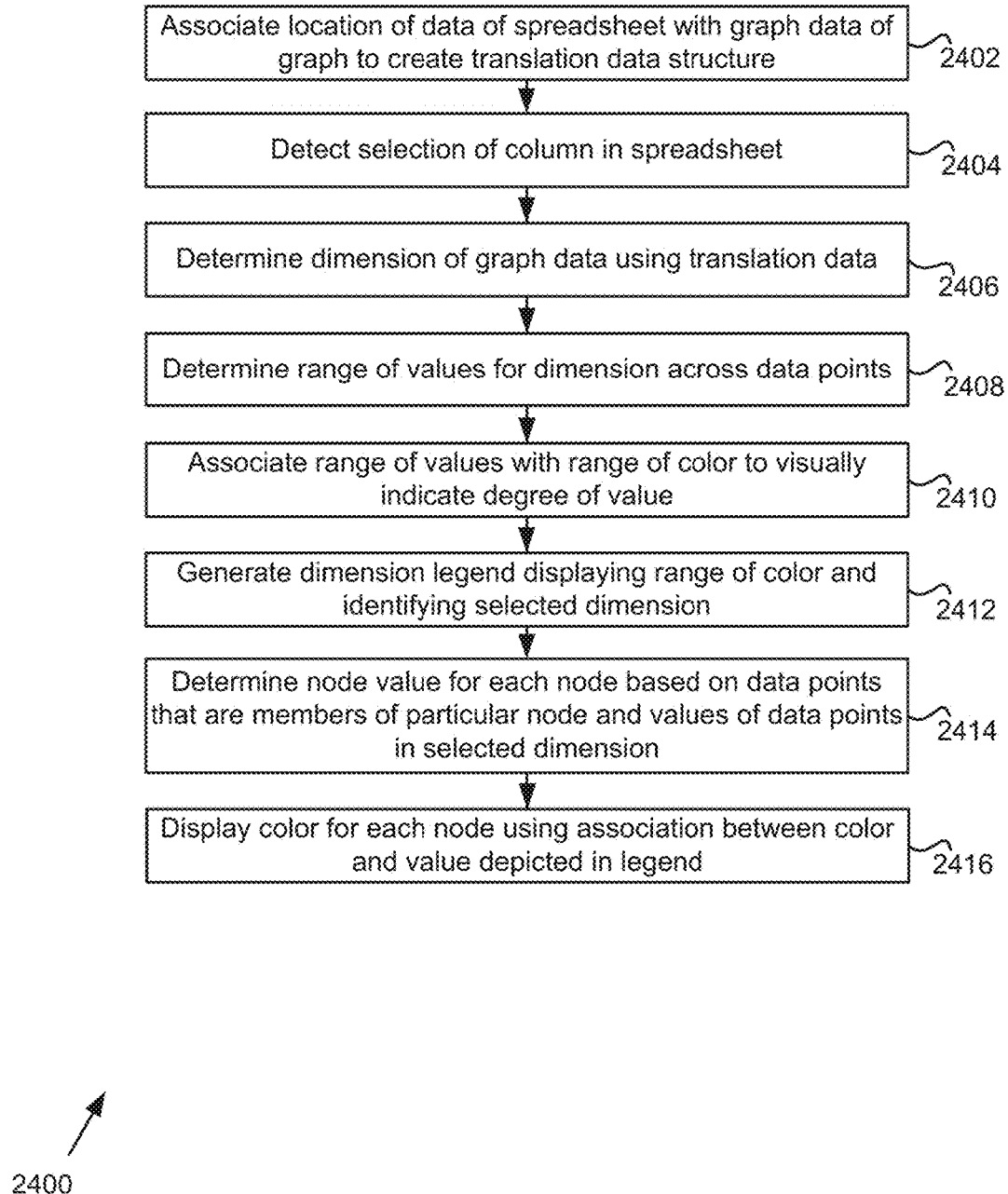
FIG. 24 is a flowchart for initiating changes in a network visualization based on changes in a related spreadsheet.

FIG. 24 is a flowchart 2400 for initiating changes in a network visualization 2202 based on changes in a related spreadsheet 2100. In various embodiments, the analysis system 1900 generates a network visualization 2202 using TDA analysis of data contained in the spreadsheet 2100 (e.g., using all or part of the method related to FIG. 20). In step 2402, the translation module 2304 generates a translation table indicating location of data points and dimensions (e.g., rows and columns) in the spreadsheet 2100 as well as location of data points and nodes in the network visualization 2202. The translation table (e.g., translation data structure) may include translation data. Translation data may include location of data points and dimensions (e.g., rows and columns) in the spreadsheet 2100 as well as location of data points and nodes in the network visualization 2202.

In various embodiments, the translation module 2304 scans the spreadsheet 2100 or receive information in the spreadsheet to generate a translation data structure (e.g., table) indicating location of data points and dimensions (e.g., rows and columns) in the spreadsheet 2100. The translation module 2304 scans the spreadsheet 2100 or receive information in the spreadsheet at any time.

The translation module 2304 may also receive node information (e.g., node identification information that identifies each node) as well as data point information (e.g., for each data point, the data point information identifies that particular data point as well as the node(s) that the particular data point is a member). The translation module 2304 may receive the information from any part of the analysis system 1900 (e.g., after nodes are generated, after the graph is generated, or after a network visualization is generated), may scan information related to the graph (e.g., results, reports, or output from TDA analysis of the data points), or may scan the network visualization. The translation module 2304 may also associate corresponding data points and/or dimensions between the network visualization 2202 and the spreadsheet 2100.

Figure 25:
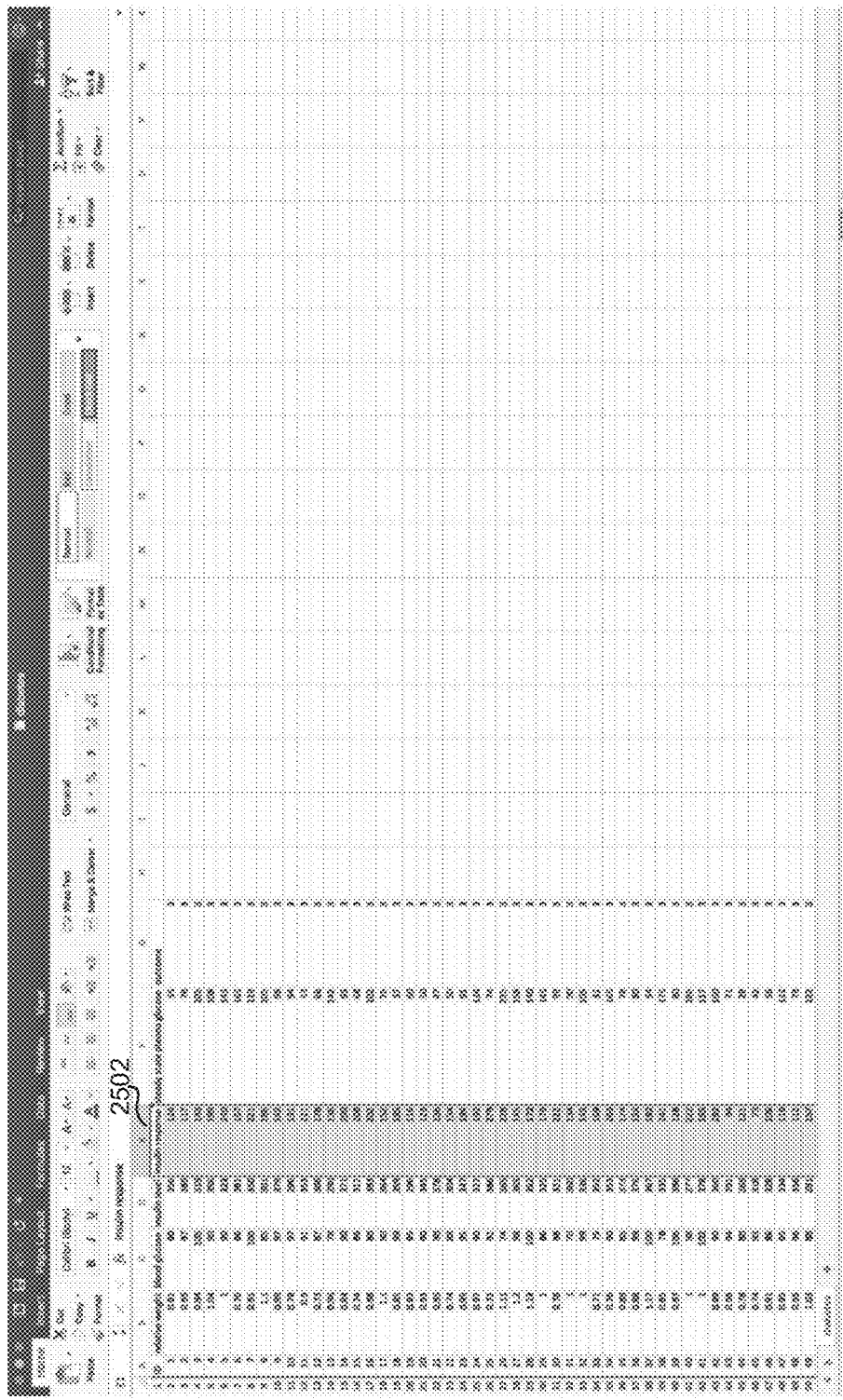
FIG. 25 depicts the example spreadsheet with a selected column or data dimension.

In step 2404, the spreadsheet sensor module 2300 detects selection of a column in the spreadsheet 2100. For example, a user may utilize the spreadsheet application and select a column (e.g., a dimension) of the spreadsheet 2100. FIG. 25 depicts the example spreadsheet 2100 with a selected column or data dimension. In this example, the user selected column 2502 indicating insulin response of the spreadsheet 2100. The spreadsheet 2100 has highlighted the selected column 2502 indicating the selection. The spreadsheet sensor module 2300 may be a part of the spreadsheet application or may be in communication with the spreadsheet application. In some embodiments, the spreadsheet application may report one or more changes to the spreadsheet sensor module 2330. In various embodiments, the spreadsheet sensor module 2330 may "listen" or query the spreadsheet application (e.g., with API calls or other requests) to detect changes in the spreadsheet 2100.

The spreadsheet sensor module 2300 may detect a change in the spreadsheet and may subsequently request and/or receive spreadsheet modification information indicating changes and/or selections within the spreadsheet 2100. In this example, the spreadsheet sensor module 2300 detects selection of column 2502 indicating insulin response in the spreadsheet 2100.

In step 2406, the spreadsheet sensor module 2300 determines the dimension in the spreadsheet 2100 that was selected by the user. In various embodiments, the spreadsheet sensor module 2300 may utilize translation data from the translation table to identify the relevant dimensions. In various embodiments, the dimension is indicated in information provided to the spreadsheet sensor module 2300 and, as such, step 2406 may be optional.

In step 2408, the graph engine 1910, visualization engine 1912, and/or translation module 2304 determines the range of values for the selected dimension 2502 across data points in the spreadsheet 2100. In some embodiments, the translation module 2304 may collect information including ranges of values for each dimension of the spreadsheet 2100 at any time (i.e., the translation module 2304 may have already collected information regarding the range of values of one or more dimensions prior to detection of selection of columns in the spreadsheet 2100). In this example, the translation module 2304 may determine the range of insulin response values to be between 10 and 748.

In step 2410, the translation module 2304 and/or the visualization engine 1912 associates the range of values of the selected dimension 2502 of the spreadsheet 2100 with a range of color to provide a color indicator of value for the selected dimension in the network visualization 2602. The range of color can be a default range (e.g., from blue to red colors or range of greyscale colors) or custom colors provided by the data, data analyst, another digital device, or any source. The graph engine 1910, visualization engine 1912, and/or translation module 2304 may associate the top or bottom of the range of values with the top or bottom of the range of colors (e.g., from blue to red). In various embodiments, the translation module 2304 may associate the values or group of values of the selected dimension with any of the colors, group, or sub-range of colors.

Figure 26:
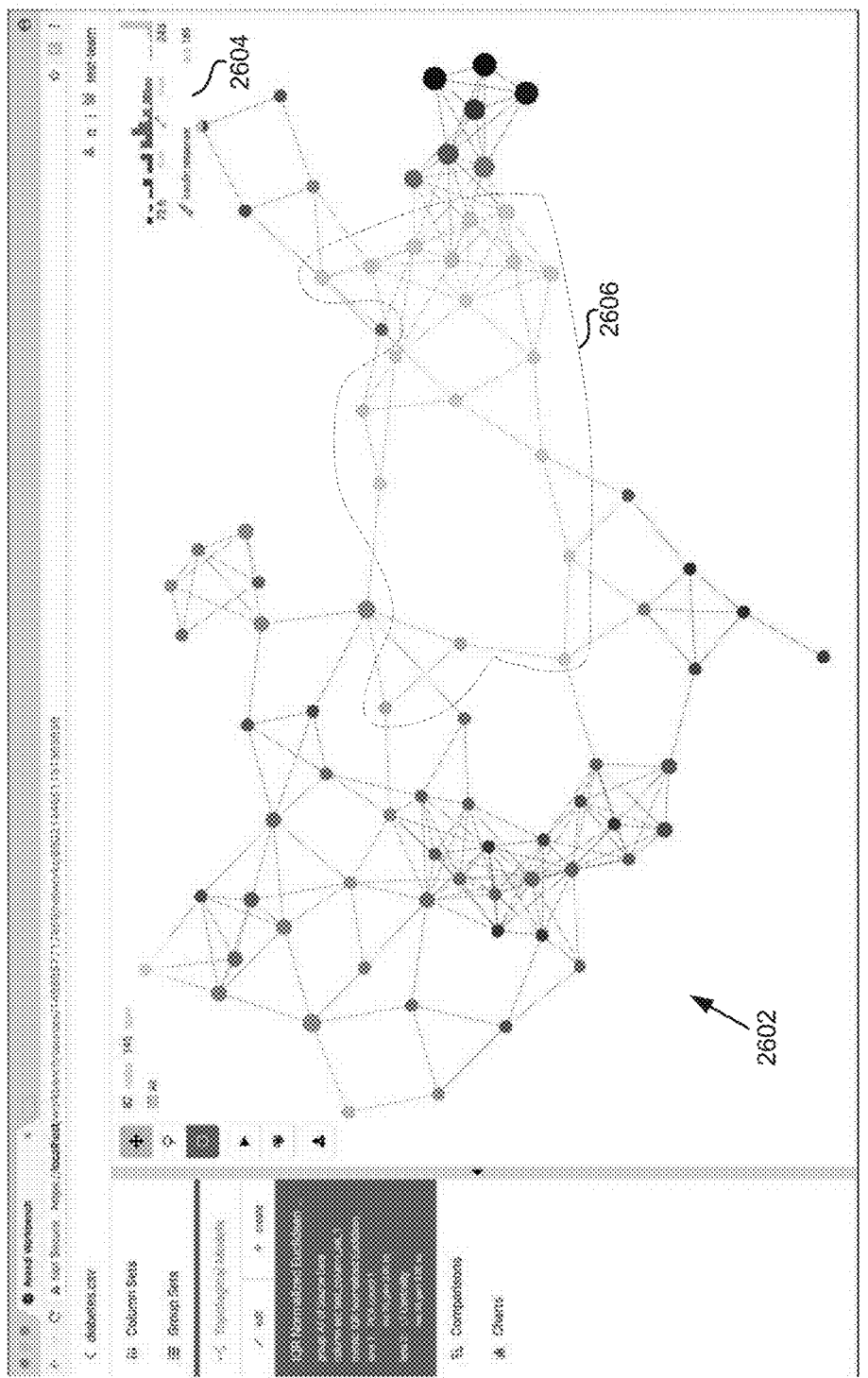
FIG. 26 depicts the network visualization including a coloring of all nodes based on the selected dimension.

In step 2412, the visualization engine 1912 may generate a dimension legend displaying the range of color and identifying the selected dimension in the network visualization 2602. FIG. 26 depicts the network visualization 2602 with a dimension legend 2604. In this example, the translation module 2304 and/or the visualization engine 1912 associated a range of greyscale colors with the range of values of the selected dimension 2502 of the spreadsheet 2100. The dimension legend visually depicts the range of color (e.g., greyscale range), identifies the selected dimension 2502 of the spreadsheet 2100, indicates the average insulin value across all data points of the spreadsheet 2100 (e.g., which may be calculated by the translation module 2304), and provides a bar graph depicting the number of data points (or nodes) associated with different insulin response values or groups of values.

In step 2414, the visualization engine 1912 determines a node value for each node in the network visualization 2602 based on data points that are members of that particular node and the values of data points for the selected dimension. As discussed herein, the visualization engine 1912 may determine a color from the range of colors for each node based on the data points that are members of that particular node. If there is only one data point that is a member of the node, the visualization engine 1912 may color that node based on the color associated with that data point's value in that particular dimension (e.g., selected dimension 2502). For example, if node 2210 only includes data point 14 from the spreadsheet 2100, then the visualization engine 1912 may color the node with the color associated with insulin response value 200 (e.g., the association between values or range of values with the range of color being determined by the translation module 2304 or the visualization engine 1912).

If there are more than one data point that is a member of a particular node, the visualization engine 1912 may average the value of that dimension for all data points or other summary statistics (e.g., mean, median, or mode) that are members of the particular node to determine a node representation dimension value and then may color the particular node based on the color associated with the node representation value. It will be appreciated that that the visualization engine 1912 may determine a node representation dimension value using any function or combination of functions (and is not limited to averaging of values).

In various embodiments, the visualization engine 1912 may display the range of colors, range of values, dimensions that are being colored, statistical values, and/or the like in legend 2206 of the visualization 2202.

In step 2416, the visualization engine 1912 displays the color for each node using the association between color and value depicted in the dimension legend 2604. In the network visualization 2602 depicted in FIG. 26, the visualization engine 1912 determined the greyscale color for each node based on value(s) of the selected dimension 2502 of data point(s) that are members of each node as well as the association between the value (or function of the values of multiple data points) and the range of color that may be determined by the translation module 2304 and/or the visualization engine 1912.

FIG. 26 depicts the network visualization 2602 including a coloring of all nodes based on the selected dimension 2502. Node group 2606 is a group of nodes that all share the same color. As such, the nodes of node group 2606 may include data points that have similar values (e.g., values that are in similar sub-range) for the selected dimension 2502 (e.g., the data points that are members of the nodes of node group 2606 may each include an insulin response value that is similar or within a small range of each other).

Figure 27:
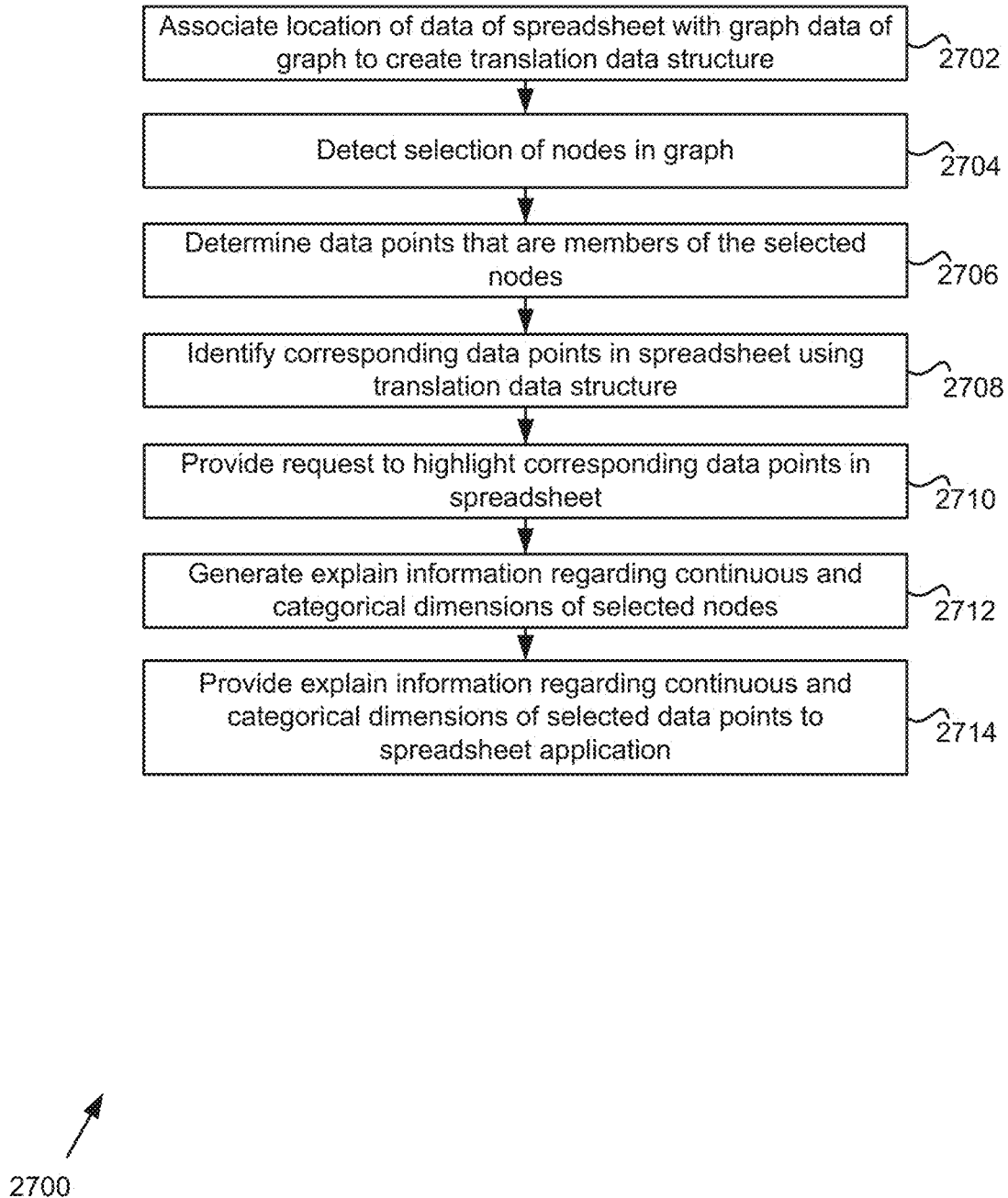
FIG. 27 is a flowchart for detecting a selection of one or more nodes in the network visualization, identifying related data points in the spreadsheet, and providing additional information regarding the selection in the spreadsheet or a related spreadsheet.

FIG. 27 is a flowchart 2700 for detecting a selection of one or more nodes in the network visualization 2602, identifying related data points in the spreadsheet 2100, and providing additional information regarding the selection in the spreadsheet 2100 or a related spreadsheet. As discussed herein, the analysis system 1900 may generate a network visualization 2202 using TDA analysis of data contained in the spreadsheet 2100 (e.g., using all or part of the method related to FIG. 20). In step 2702, the translation module 2304 generates a translation data structure indicating location of data points and dimensions (e.g., rows and columns) in the spreadsheet 2100 as well as location of data points and nodes in the network visualization 2202. The translation table (e.g., translation data structure) may include translation data. Translation data may include location of data points and dimensions (e.g., rows and columns) in the spreadsheet 2100 as well as location of data points and nodes in the network visualization 2202. In some embodiments, the translation module 2304 may scan and store names and/or identifiers of dimensions in data S used to generate the network visualization.

In various embodiments, the translation module 2304 scans the spreadsheet 2100 or receive information in the spreadsheet to generate a translation data structure (e.g., table) indicating location of data points and dimensions (e.g., rows and columns) in the spreadsheet 2100. The translation module 2304 scans the spreadsheet 2100 or receive information in the spreadsheet at any time.

The translation module 2304 may also receive node information (e.g., node identification information that identifies each node) as well as data point information (e.g., for each data point, the data point information identifies that particular data point as well as the node(s) that the particular data point is a member). The translation module 2304 may receive the information from any part of the analysis system 1900 (e.g., after nodes are generated, after the graph is generated, or after a network visualization is generated), may scan information related to the graph (e.g., results, reports, or output from TDA analysis of the data points), or may scan the network visualization. The translation module 2304 may also associate corresponding data points and/or dimensions between the network visualization 2202 and the spreadsheet 2100.

Figure 28:
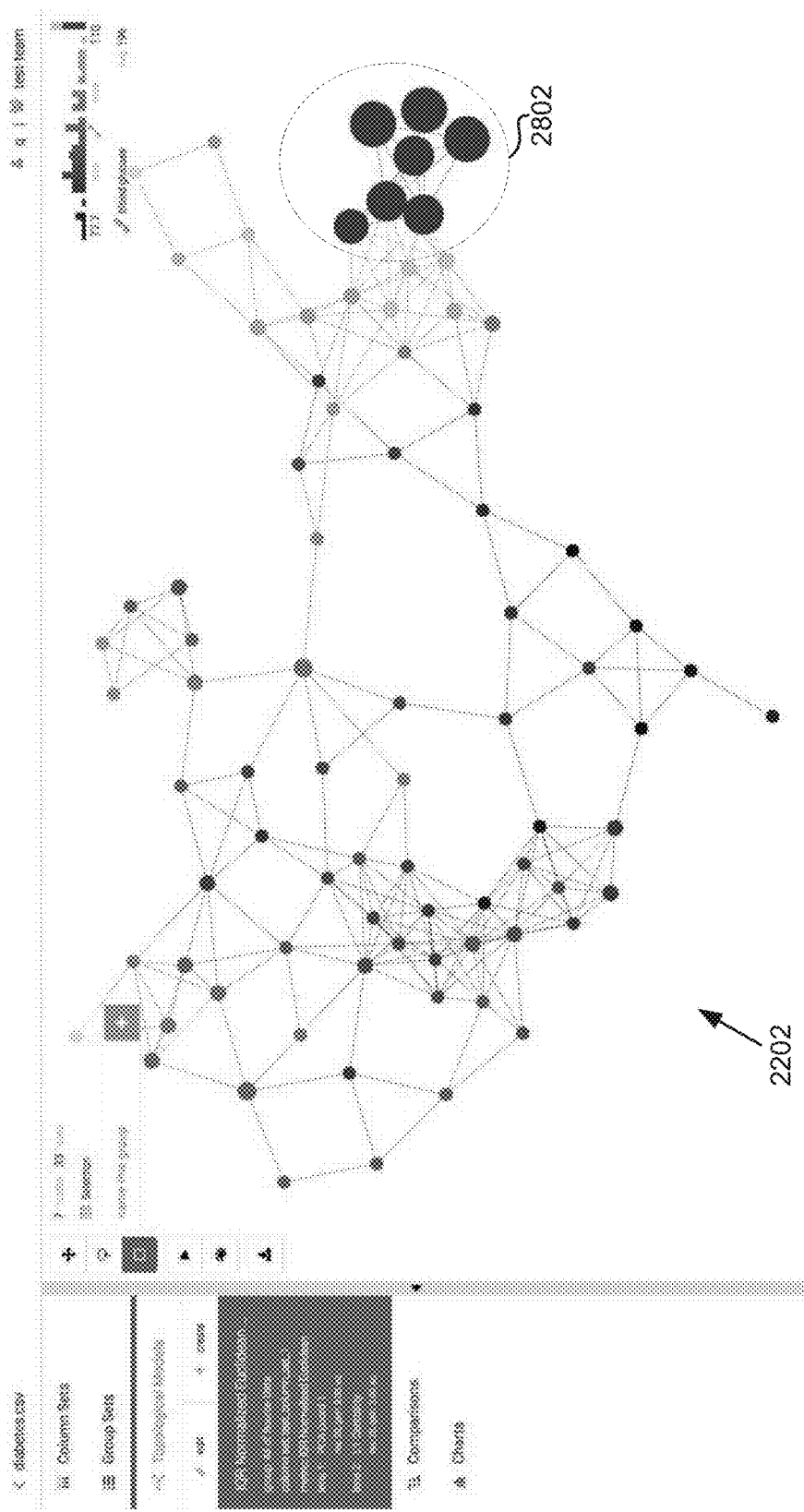
FIG. 28 depicts a network visualization that indicates selected nodes identified in node group.

In step 2704, the graph sensor module 2302 detects selection of any number of nodes in the network visualization 2202. For example, a user or a digital device may select a group of nodes (e.g., by drawing a shape around the desired nodes with a mouse or other interface). FIG. 28 depicts a network visualization 2202 that indicates selected nodes identified in node group 2802. In this example, the network visualization 2202 highlights the selected nodes of the node group 2802 by making the nodes appear larger and darker. The analysis interface, analysis system 1900, or the like may identify selected nodes in any way (e.g., size of nodes, depicting a shape such as a circle or box around the selected nodes, changing color of the nodes, or the like).

The graph sensor module 2302 may be a part of a TDA analysis application, TDA interface that displays the network visualization 2202, and/or the analysis system 1900. In some embodiments, the TDA analysis application, TDA interface that displays the network visualization 2202, and/ or the analysis system 1900 may report one or more changes to the graph sensor module 2302. In various embodiments, the graph sensor module 2302 may "listen" or query the TDA analysis application, TDA interface that displays the network visualization 2202, and/or the analysis system 1900 (e.g., with API calls or other requests) to detect changes in the network visualization 2202.

The graph sensor module 2302 may detect a change in the network visualization 2202 and may subsequently request and/or receive graph modification information indicating changes and/or selections within the network visualization 2202. In this example, the graph sensor module 2302 detects selection of nodes in the network visualization 2202.

In step 2706, the translation module 2304 may determine data points that are members of the selected nodes. For example, the translation module 2304 may utilize the translation data and/or the translation data structure to identify data points associated with selected nodes.

In step 2708, the translation module 2304 may identify data points in the spreadsheet 2100 that correspond to the data points that are members of the selected nodes. For example, the translation module 2304 may utilize the translation data and/or the translation data structure to identify data points in the spreadsheet 2100.

In step 2710, the translation module 2304 may provide instructions to highlight the corresponding data points in the spreadsheet 2100. For example, the translation module 2304 may submit commands and/or make API calls to the spreadsheet application and/or an operation system interacting with the spreadsheet application to cause the spreadsheet application to highlight the corresponding data points.

In some embodiments, the translation module 2304 may provide a request to highlight or otherwise identify corresponding data points in the spreadsheet 2100 based on selections in the network visualization 2202. The request to highlight or otherwise identify the corresponding data points may include data point identifiers and/or row identifiers associated with the corresponding data points. In some embodiments, the request may also include an indication to highlight or identify the corresponding data points.

Figure 29:
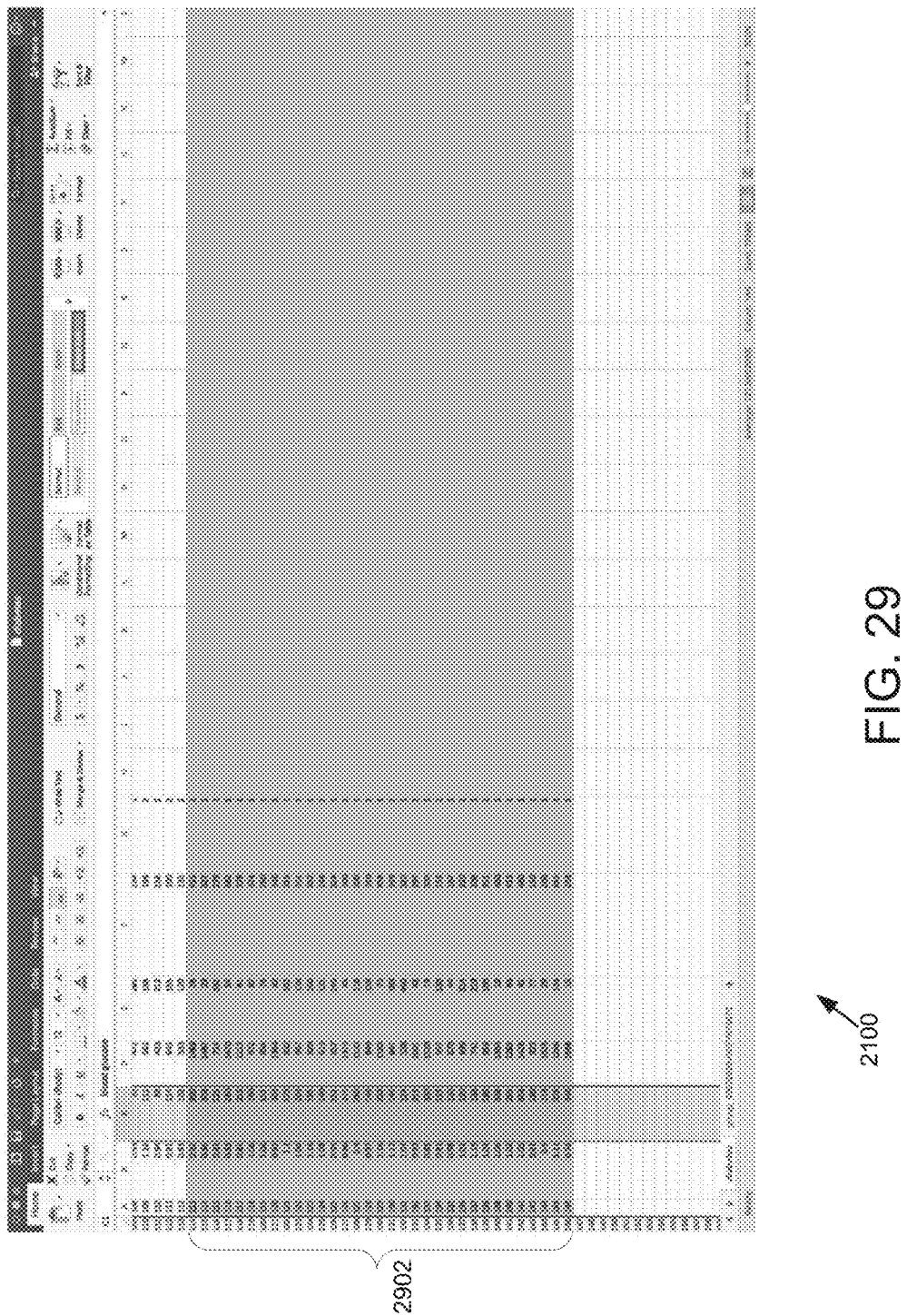
FIG. 29 depicts an example spreadsheet with highlighted data points.

FIG. 29 depicts an example spreadsheet 2100 with highlighted data points 2902. The highlighted data points in this example include data points 113-145. In this example, by selecting any number of nodes in the network visualization 2202, data points that correspond to data points that are members of the nodes are highlighted in the spreadsheet 2100. This may allow a data scientist to review data points in the spreadsheet and access spreadsheet tools on the data for further insights.

In this example, the blood glucose dimension is also selected. It will be appreciated that there may not be any selected column or there may be any number of selected columns. The blood glucose column may have been previously selected. For example, a user may have selected the blood glucose dimension in the spreadsheet 2100 and the colors of the nodes in the network visualization 2202 may have changed colors based on blood glucose values of corresponding data points in the spreadsheet 2100. Subsequently, a user may have selected a group of nodes in the network visualization 2202, and data points in the spreadsheet 2100 that correspond to data points that are members of the selected nodes may be highlighted.

In step 2712, the analysis system 1900 may generate explain information regarding continuous and categorical dimensions of the data points that are members of the selected nodes. The explain information may identify the data points associated with the selected nodes and/or as analysis information (e.g., statistical information) associated with the data points.

In some embodiments, the explain information allows the user to get a sense for dimension(s), metric function(s), lens function(s), and or resolution that are responsible for "similarity" of data in the selected nodes and the differentiating characteristics.

In one example, the explain information may indicate minimum value of dimensions and/or maximum values of dimensions across any number of the data points. The explain information may further include statistical information (e.g., mean, median, mode, or any other information) regarding any number of dimensions.

In various embodiments, explain information may include analytical values associated with continuous dimensions (i.e., continuous dimension analytical values) and analytical values associated with categorical dimensions (i.e., categorical dimension analytical values). In some embodiments, the translation module 2304 may identify any number of dimensions of the spreadsheet 2100 (e.g., all dimensions of the spreadsheet or a subset of the dimensions) as continuous dimensions, categorical dimensions, or both. A categorical dimension may include any dimension with qualitative values (e.g., strings) across data points and/or a limited number of values (e.g., quantitative or qualitative) across data points. A continuous dimension may include any number of qualitative values and/or a larger number of values greater than a predetermined continuous high threshold. In one example, the predetermined continuous threshold may be a percentage (e.g., 25%) of the total number of data points in the spreadsheet 2100.

In various embodiments, the translation module 2304 or the analysis system 1900 scans each dimension of the spreadsheet 2100 to determine if the dimension is a categorical dimension, a continuous dimension, or both. In spreadsheet 2100, the translation module 2304 or the analysis system 1900 may determine that the outcome, ID, blood glucose, insulin level, and steady state are each continuous dimensions because each have numerical values for each data point. It will be noted in this example that outcome only has three possible discrete values (i.e., "1," "2," or "3"). Since the values are numerical and may be below a continuous high threshold, the translation module 2304 or the analysis system 1900 may determine that the outcome dimension is a continuous dimension (e.g., because the values are numerical and below the continuous high threshold) as well as a categorical dimension (e.g., because there are so few values). A continuous high threshold is a predetermined value. If a dimension has equal or fewer quantitative values over the data points than the continuous high threshold, then the dimension may be both a continuous dimension and a categorical dimension.

In spreadsheet 2100, the translation module 2304 or the analysis system 1900 may determine that the relative weight dimension is a categorical dimension because the number of different quantitative values over the data points of spreadsheet 2100 are below a continuous high threshold.

It will be appreciated that the dimensions may be determined to be continuous dimensions, categorical dimensions, or both in any number of ways. For example, if the range of values in a dimension is small, even if there are a large number of quantitative values for the dimension over the data points, the dimension may be determined to be a categorical dimension.

A continuous dimension may be assessed any number of ways. When a continuous dimension is assessed, the data values of that dimension across all or a selected subset of data points may be analyzed. For example, the analysis system 1900 (e.g., graph engine 1910) may generate a probability value (i.e., p value), a Kolmogorov-Smirnov value, a min value, a max value, a group median value, and a rest median value for each continuous dimension. The p value is a probability for a given statistical model that, when the null hypothesis is true, the difference between two compared groups would be the same as or more extreme than the observed results.

The Kolmogorov-Smirnov value may be a result of a Kolmogorov-Smirnov test S test or KS test). The Kolmogorov-Smirnov test is a nonparametric test of the equality of continuous, one-dimensional probability distributions that can be used to compare a sample with a reference probability distribution (one-sample K-S test), or to compare two samples (two-sample K-S test). The min value may indicate a minimum value for that dimension across all or a selected portion of data points. The max value may indicate a maximum value for that dimension across all or a selected portion of data points. The group median value may be a median value for that dimension across a selected portion of data points and a rest median value may be a median value for that dimension across the unselected portion of data points. In various embodiments, the Kolmogorov-Smirnov value is computed by comparing data points of the selected groups (e.g., nodes) to other data points in the data set.

A categorical dimension may be assessed any number of ways. When a categorical dimension is assessed, each data value of that dimension across all or a selected subset of data points may be separately analyzed. For example, for each value of the outcome dimension (i.e., "1," "2," or "3"), the analysis system 1900 (e.g., graph engine 1910) may generate a probability value (i.e., p value), group percentage value and a rest percentage value. The group percentage value is the percentage of the selected data points that share that particular value. The rest percentage value is the percentage of un-selected data points that share that particular value.

Although a variety of assessments and values are discussed, the analysis system 1900 may determine any number of assessments for each type of dimension. Similarly, although categorical and continuous dimensions are discussed, there may be any number of different types of dimensions determined and assessed.

In various embodiments, the analysis system 1900 may provide the explain information (e.g., continuous dimension determinations, categorical dimension determinations, assessment values, and the like) to the spreadsheet interaction module 1916.

In step 2714, the translation module 2304 provides the explain information to the spreadsheet application and/or the spreadsheet. In some embodiments, the translation module 2304 may provide a request (e.g., one or more commands and/or API call(s)) to the spreadsheet application to display the explain information. For example, the translation module 2304 may generate an API call to spawn a worksheet to display the explain information on a separate page related to the spreadsheet.

Figure 30:
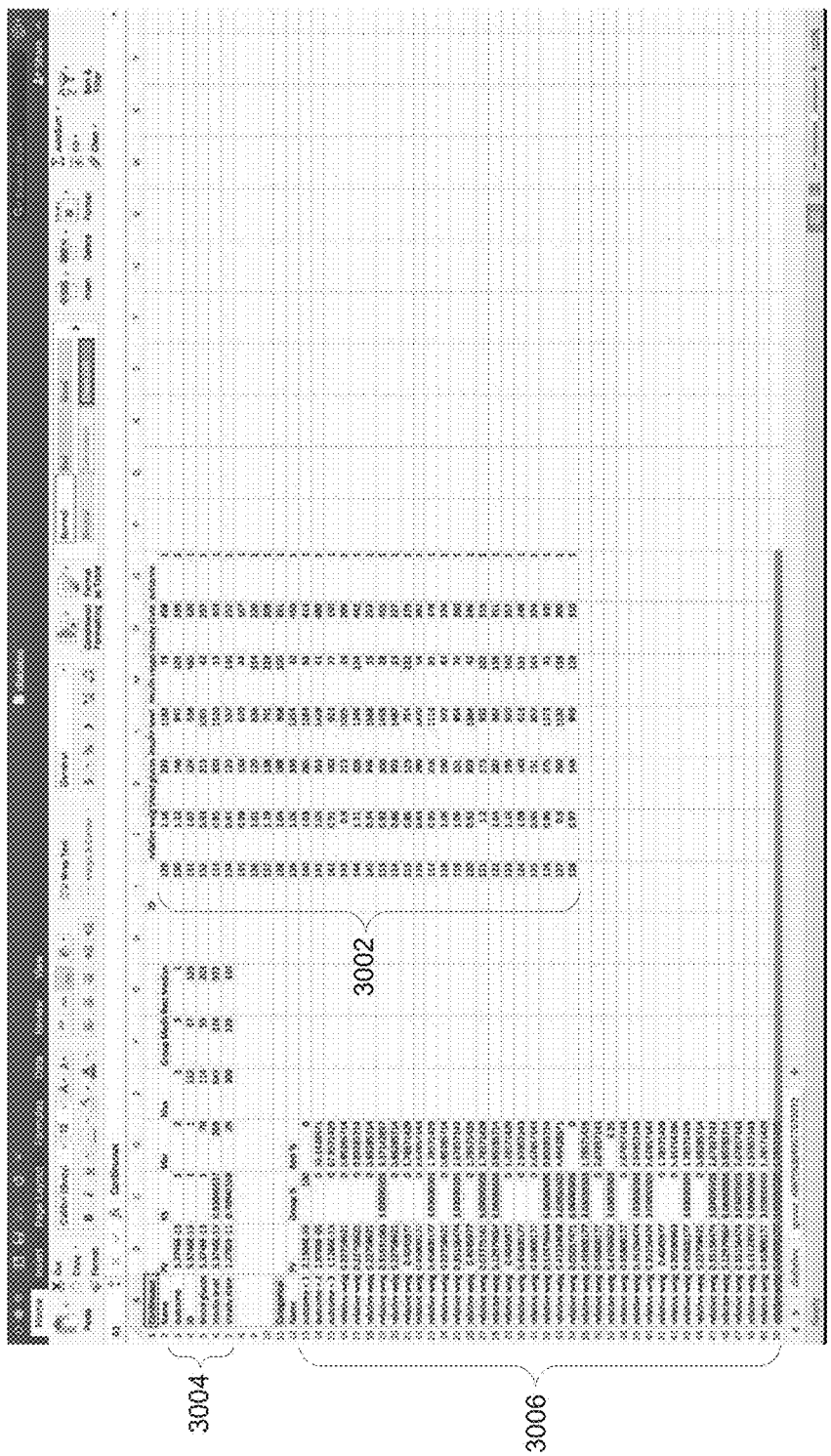
FIG. 30 depicts a worksheet associated with the spreadsheet displaying explain information associated with the selected data points that are members of the selected nodes in FIG. 28.

FIG. 30 depicts a worksheet 3000 associated with the spreadsheet 2100 displaying explain information associated with the selected data points that are members of the selected nodes in FIG. 28. The worksheet 3000 includes a data point portion 3002, a continuous dimension assessment portion 3004, and a categorical assessment portion 3006. The data point portion 3002 includes a list of data points that correspond to data points that are members of the selected nodes. The data point portion 3002 may include dimension values as well as labels for each dimension. While this information may be a copy of information contained in the spreadsheet 2100, the information in the data point portion may be easier to assess and review.

The continuous dimension assessment portion 3004 may include a list of continuous dimensions. In FIG. 30, the list of continuous dimensions include outcome, ID, blood glucose, insulin level, and steady state. For each of the dimensions, the continuous dimension assessment portion 3004 may include values for the selected data points as well as different values for un-selected data points. For example, the continuous dimension assessment portion 3004 may include a probability value (i.e., p value), a Kolmogorov-Smirnov value, a min value, a max value, a group median value, and a rest median value. The continuous dimension assessment portion 3004 of FIG. 30 includes the p value for the blood glucose is 5.3746E-13, the Kolmogorov-Smirnov value is 1, the min value is 70, the max value is 114, the group median (e.g., the median value for that particular dimension for the selected data points), and the rest median (e.g., the median value for that particular dimension for the un-selected data points).

The categorical dimension assessment portion 3006 may include a list of categorical dimensions. In FIG. 30, the list of categorical dimensions include outcome and relative weight. Further, FIG. 30 depicts each value of the outcome and each value of the relative weight assessed separately. In some embodiments, each value of the selected data points for that categorical dimension is assessed separately. In various embodiments, each value of all data points for that categorical dimension is assessed separately.

For each file of the categorical dimension, the categorical dimension assessment portion 3006 includes a probability value, a group percentage value (e.g., the percentage of the selected data points that have the particular value for the particular categorical dimension value), and a rest percentage value (e.g., the percentage of un-selected data points that have the particular value for the particular categorical dimension value). For example, the categorical dimension assessment portion 3006 includes an assessment for selected data points with an outcome of "1." The p-value for this particular outcome is 2.1304E-33, the percentage of selected data points that have this particular outcome is 100% (i.e., the group percentage value is 100%) and the rest percentage outcome is 0%. For the outcome of "2," no data points of the group have that particular outcome so the group percentage value is 0. However, the rest percentage value for the un-selected data points is 32.1428571% (meaning that 32.1428571% of the un-selected data points have an outcome of "2").

Figure 31:
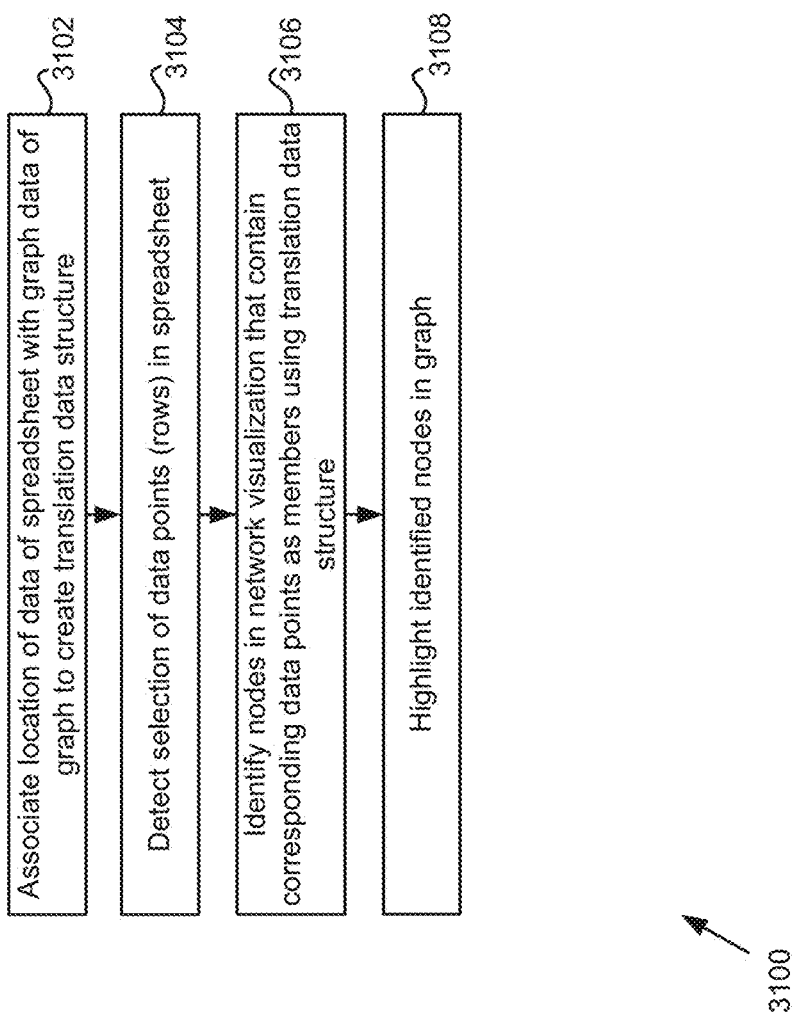
FIG. 31 is a flowchart for detecting selecting of one or more data points in a spreadsheet and controlling related changes to the network visualization in some embodiments.

FIG. 31 is a flowchart for detecting selecting of one or more data points in a spreadsheet 2100 and controlling related changes to the network visualization 2202 in some embodiments. As similarly discussed herein, the analysis system 1900 may generate a network visualization 2202 using TDA analysis of data contained in the spreadsheet 2100 (e.g., using all or part of the method related to FIG. 20). In step 3102, the translation module 2304 generates a translation data structure indicating location of data points and dimensions (e.g., rows and columns) in the spreadsheet 2100 as well as location of data points and nodes in the network visualization 2202. The translation table (e.g., translation data structure) may include translation data. Translation data may include location of data points and dimensions (e.g., rows and columns) in the spreadsheet 2100 as well as location of data points and nodes in the network visualization 2202.

In various embodiments, the translation module 2304 scans the spreadsheet 2100 or receive information in the spreadsheet to generate a translation data structure (e.g., table) indicating location of data points and dimensions (e.g., rows and columns) in the spreadsheet 2100. The translation module 2304 scans the spreadsheet 2100 or receive information in the spreadsheet at any time.

The translation module 2304 may also receive node information (e.g., node identification information that identifies each node) as well as data point information (e.g., for each data point, the data point information identifies that particular data point as well as the node(s) that the particular data point is a member). The translation module 2304 may receive the information from any part of the analysis system 1900 (e.g., after nodes are generated, after the graph is generated, or after a network visualization is generated), may scan information related to the graph (e.g., results, reports, or output from TDA analysis of the data points), or may scan the network visualization. The translation module 2304 may also associate corresponding data points and/or dimensions between the network visualization 2202 and the spreadsheet 2100.

Figure 32:
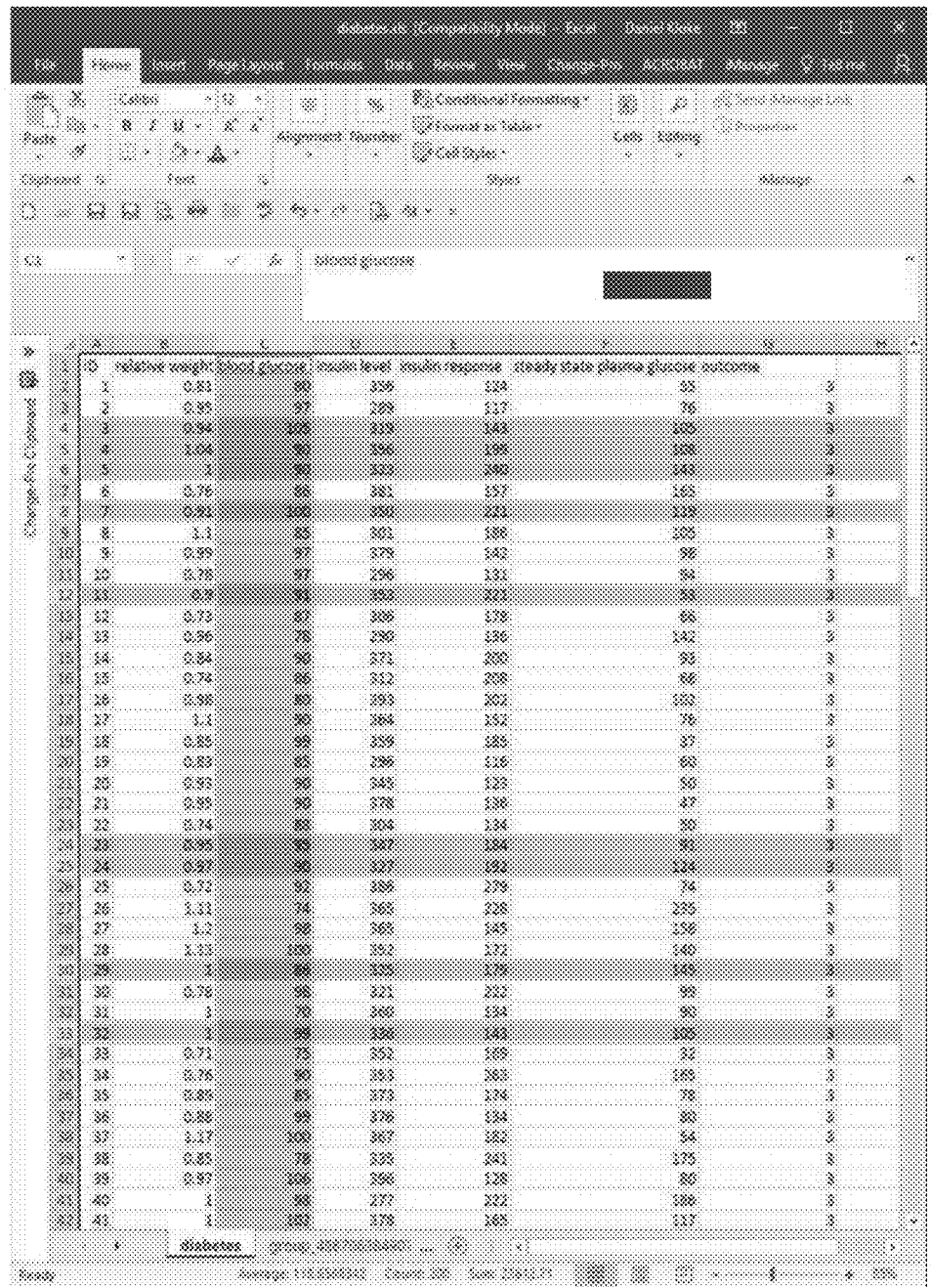
FIG. 32 depicts the spreadsheet with different selected data points (e.g., data points corresponding to ID 3-5, 7, 11, 23, 24, 29, and 32).

In step 3104, the spreadsheet sensor module 2300 may detect a selection of data points (e.g., any number of rows) in the spreadsheet 2100. FIG. 32 depicts the spreadsheet 2100 with different selected data points (e.g., data points corresponding to ID 3-5, 7, 11, 23, 24, 29, and 32). In one example, a user may select row 4 corresponding to ID 3. The translation module 2304 may identify nodes that contain a data point corresponding to ID 3 of the spreadsheet. The translation module 2304 may subsequently identify other data points (and corresponding IDs to those data points) that are members of the identified nodes. The translation module 2304 may then identify those other data points in the spreadsheet 2100 and provide a command to the spreadsheet application to highlight those corresponding rows. In this example, a data point corresponding to ID 3 is a member of node "A" in the network visualization. Data points corresponding to ID 4, 5, 7, 11, 23, 24, 29, and 32 are also members of node "A." The translation module 2304 may identify those IDs corresponding to the other data points of node "A" and may provide a command to the spreadsheet application to highlight the rows corresponding to those IDs.

The spreadsheet sensor module 2300 may detect changes in the spreadsheet 2100 as discussed herein (e.g., by contacting the spreadsheet application and requesting information regarding any changes, "listening" to reporting information, sending API calls requesting information, and/or the like).

In step 3106, the translation module 2304 identifies nodes in the network visualization 2202 that contain data points that correspond to the data points selected in the spreadsheet 2100. The translation module 2304 may utilize information from the translation data structure (e.g., translation information) to identify nodes of the network visualization 2202 with data points as members that correspond to the selected data points in the spreadsheet 2100. For example, the translation module 2304 may identify nodes of network visualization 2202 that contain data points that correspond to data points with ID values of 3-5, 7, 11, 23, 24, 29, and 32.

In step 3108, the analysis system 1900 (e.g., visualization engine 1912) receives node information and/or a highlight request from the spreadsheet interaction module 1916 to highlight or otherwise identify the nodes identified by the translation module 2304. In some embodiments, the node information may identify which nodes are to be highlighted or otherwise identified in the network visualization. The request may be a request or API call provided by the spreadsheet interaction module 1916 to the analysis system 1900 to highlight or otherwise identify one or more nodes.

Figure 33:
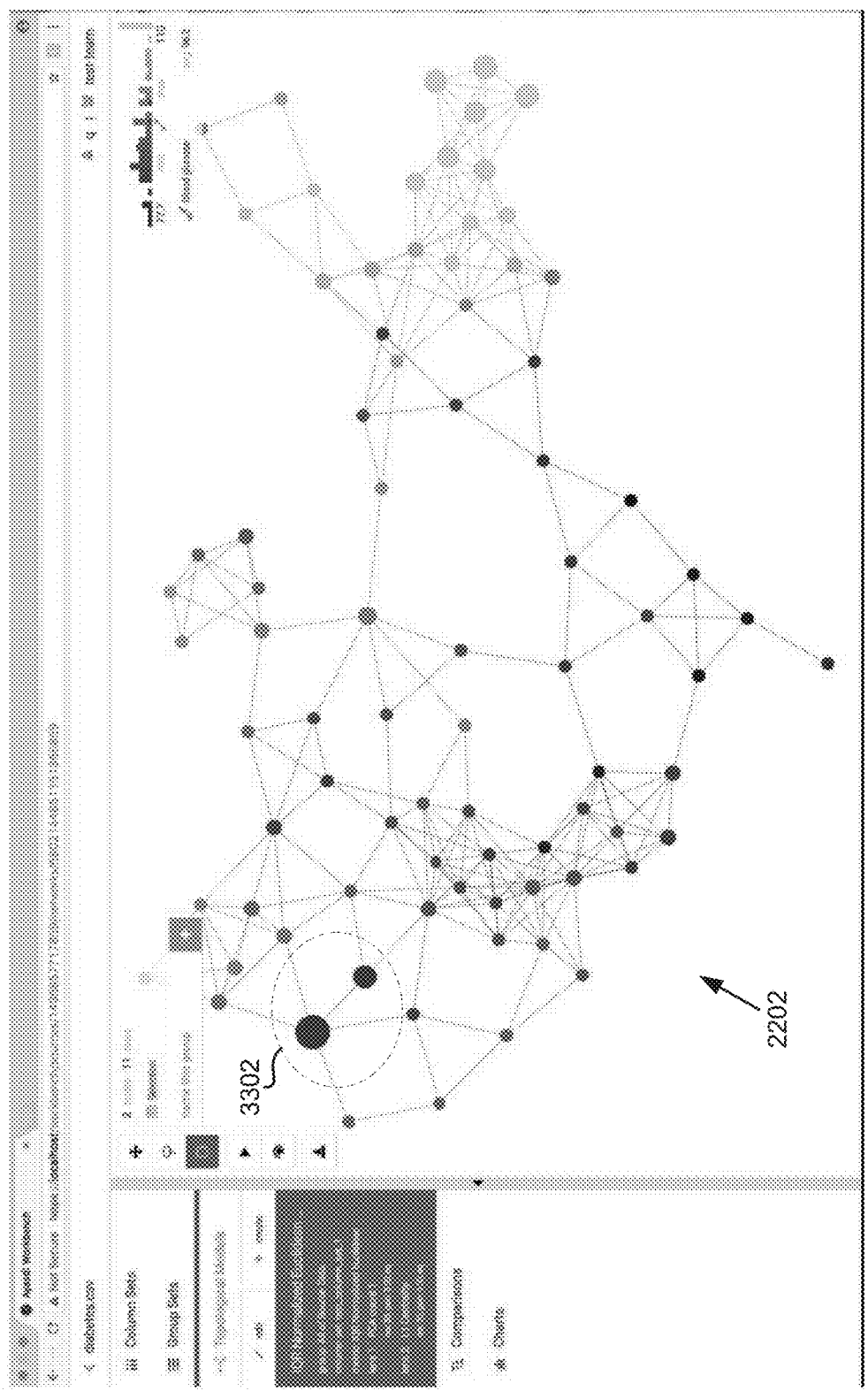
FIG. 33 depicts a network visualization with a group of two nodes that are highlighted.

FIG. 33 depicts a network visualization 2202 with a group 3302 of two nodes that are highlighted. The highlighted nodes of group 3302 contain data points corresponding to data points selected in the spreadsheet 2100 (e.g., the two highlighted nodes contain data points with ID values of 3-5, 7, 11, 23, 24, 29, and 32).

By selecting different data points in the spreadsheet, the user or data analyst may identify which nodes contain those data points. By leveraging the interaction between the network visualization 2202 and the spreadsheet 2100, insights and relationships within the data may be identified, assessed, and/or investigated.

The above-described functions and components can be comprised of instructions that are stored on a storage medium (e.g., a computer readable storage medium). The instructions can be retrieved and executed by a processor. Some examples of instructions are software, program code, and firmware. Some examples of storage medium are memory devices, tape, disks, integrated circuits, and servers. The instructions are operational when executed by the processor (e.g., a data processing device) to direct the processor to operate in accord with embodiments of the present invention. Those skilled in the art are familiar with instructions, processor(s), and storage medium.

The present invention has been described above with reference to exemplary embodiments. It will be apparent to those skilled in the art that various modifications may be made and other embodiments can be used without departing from the broader scope of the invention. Therefore, these and other variations upon the exemplary embodiments are intended to be covered by the present invention.

The invention claimed is:

1. A method comprising:
receiving data points from a spreadsheet;
receiving a lens function identifier, a metric function identifier, and a resolution function identifier;
mapping the data points from the spreadsheet to a reference space utilizing a lens function identified by the lens function identifier;
generating a cover of the reference space using a resolution function identified by the resolution identifier;
clustering the data points mapped to the reference space using the cover and a metric function identified by the metric function identifier to determine each node of a plurality of nodes of a graph, each node including at least one data point from the spreadsheet;
generating a visualization depicting the nodes, the visualization including an edge between every two nodes that share at least one data point from the spreadsheet as a member;
generating a translation data structure indicating, for each data point received from the spreadsheet, a location of that data point in the spreadsheet as well as that data point's membership of one or more nodes in the visualization;
detecting a selection of at least one node in the visualization;
determining the location of a first set of data points in the spreadsheet corresponding to one or more data points that are members of the at least one node selected in the visualization using the translation data structure; and
providing a first command to a spreadsheet application interacting with the spreadsheet to provide a first visual identification of each of the first set of data points in the spreadsheet that correspond to the one or more data points that are members of the at least one node selected in the visualization.

2. The method of claim 1, further comprising:
detecting a selection of a second set of data points in the spreadsheet;
determining, using the translation data structure, a set of nodes in the visualization that include data points that correspond to the second set of data points; and
providing a second command to an analysis system to provide a second visual identification of the set of nodes.

3. The method of claim 1, further comprising:
detecting a selection of a column corresponding to a dimension in the spreadsheet;
determining a range of values corresponding to dimension values for data points in the spreadsheet;
determining a range of colors that correspond to the range of values;
determining a node value associated with each node, each node value being based at least in part on the dimension value of each data point that is a member of the particular node; and
providing a third command to the analysis system to color the nodes of the visualization based on the range of colors.

4. The method of claim 3, wherein determining the node value associated with a first node of the visualization comprises determining data points that are members of the first node, determining entries for the dimension for each of the data points that are members of the first node, and averaging the entries for the dimension for each of the data points that are members of the first node to create the node value.

5. The method of claim 3, further comprising determining a legend that identifies the range of colors associated with at least a part of the range of values and providing a fifth command to depict the legend in the visualization.

6. The method of claim 1, further comprising:
generating explain information indicating significance of at least a subset of dimensions for the data points that are members of the selected nodes; and
providing a sixth command to the spreadsheet application to generate a worksheet associated with the spreadsheet and depict the explain information.

7. The method of claim 6, wherein the generating the explain information comprises determining if at least one dimension in the spreadsheet is a continuous dimension and calculating a p value of the at least one dimension that is the continuous dimension.

8. The method of claim 7, wherein determining if at least one dimension in the spreadsheet is a continuous dimension comprises determining if dimension values of the at least one dimension for at least the data points that correspond to the data points in the selected nodes are quantitative values and determining that a number of distinct dimension values of the at least on dimension for the at least the data points that correspond to the data points in the selected nodes are greater than a continuous threshold.

9. The method of claim 6, wherein the generating the explain information comprises determining if at least one dimension in the spreadsheet is a categorical dimension and calculating a p value of a single dimension value of the at least one dimension that is the categorical dimension.

10. The method of claim 9, wherein determining if the at least one dimension in the spreadsheet is a categorical dimension comprises determining if dimension values of the at least one dimension for at least the data points that correspond to the data points in the selected nodes are qualitative values.

11. The method of claim 10, wherein determining if the at least one dimension in the spreadsheet is a categorical dimension comprises determining that a number of distinct dimension values of the at least on dimension for at least the data points that correspond to the data points in the selected nodes is less than a categorization threshold.

12. A non-transitory computer readable medium comprising instructions executable by a processor to perform a method, the method comprising:
receiving data points from a spreadsheet;
receiving a lens function identifier, a metric function identifier, and a resolution function identifier;
mapping the data points from the spreadsheet to a reference space utilizing a lens function identified by the lens function identifier;
generating a cover of the reference space using a resolution function identified by the resolution identifier;
clustering the data points mapped to the reference space using the cover and a metric function identified by the metric function identifier to determine each node of a plurality of nodes of a graph, each node including at least one data point from the spreadsheet;
generating a visualization depicting the nodes, the visualization including an edge between every two nodes that share at least one data point from the spreadsheet as a member;
generating a translation data structure indicating, for each data point received from the spreadsheet, a location of that data point in the spreadsheet as well as that data point's membership of one or more nodes in the visualization;
detecting a selection of at least one node in the visualization;
determining the location of a first set of data points in the spreadsheet corresponding to one or more data points that are members of the at least one node selected in the visualization using the translation data structure; and
providing a first command to a spreadsheet application interacting with the spreadsheet to provide a first visual identification of each of the first set of data points in the spreadsheet that correspond to the one or more data points that are members of the at least one node selected in the visualization.

13. The non-transitory computer readable medium of claim 12, the method further comprising:
detecting a selection of a second set of data points in the spreadsheet;
determining, using the translation data structure, a set of nodes in the visualization that include data points that correspond to the second set of data points; and
providing a second command to an analysis system to provide a second visual identification of the set of nodes.

14. The non-transitory computer readable medium of claim 12, the method further comprising:
detecting a selection of a column corresponding to a dimension in the spreadsheet;
determining a range of values corresponding to dimension values for data points in the spreadsheet;
determining a range of colors that correspond to the range of values;
determining a node value associated with each node, each node value being based at least in part on the dimension value of each data point that is a member of the particular node; and
providing a third command to the analysis system to color the nodes of the visualization based on the range of colors.

15. The non-transitory computer readable medium of claim 14, wherein determining the node value associated with a first node of the visualization comprises determining data points that are members of the first node, determining entries for the dimension for each of the data points that are members of the first node, and averaging the entries for the dimension for each of the data points that are members of the first node to create the node value.

16. The non-transitory computer readable medium of claim 14, the method further comprising determining a legend that identifies the range of colors associated with at least a part of the range of values and providing a fifth command to depict the legend in the visualization.

17. The non-transitory computer readable medium of claim 12, the method further comprising:
generating explain information indicating significance of at least a subset of dimensions for the data points that are members of the selected nodes; and
providing a sixth command to the spreadsheet application to generate a worksheet associated with the spreadsheet and depict the explain information.

18. The non-transitory computer readable medium of claim 17, wherein the generating the explain information comprises determining if at least one dimension in the spreadsheet is a continuous dimension and calculating a p value of the at least one dimension that is the continuous dimension.

19. The non-transitory computer readable medium of claim 18, wherein determining if at least one dimension in the spreadsheet is a continuous dimension comprises determining if dimension values of the at least one dimension for at least the data points that correspond to the data points in the selected nodes are quantitative values and determining that a number of distinct dimension values of the at least on dimension for the at least the data points that correspond to the data points in the selected nodes are greater than a continuous threshold.

20. The non-transitory computer readable medium of claim 17, wherein the generating the explain information comprises determining if at least one dimension in the spreadsheet is a categorical dimension and calculating a p value of a single dimension value of the at least one dimension that is the categorical dimension.

21. The non-transitory computer readable medium of claim 20, wherein determining if the at least one dimension in the spreadsheet is a categorical dimension comprises determining if dimension values of the at least one dimension for at least the data points that correspond to the data points in the selected nodes are qualitative values.

22. The non-transitory computer readable medium of claim 21, wherein determining if the at least one dimension in the spreadsheet is a categorical dimension comprises determining that a number of distinct dimension values of the at least on dimension for the at least the data points that correspond to the data points in the selected nodes is less than a categorization threshold.

23. A system comprising:
one or more processors; and
memory containing instructions executable by at least one of the one or more processors to:
receive data points from a spreadsheet;
receive a lens function identifier, a metric function identifier, and a resolution function identifier;

map the data points from the spreadsheet to a reference space utilizing a lens function identified by the lens function identifier;
generate a cover of the reference space using a resolution function identified by the resolution identifier;
cluster the data points mapped to the reference space using the cover and a metric function identified by the metric function identifier to determine each node of a plurality of nodes of a graph, each node including at least one data point from the spreadsheet;
generate a translation data structure indicating, for each data point received from the spreadsheet, a location of that data point in the spreadsheet as well as that data point's membership of one or more nodes in the visualization;
generate a translation data structure indicating location of the data points in the spreadsheet as well as membership of each node in the visualization;
detect a selection of at least one node in the visualization;
determine the location of a first set of data points in the spreadsheet corresponding to one or more data points that are members of the at least one node selected in the visualization using the translation data structure; and
provide a first command to a spreadsheet application interacting with the spreadsheet to provide a first visual identification of each of the first set of data points in the spreadsheet that correspond to the one or more data points that are members of the at least one node selected in the visualization.

* * * * *